US010455552B2

(12) United States Patent
Jang et al.

(10) Patent No.: US 10,455,552 B2
(45) Date of Patent: Oct. 22, 2019

(54) METHOD AND APPARATUS OF TRANSMITTING CONTROL INFORMATION IN WIRELESS COMMUNICATION SYSTEMS

(71) Applicant: Samsung Electronics Co., Ltd., Suwon-si, Gyeonggi-do (KR)

(72) Inventors: Jae-Hyuk Jang, Suwon-si (KR); Sang-Bum Kim, Suwon-si (KR); Kyeong-In Jeong, Yongin-si (KR); Sung-Hwan Won, Seoul (KR); Soeng-Hun Kim, Suwon-si (KR); Sung-Hoon Kim, Suwon-si (KR); Song-Yean Cho, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/928,734

(22) Filed: Mar. 22, 2018

(65) Prior Publication Data

US 2018/0213518 A1 Jul. 26, 2018

Related U.S. Application Data

(62) Division of application No. 15/000,428, filed on Jan. 19, 2016, now abandoned.

(Continued)

(51) Int. Cl.
*H04W 72/04* (2009.01)
*H04L 29/06* (2006.01)
(Continued)

(52) U.S. Cl.
CPC ........... *H04W 72/0406* (2013.01); *H04L 1/08* (2013.01); *H04L 5/00* (2013.01); *H04L 5/001* (2013.01);
(Continued)

(58) Field of Classification Search
None
See application file for complete search history.

(56) References Cited

U.S. PATENT DOCUMENTS 10,009,882 B2   6/2018   You et al.
2009/0156194 A1   6/2009   Meylan
(Continued)

FOREIGN PATENT DOCUMENTS

EP          2 809 042 A1   12/2014
WO       2014/014283 A1    1/2014
(Continued)

OTHER PUBLICATIONS

ETSI; LTE; Evolved Universal Terrestrial Radio Access (E-UTRA); Medium Access Control (MAC) protocol specification (3GPP TS 36321 version 10.2.0 Release 10); ETSI TS 136 321; V10.2.0; Jun. 2011; France.

(Continued)

*Primary Examiner* — Eunsook Choi
(74) *Attorney, Agent, or Firm* — Jefferson IP Law, LLP

(57) ABSTRACT

The present disclosure relates to communication schemes for combining 5G communication systems with IoT technology to support higher data transmission rate as post-4G systems and systems for the same. The present disclosure may be used in intelligent services (e.g., smart home, smart building, smart city, smart car, or connected car, health-care, digital education, retail business, security and safety-related services, etc.) based on the 5G communication technology and IoT-related techniques. According to an embodiment of the present disclosure, a method for transmitting control information in a wireless communication system comprises generating a header including a plurality of MAC subheaders and a medium access control (MAC) control information including a control field indicating whether there are included information related to a power headroom for a (Continued)

primary cell (PCell) and information regarding secondary cells (SCells) reportable to an extended power headroom and transmitting a payload including the MAC control information and the header, wherein the control field indicating activation or deactivation of at least one of the SCells.

20 Claims, 38 Drawing Sheets

Related U.S. Application Data

(60) Provisional application No. 62/194,632, filed on Jul. 20, 2015, provisional application No. 62/112,986, filed on Feb. 6, 2015, provisional application No. 62/104,320, filed on Jan. 16, 2015.

(51) Int. Cl.
| | | |
|---|---|---|
| *H04L 5/00* | (2006.01) | |
| *H04L 1/08* | (2006.01) | |
| *H04W 52/36* | (2009.01) | |
| *H04W 52/58* | (2009.01) | |

(52) U.S. Cl.
CPC .......... *H04L 5/0053* (2013.01); *H04L 5/0092* (2013.01); *H04L 5/0096* (2013.01); *H04L 65/1016* (2013.01); *H04L 65/1073* (2013.01); *H04L 69/22* (2013.01); *H04W 52/365* (2013.01); *H04W 52/58* (2013.01)

(56) References Cited

U.S. PATENT DOCUMENTS

| | | | | |
|---|---|---|---|---|
| 2010/0135225 | A1* | 6/2010 | Meylan | H04W 74/006 |
| | | | | 370/329 |
| 2012/0147859 | A1* | 6/2012 | He | H04W 52/50 |
| | | | | 370/336 |
| 2013/0194947 | A1 | 8/2013 | Ehsan et al. | |
| 2014/0023010 | A1 | 1/2014 | Loehr et al. | |
| 2014/0098761 | A1* | 4/2014 | Lee | H04W 74/006 |
| | | | | 370/329 |
| 2015/0208332 | A1* | 7/2015 | Baghel | H04W 48/16 |
| | | | | 370/255 |
| 2015/0215877 | A1 | 7/2015 | Ann et al. | |
| 2016/0088595 | A1* | 3/2016 | You | H04W 4/70 |
| | | | | 370/329 |
| 2016/0352493 | A1 | 12/2016 | Tan Bergstrom et al. | |

FOREIGN PATENT DOCUMENTS

| | | |
|---|---|---|
| WO | 2014/185659 A1 | 11/2014 |
| WO | 2015/003520 A1 | 1/2015 |

OTHER PUBLICATIONS

SONY, Enhanced Coverage Mobility Issues,3GPP Draft; R2-133821 Coverage ENH Mobility, 3rd Generation Partnership Project (3GPP), Mobile Competence Centre, 650. Route Des Lucioles, F-06921 Sophia-Antipolis Cedex , France, vol. RAN WG2, San Francisco, USA, Nov. 11, 2013-Nov. 15, 2013, Nov. 13, 2013, XP050736666, Retrieved from the Internet: URL:http://www.3gpp.org/ftp/Meetings_3GPP_SYNC/RAN/RAN2/Docs/.
European Search Report dated Sep. 10, 2018, issued in European Application No. 16737605.2.
R1-144842,PRACH for Rel-13 MTC UEs,XP050885513. 3GPP TSG RAN WG1 Meeting #79 San Francisco, USA, Nov. 17-21, 2014. Sharp. PRACH for Rel-13 MTC UEs. Publication date Nov. 8, 2014.
European Search Report dated Feb. 5, 2019, issued in European Application No. 16737605.2-1219 /3247054.

\* cited by examiner

METHOD AND APPARATUS OF TRANSMITTING CONTROL INFORMATION IN WIRELESS COMMUNICATION SYSTEMS

CROSS-REFERENCE TO RELATED APPLICATION(S)

This application is a divisional application of prior application Ser. No. 15/000,428, filed on Jan. 19, 2016, which was based on and claimed priority under 35 U.S.C. § 119(e) to a U.S. patent application filed in the U.S. Patent and Trademark Office on Jan. 16, 2015 and assigned Ser. No. 62/104,320, a US patent application filed in the U.S. Patent and Trademark Office on Feb. 6, 2015 and assigned Ser. No. 62/112,986, and a U.S. patent application filed in the U.S. Patent and Trademark Office on Jul. 20, 2015 and assigned Ser. No. 62/194,632, the entire disclosure of each of which is hereby incorporated by reference.

BACKGROUND OF THE INVENTION

Field of the Invention

The present disclosure relates to methods and apparatuses for transmitting control information in wireless communication systems.

Description of the Related Art

In order to meet the demand for wireless data traffic soring since the 4G communication system came to the market, there are ongoing efforts to develop enhanced 5G communication systems or pre-5G communication systems. For the reasons, the 5G communication system or pre-5G communication system is called the beyond 4G network communication system or post LTE system. For higher data transmit rates, 5G communication systems are considered to be implemented on ultra high frequency bands (mmWave), such as, e.g., 60 GHz. To mitigate pathloss on the ultra high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna. Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC). In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of general information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

Meanwhile, a critical requirement for next-generation wireless communication systems is, among others, to support the demand of high data transmission rates. To that end, various techniques including multiple input multiple output (MIMO), cooperative multiple point transmission (CoMP), and relay are being researched, but the most fundamental and stable solution is to increase bandwidth.

However, frequency resources have been saturated as of today, and the wide frequency band is partially being used for various techniques. For that reason, carrier aggregation (CA) is adopted as an approach to secure a wide bandwidth to meet the demand for high data transmission. In CA, dispersed bandwidths each are designed to meet basic requirements to operate an independent system, and such multiple bandwidths are bundled into one system. Next-generation wireless communication systems require specific schemes to meet service requirements.

The above information is presented as background information only to assist with an understanding of the present disclosure. No determination has been made, and no assertion is made, as to whether any of the above might be applicable as prior art with regard to the present disclosure.

SUMMARY OF INVENTION

According to the present disclosure, there are provided a method and apparatus for addressing the problem that inclusion of the Ci of the SCell and its corresponding PH information may bring about unneglectable signaling overhead particularly under the circumstance where the number of DL only SCells increases.

According to the present disclosure, there are provided a method and apparatus for performing machine-type communication.

According to the present disclosure, there are provided a method and apparatus for supporting access by a machine-type communication (MTC) terminal considering the features of the MTC terminal.

According to the present disclosure, there are provided a method and apparatus for providing an efficient procedure for an MTC terminal upon random access to access a base station.

According to the present disclosure, there are provided a method and apparatus utilizing a token upon access an IMS through WebRTC access in a web type.

According to an embodiment of the present disclosure, a method for transmitting control information in a wireless communication system comprises generating a header including a plurality of MAC subheaders and a medium access control (MAC) control information including a control field indicating whether there are included information related to a power headroom for a primary cell (PCell) and information regarding secondary cells (SCells) reportable to an extended power headroom and transmitting a payload including the MAC control information and the header, wherein the control field indicating activation or deactivation of at least one of the SCells.

According to an embodiment of the present disclosure, an apparatus for transmitting control information in a wireless communication system comprises a controller generating a header including a plurality of MAC subheaders and a medium access control (MAC) control information including a control field indicating whether there are included information related to a power headroom for a primary cell (PCell) and information regarding secondary cells (SCells) reportable to an extended power headroom and a transmitter transmitting a payload including the MAC control information and the header, wherein the control field indicating activation or deactivation of at least one of the SCells.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

Throughout the drawings, like reference numerals will be understood to refer to like parts, components, and structures.

DETAILED DESCRIPTION OF THE EXEMPLARY EMBODIMENTS

Hereinafter, embodiments of the present disclosure are described in detail with reference to the accompanying drawings. The same reference denotations may be used to refer to the same or similar elements throughout the specification and the drawings. When making the gist of the present disclosure unclear, the detailed description of known functions or configurations is skipped.

The terms or language used herein should not be interpreted as limited as typical ones or ones defined in the dictionary but rather to comply with the technical spirit of the present disclosure based on the doctrine that the inventor may define terms on his own in a proper manner so as to make the invention understood in a best way to describe best the invention.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The following description encompasses exemplary systems, methods, techniques, command sequences, and computer program articles for implementing the subject matter of the present disclosure. However, it should be noted that the specific embodiments may be executed without the detailed description thereof. For example, although the embodiments are involved in using LTE technologies between the base station and the terminal, the specific embodiments are not limited thereto. In other implementations, other proper communication standards and techniques may also come in use.

Figure 1:
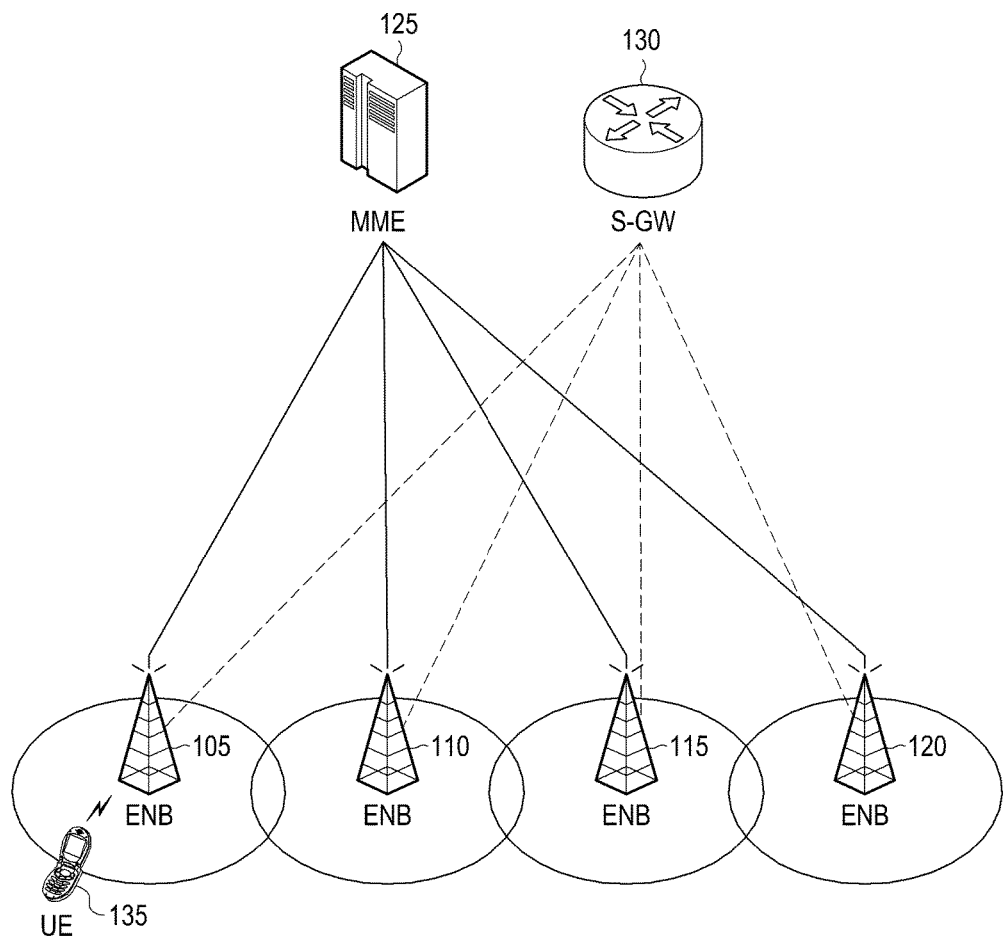
FIG. 1 is a view illustrating a structure of a LTE mobile communication system.

FIG. 1 illustrates an embodiment of an LTE mobile communication system structure.

Referring to FIG. 1, a radio access network of the LTE mobile communication system includes next-generation base stations (evolved node B—hereinafter, "ENB" or "base station") 105, 110, 115, and 120, a mobility management entity (MME) 125, and a serving gateway (S-GW) 130. A user equipment (hereinafter, "UE" or "terminal") 135 accesses an external network through the ENB and the S-GW. The ENBs 105 to 120 correspond to node Bs in the legacy universal mobile telecommunication system (UMTS) system. The ENBs 105 to 120 are connected with the UE 135 through a wireless channel and plays a more complicated role than the legacy node B. Since in LTE all user traffic as well as real-time services, such as voice over Internet protocol (VoIP) service through an Internet protocol is serviced through a shared channel, there is needed an apparatus that performs scheduling by compiling state information, regarding UEs and the ENBs 105 to 120 are in charge of the same. One ENB typically controls multiple cells. The LTE adopts, as a radio access technology, orthogonal frequency division multiplexing (hereinafter, "OFDM") on up to a 20 MHz bandwidth in order to implement a transmission speed up to 100 Mbps. Further, the system applies adaptive modulation & coding (AMC) that determines a modulation scheme and a channel coding rate in compliance with the channel state of the UE. The S-GW is a device providing a data bearer, and the serving gateway 130 generates or removes a data bearer under the control of the MME. The MME is an apparatus that is in charge of various control functions and is connected with multiple base stations.

Figure 2:
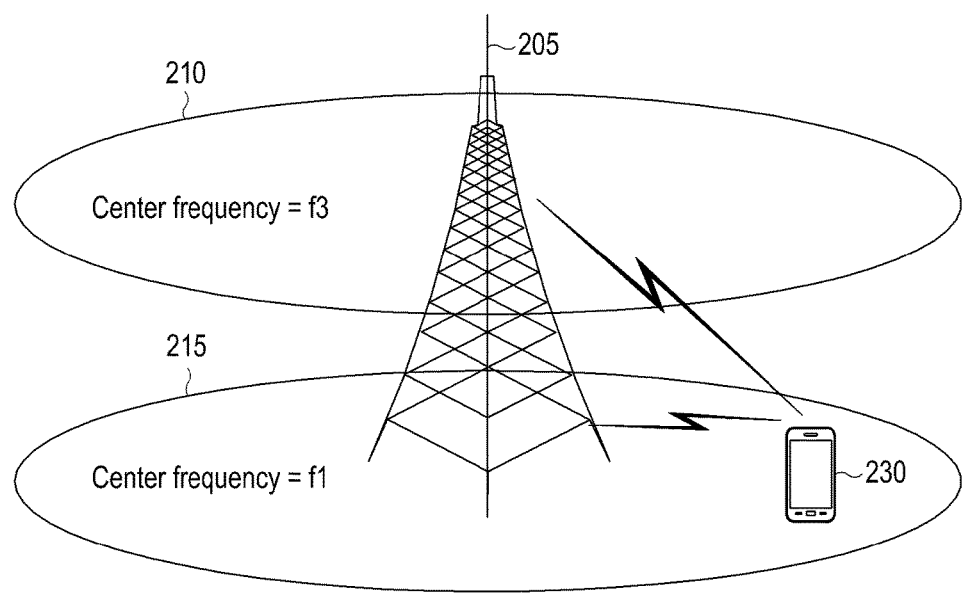
FIG. 2 is a view illustrating an exemplary LTE CA function.

FIG. 2 is a view illustrating an exemplary LTE CA function.

Generally, one base station may operate several frequencies (having the same meaning as carrier, hereinafter interchangeably used). For example, when the base station 205 operates downlink (forward or DL) frequency with a center frequency of f1 and downlink frequency with a center frequency of f3 210, one terminal receives data using one of the two frequencies according to the prior art. However, a terminal supporting CA may receive data using both the frequencies to increase data reception speed. The same principle given for downlink frequencies may also apply to uplink (backward or UL) frequencies, and terminal supporting CA may transmit data using a plurality of uplink frequencies to increase transmission data speed. From a traditional point of view, when one downlink frequency and one uplink frequency which are transmitted or received by one base station configure one cell, the CA function may be deemed as the terminal transmitting data through a plurality of cells simultaneously. Here, the terminal may have a plurality of serving cells. Among the plurality of serving cells, the basic sec for mobility support of terminal, ciphering of data/control information, and integrity check is denoted PCell, and other serving cells added for CA function are denoted SCells. See the following for more detailed definitions of serving cell, PCell, and SCell.

Serving Cell, For a UE in RRC_CONNECTED not configured with CA there is only one serving cell comprising of the primary cell. For a UE in RRC_CONNECTED configured with CA the term 'serving cells' is used to denote the set of one or more cells comprising of the primary cell and all secondary cells.

Primary Cell(PCell), The cell, operating on the primary frequency, in which the UE either performs the initial connection establishment procedure or initiates the connection re-establishment procedure, or the cell indicated as the primary cell in the handover procedure.

Secondary Cell(SCell), A cell, operating on a secondary frequency, which may be configured once an RRC connection is established and which may be used to provide additional radio resources.

Meanwhile, backward transmission interferes with backward transmission of other cells, and thus, power of backward transmission should remain at a proper level. To that end, the terminal calculates a backward transmission power using a predetermined function when performing backward transmission and performs backward transmission with the calculated backward transmission power. For example, the terminal may put in the predetermined function input values by which it may estimate channel status such as path loss value and scheduling information such as MCS (modulation coding scheme) to be applied and the amount of transmission resources allocated to calculate a required backward transmit power value and applies the calculated required backward transmit power value to perform backward transmission. The backward transmit power value applicable by the terminal is limited by the terminal's maximum transmission value, and if the calculated required transmit power value exceeds the terminal's maximum transmission value, the terminal applies the maximum transmit value to perform backward transmission. In such case, since it cannot apply sufficient backward transmit power, backward transmission quality may be deteriorated. The base station preferably performs scheduling so that the required transmit power does not exceed the maximum transmit power. However, some parameters including pathloss cannot be grasped by the base station, and terminal reports its available transmit power (power headroom, PH) information to the base station by transmitting (extended) power headroom report (PHR) MAC control information. CA-operating terminal may include PH information for several serving cells in a single PHR and transmit the same, and the PHR is referred to as extended PHR.

Figure 3A:
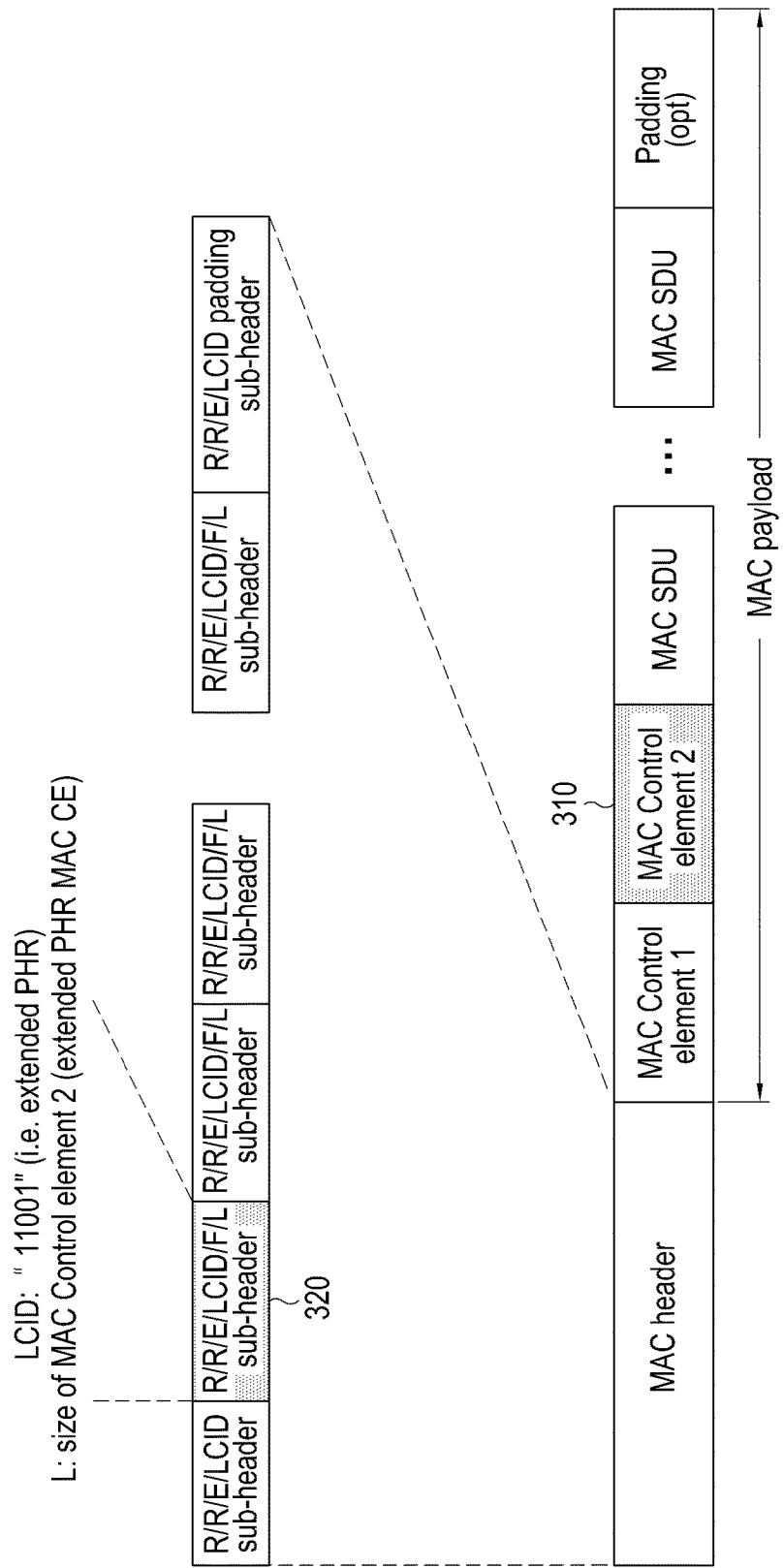
FIGS. 3A and 3B are views illustrating examples of an extended PHR MAC control information format available in LTE CA.
Figure 3B:
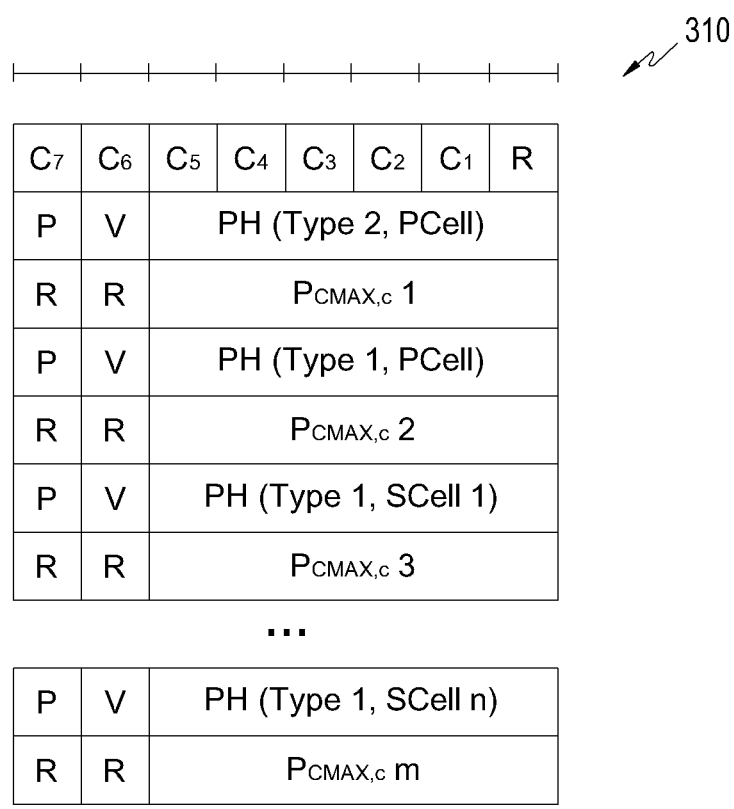

FIGS. 3A and 3B are views illustrating a first embodiment of an extended PHR MAC control information format available in LTE CA.

MAC header includes a sub-header for extended PHR. In FIG. 3A, it is assumed that the MAC Control element 2 310 is extended PHR MAC control information, and of the MAC sub-headers, the second MAC sub-header 320 is sub-header for PHR MAC CE (control element). The second MAC sub-header 320 includes LCID (Logical Channel ID) (e.g., LCID value "11001") indicating that the extended PHR is included in the MAC payload and L that is a value indicating the size of PHR. The LCID value denotes whether activation/deactivation is included in the MAC payload.

The extended PHR MAC control information 310 includes PCell Type2 PH, PCell Type1 PH, and SCell PHs. As shown in FIG. 3B, in the continuous bytes, the extended PHR MAC control information 310 includes, as the PH information of each cell, PCell's Type 2 PH→PCell's Type 1 PH→first SCell's PH→second SCell's PH→third SCell's PH→fourth SCell's PH→, . . . . The extended PHR MAC control information always includes the PH information on the PCell, and which SCell the included PH information is about is indicated by the 'C' field.

Figure 4:
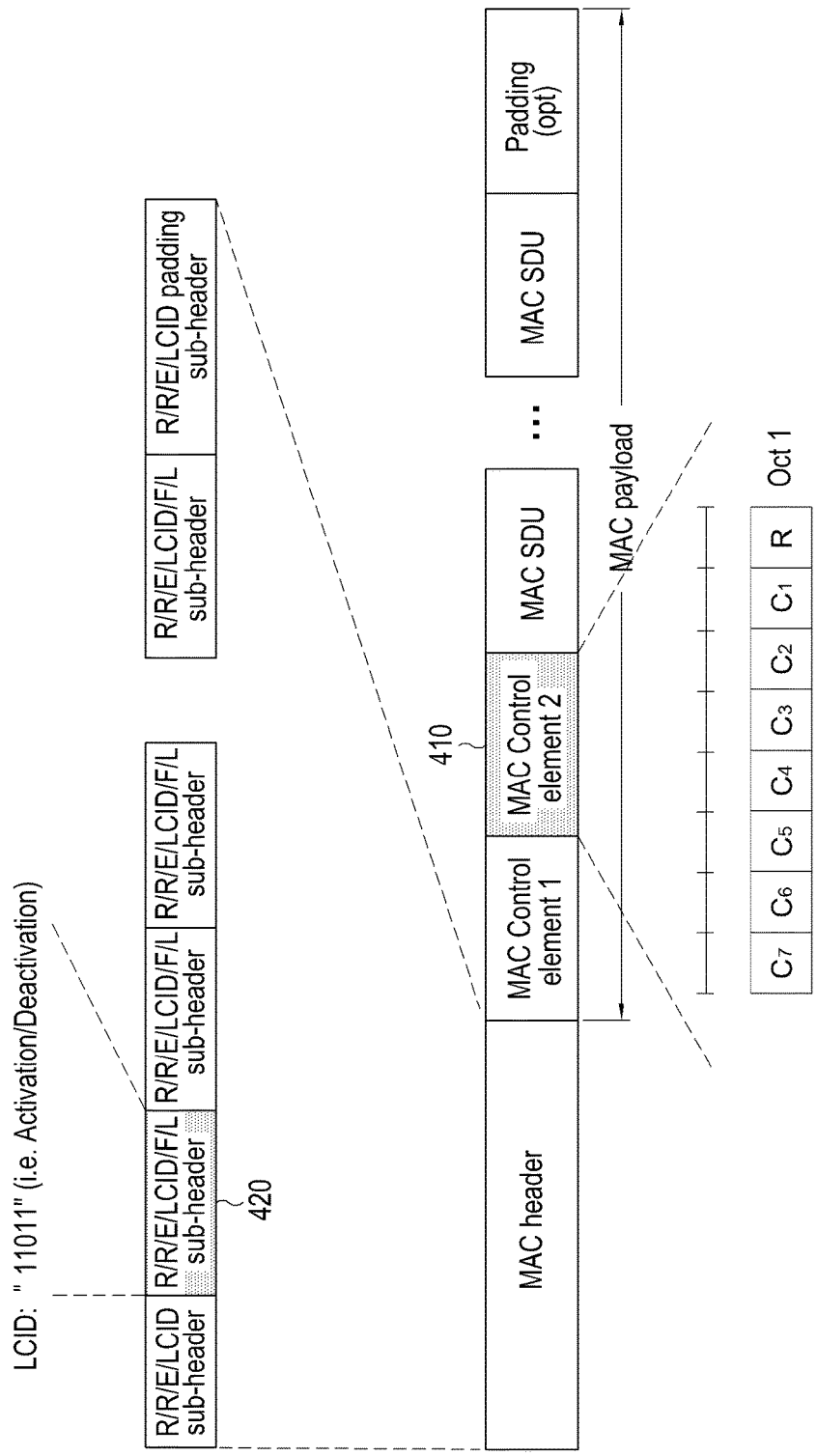
FIG. 4 is a view illustrating an example of an activation/deactivation MAC control information format.

FIG. 4 is a view illustrating a second embodiment of the activation/deactivation MAC control information format.

The second MAC sub-header 420 includes an LCID (e.g., LCID value "11001") indicating that the extended PHR is included in the MAC payload and L that is a value indicating the size of PHR. The LCID value denotes whether activation/deactivation is included in the MAC payload.

The definition of each field in the MAC subheader is as follows. See 3GPP standard TS36.321 for details.

The MAC header is of variable size and consists of the following fields,

LCID: The Logical Channel ID field identifies the logical channel instance of the corresponding MAC SDU or the type of the corresponding MAC control element or padding as described in tables 6.2.1-1, 6.2.1-2 and 6.2.1-4 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits, L: The Length field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field, F: The Format field indicates the size of the Length field as indicated in table 6.2.1-3. There is one F field per MAC PDU subheader except for the last subheader and subheaders corresponding to fixed-sized MAC control elements. The size of the F field is 1 bit. If the size of the MAC SDU or variable-sized MAC control element is less than 128 bytes, the value of the F field is set to 0, otherwise it is set to 1, E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte, R: Reserved bit, set to "0".

The MAC header and subheaders are octet aligned.

Meanwhile, the table indicating LCID for DL-SCH is as follows.

TABLE 1

| Index | LCID values |
| --- | --- |
| 00000 | CCCH |
| 00001-01010 | Identity of the logical channel |
| 01011-11001 | Reserved |
| 11010 | Long DRX Command |
| 11011 | activation/deactivation |
| 11100 | UE Contention Resolution Identity |
| 11101 | Timing Advance Command |
| 11110 | DRX Command |
| 11111 | Padding |

Referring to Table 1, the LCID value of 11011 denotes whether activation/deactivation is included in the MAC payload.

The table indicating LCID for UL-SCH is as follows.

TABLE 2

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

The table indicating F field is as follows.

TABLE 3

| Index | Size of Length field (in bits) |
|---|---|
| 0 | 7 |
| 1 | 15 |

Each field included in the extended PHR is now described. See 3GPP standard TS36.321 for details.

The Extended Power Headroom Report(PHR) MAC control element is identified by a MAC PDU subheader with LCID as specified in table 6.2.1-2. It has a variable size and is defined in FIG. 6.1.3.6a-2. When Type 2 PH is reported, the octet containing the Type 2 PH field is included first after the octet indicating the presence of PH per SCell and followed by an octet containing the associated $P_{CMAX,c}$ field (if reported). Then follows in ascending order based on the ServCellIndex [8] an octet with the Type 1 PH field and an octet with the associated $P_{CMAX,c}$ field (if reported), for the PCell and for each SCell indicated in the bitmap.

The Extended PHR MAC Control Element is defined as follows, $C_i$: this field indicates the presence of a PH field for the SCell with SCellIndex i as specified in [8]. The $C_i$ field set to "1" indicates that a PH field for the SCell with SCellIndex i is reported. The $C_i$ field set to "0" indicates that a PH field for the SCell with SCellIndex i is not reported, R: reserved bit, set to "0", V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted, Power Headroom(PH): this field indicates the power headroom level. The length of the field is 6 bits. The reported PH and the corresponding power headroom levels are shown in Table 6.1.3.6-1(the corresponding measured values in dB can be found in subclause 9.1.8.4 of [9]), P: this field indicates whether the UE applies power backoff due to power management (as allowed by P-MPR$_c$ [10]). The UE shall set P=1 if the corresponding $P_{CMAX,c}$ field would have had a different value if no power backoff due to power management had been applied, $P_{CMAX,c}$: if present, this field indicates the $P_{CMAX,c}$ or $\tilde{P}_{CMAX,c}$[2] used for calculation of the preceding PH field. The reported $P_{CMAX,c}$ and the corresponding nominal UE transmit power levels are shown in Table 6.1.3.6a-1(the corresponding measured values in dBm can be found in subclause 9.6.1 of [9]).

Meanwhile, ServCellIndex applies integer '0' for PCell, and SCellIndex value assigned when the base station adds or varies a particular Scell through RRC (Radio Resource Control) control message applies for SCell. As an example of RRC control message to add or vary particular SCell, RRCConnectionReconfiguration message may come in use, and of the following ASN.1 code, the underlined portion shows details of signaling for how SCellIndex is set up when a particular SCell is added or varied in ServCellIndex information and RRCConnectionReconfiguration message. SCellIndex is assigned an integer from one to seven. See 3GPP standard TS36.331 for details.

ServCellIndex is defined as follows.

ServCellIndex

The IE ServCellIndex concerns a short identity, used to identify a serving cell (i.e. the PCell or an SCell). Value 0 applies for the PCell, while the SCellIndex that has previously been assigned applies for SCells.

ServCellIndex information element is defined as follows.

ServCellIndex Information Element

TABLE 4

| -- ASN1START | |
| ServCellIndex-r10 „= | INTEGER(0..7) |
| -- ASN1STOP | |

RRCConnectionReconfiguration is defined as follows.

RRCConneetionReconfiguration

The RRCConnectionReconfiguration message is the command to modify an RRC connection. It may convey information for measurement configuration, mobility control, radio resource configuration(including RBs, MAC main configuration and physical channel configuration) including any associated dedicated NAS information and security configuration.

Signaling radio bearer, SRB1

RLC-SAP, AM

Logical channel, DCCH

Direction, E-UTRAN to UE

RRCConnectionReconfiguration message is defined in Tables 5 to 9. The following Tables 5 to 9 are a continuous table.

TABLE 5

```
-- ASN1START
RRCConnectionReconfiguration „=        SEQUENCE {
    rrc-TransactionIdentifier            RRC-TransactionIdentifier,
    criticalExtensions                   CHOICE {
        c1
    CHOICE{
            rrcConnectionReconfiguration-r8
    RRCConnectionReconfiguration-r8-IEs,
            spare7 NULL,
            spare6 NULL, spare5 NULL, spare4 NULL,
            spare3 NULL, spare2 NULL, spare1 NULL
    },
    criticalExtensionsFuture             SEQUENCE { }
    }
}
```

TABLE 6

```
RRCConnectionReconfiguration-r8-IEs „= SEQUENCE {
    measConfig                           MeasConfig
            OPTIONAL, -- Need ON
    mobilityControlInfo                  MobilityControlInfo
        OPTIONAL, -- Cond HO
    dedicatedInfoNASList
    SEQUENCE(SIZE(1..maxDRB)) OF
    DedicatedInfoNAS                     OPTIONAL, -- Cond nonHO
    radioResourceConfigDedicated         RadioResourceConfigDedicated
    OPTIONAL, -- Cond HO-toEUTRA
    securityConfigHO                     SecurityConfigHO
        OPTIONAL, -- Cond HO
    nonCriticalExtension
    RRCConnectionReconfiguration-v890-IEs   OPTIONAL
}
RRCConnectionReconfiguration-v890-IEs „= SEQUENCE {
    lateNonCriticalExtension             OCTET STRING
        OPTIONAL,
    nonCriticalExtension
    RRCConnectionReconfiguration-v920-IEs   OPTIONAL
}
RRCConnectionReconfiguration-v920-IEs „= SEQUENCE {
    otherConfig-r9                       OtherConfig-r9
            OPTIONAL, -- Need ON
    fullConfig-r9                        ENUMERATED {true}
            OPTIONAL, -- Cond HO-Reestab
    nonCriticalExtension
    RRCConnectionReconfiguration-v1020-IEs  OPTIONAL
}
```

TABLE 7

```
RRCConnectionReconfiguration-v1020-IEs „= SEQUENCE {
    sCellToReleaseList-r10               SCellToReleaseList-r10
        OPTIONAL, -- Need ON
    sCellToAddModList-r10                SCellToAddModList-r10
        OPTIONAL, -- Need ON
    nonCriticalExtension
    RRCConnectionReconfiguration-v1130-IEs  OPTIONAL
}
RRCConnectionReconfiguration-v1130-IEs „= SEQUENCE {
    systemInfomationBlockType1Dedicated-r11   OCTET
STRING(CONTAINING SystemInformationBlockType1)
        OPTIONAL, -- Need ON
    nonCriticalExtension
    RRCConnectionReconfiguration-v12xy-IEs   OPTIONAL -- Need OP
}
RRCConnectionReconfiguration-v12xy-IEs „= SEQUENCE {
    wlan-OffloadDedicated-r12                      CHOICE {
        release                                    NULL,
        setup
    SEQUENCE {
            wlan-OffloadConfig-r12            WLAN-
OffloadConfig-r12,
            t350-r12
    ENUMERATED {min5, min10, min20, min30, min60,
min120, min180, spare1}              OPTIONAL-- Need ON
        }
    }
                                         OPTIONAL, -- Need ON
    nonCriticalExtension                 SEQUENCE { }
            OPTIONAL
}
```

TABLE 8

```
SCellToAddModList-r10 „=       SEQUENCE(SIZE(1..maxSCell-r10)) OF
SCellToAddMod-r10
SCellToAddMod-r10 „=           SEQUENCE {
    sCellIndex-r10                 SCellIndex-r10,
```

TABLE 8-continued

```
    cellIdentification-r10                    SEQUENCE {
        physCellId-r10                            PhysCellId,
        dl-CarrierFreq-r10                        ARFCN-ValueEUTRA
    }                                         OPTIONAL, -- Cond SCellAdd
    radioResourceConfigCommonSCell-r10
        RadioResourceConfigCommonSCell-r10  OPTIONAL, -- Cond SCellAdd
    radioResourceConfigDedicatedSCell-r10
        RadioResourceConfigDedicatedSCell-r10   OPTIONAL, -- Cond SCellAdd2
    ...,
    [[  dl-CarrierFreq-v1090                  ARFCN-ValueEUTRA-v9e0 OPTIONAL -- Cond EARFCN-max
    ]]
}
```

TABLE 9

```
SCellToReleaseList-r10  ,,=          SEQUENCE(SIZE(1..maxSCell-r10)) OF
SCellIndex-r10
SecurityConfigHO  ,,=                SEQUENCE {
    handoverType                         CHOICE {
        intraLTE                             SEQUENCE {
            securityAlgorithmConfig
    SecurityAlgorithmConfig          OPTIONAL, -- Cond fullConfig
            keyChangeIndicator               BOOLEAN,
            nextHopChainingCount
    NextHopChainingCount
        },
        interRAT                             SEQUENCE {
            securityAlgorithmConfig
    SecurityAlgorithmConfig,
            nas-SecurityParamToEUTRA         OCTET STRING(SIZE(6))
        }
    },
    ...
}
-- ASN1STOP
```

RRCConnectionReconfiguration field is detailed in the following Tables 10 and 11.

TABLE 10

| RRCConnectionReconfiguration field descriptions |
| --- |
| dedicatedInfoNASList |
| This field is used to transfer UE specific NAS layer information between the network and the UE. The RRC layer is transparent for each PDU in the list. |
| fullConfig |
| Indicates the full configuration option is applicable for the RRC Connection Reconfiguration message. |
| keyChangeIndicator |
| true is used only in an intra-cell handover when a $K_{eNB}$ key is derived from a $K_{ASME}$ key taken into use through the latest successful NAS SMC procedure, as described in TS 33.401 [32] for $K_{eNB}$ re-keying. false is used in an intra-LTE handover when the new $K_{eNB}$ key is obtained from the current $K_{eNB}$ key or from the NH as described in TS 33.401 [32]. |
| nas-securityParamToEUTRA |
| This field is used to transfer UE specific NAS layer information between the network and the UE. The RRC layer is transparent for this field, although it affects activation of AS-security after inter-RAT handover to E-UTRA. The content is defined in TS 24.301. |
| nextHopChainingCount |
| Parameter NCC, See TS 33.401 [32] |
| t350 |
| Timer T350 as described in section 7.3. Value minN corresponds to N minutes. |

TABLE 11

| Conditional presence | Explanation |
| --- | --- |
| EARFCN-max | The field is mandatory present if dl-CarrierFreq-r10 is included and set to maxEARFCN. Otherwise the field is not present. |
| fullConfig | This field is mandatory present for handover within E-UTRA when the fullConfig is included, otherwise it is optionally present, Need OP. |
| HO | The field is mandatory present in case of handover within E-UTRA or to E-UTRA, otherwise the field is not present. |
| HO-Reestab | This field is optionally present, need ON, in case of handover within E-UTRA or upon the first reconfiguration after RRC connection re-establishment, otherwise the field is not present. |
| HO-toEUTRA | The field is mandatory present in case of handover to E-UTRA or for reconfigurations when fullConfig is included, otherwise the field is optionally present, need ON. |
| nonHO | The field is not present in case of handover within E-UTRA or to E-UTRA, otherwise it is optional present, need ON. |
| SCellAdd | The field is mandatory present upon SCell addition, otherwise it is not present. |
| SCellAdd2 | The field is mandatory present upon SCell addition, otherwise it is optionally present, need ON. |

SCellIndex is briefly described below.

SCellIndex is related to a short identifier used to identify SCell.

SCellIndex information element may be represented as in the following Table 12.

TABLE 12

```
[Table 10]
-- ASN1START
SCellIndex-r10 ,,=        INTEGER(1..7)
-- ASN1STOP
```

As set forth above, adding/varying/releasing SCell for applying CA is performed through RRCConnectionReconfiguration, an RRC control message. Although SCell is added through RRC control message, UE-specific data/control message are not communicated with the added SCell. To actually use the SCell, the base station should activate the SCell by setting the information regarding the cell in activation/deactivation MAC control information to Activation and transmitting the same. The terminal performs UE-specific data/control information communication operation in the activated SCell. Likewise, to deactivate the SCell currently active, the base station should activate the SCell by setting the information regarding the cell in activation/deactivation MAC control information to Deactivation and transmitting the same. MAC header inncludes a sub-header for activation/deactivation. In FIG. 4, it is assumed that the MAC Control element 2 410 is activation/deactivation control information, and of the MAC sub-headers, the second MAC sub-header 420 is sub-header for activation/deactivation. The second MAC sub-header 420 includes an LCID (e.g., LCID value "11011") indicating that activation/deactivation is included in the MAC payload. Since, unlike the above-described extended PHR, the activation/deactivation MAC control information has a fixed size, there is no need for the L field to indicate the size of MAC control element, and thus as MAC subheaders, R/R/E/LCID format is used. Each field included in the MAC subheaders has been described above in connection with extended PHR, and the description applies here. Each field included in the activation/deactivation MAC control information is described below. See 3GPP standard TS36.321 for details.

The activation/deactivation MAC control element is identified by a MAC PDU subheader with LCID as specified in table 6.2.1-1. It has a fixed size and consists of a single octet containing seven C-fields and one R-field. The activation/deactivation MAC control element is defined as follows (FIG. 6.1.3.8-1).

$C_i$: if there is an SCell configured with SCellIndex i as specified in [8], this field indicates the activation/deactivation status of the SCell with SCellIndex i, else the UE shall ignore the $C_i$ field. The $C_i$ field is set to "1" to indicate that the SCell with SCellIndex i shall be activated. The $C_i$ field is set to "0" to indicate that the SCell with SCellIndex i shall be deactivated, R: Reserved bit, set to "0".

Currently, the 3GPP standardization organization is discussing schemes for applying 32 serving cells to CA as a Release (Rel.) 13 technology. As per Release 12 and its precedents, up to seven SCells may be reported with extended PHR or activated/deactivated with activation/deactivation. According to an embodiment of the present disclosure, there is proposed a scheme for supporting HR and activation/deactivation in case up to N (e.g., N=32) serving cells may be applied to the maximum to CA, where N is larger than the maximum number of SCells that may be reported with legacy extended PHR or activated/deactivated with legacy activation/deactivation. The following embodiment assumes N=32, but N may have other numbers.

Figure 5A:
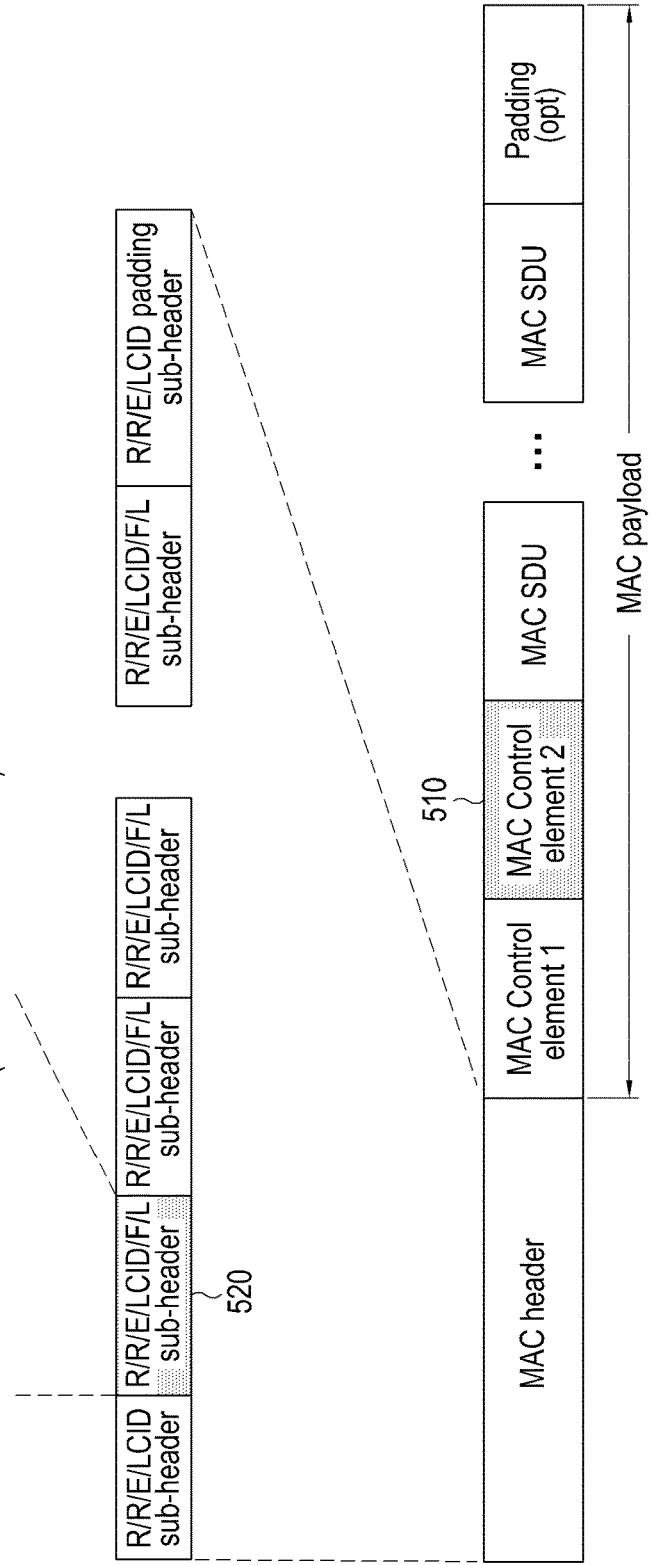
FIGS. 5A and 5B are views illustrating examples of an enhanced extended PHR control information format supporting up to 32 serving cells according to a third embodiment of the present disclosure.
Figure 5B:

FIGS. 5A and 5B are views illustrating examples of an enhanced extended PHR control information format supporting up to 32 serving cells according to a third embodiment of the present disclosure.

Enhanced extended PHR is hereinafter denoted "e-extended PHR." Referring to FIG. 5A, as the LCID included in the MAC sub-header 520, a new ID value may be defined to indicate that the MAC payload is e-extended PHR MAC control information, or a legacy ID value may be used to indicate that the MAC payload is e-extended PHR MAC control information, and the size of the e-extended PHR mAC control information may be denoted using the L field. Since presumably N=32, up to 31 SCells except PCell may be reported. Thus, i in ci field may be an integer in a range from 1 to 31.

Although FIG. 5B presumably illustrates that R field in the fourth byte is positioned at the MSB (most significant bit), R field may be alternately be positioned at LSB (least significant bit). The description of relevant parts in connection with FIGS. 3A and 3B applies to each field included in the MAC sub-header 520 and each field in e-extended PHR MAC control information. Referring to FIGS. 5A and 5B, a four-byte resource is always used for the Ci field. As an example, although CA may apply to up to 32 serving cells, CA is not always conducted with 32 serving cells. For example, only eight/16 serving cells may perform CA during a particular time period, and in such case, the remaining Ci fields except the Ci fields corresponding to SCellIndex i of the eight/16 serving cells, despite unnecessary information, should be transmitted, thus causing waste of resources. In Release 12 and its precedents, there are maximally seven Ci fields for CA, and waste of resources is not remarkable. However, use of up to 31 Ci fields would cause waste of a good deal of bit information.

Figure 6A:
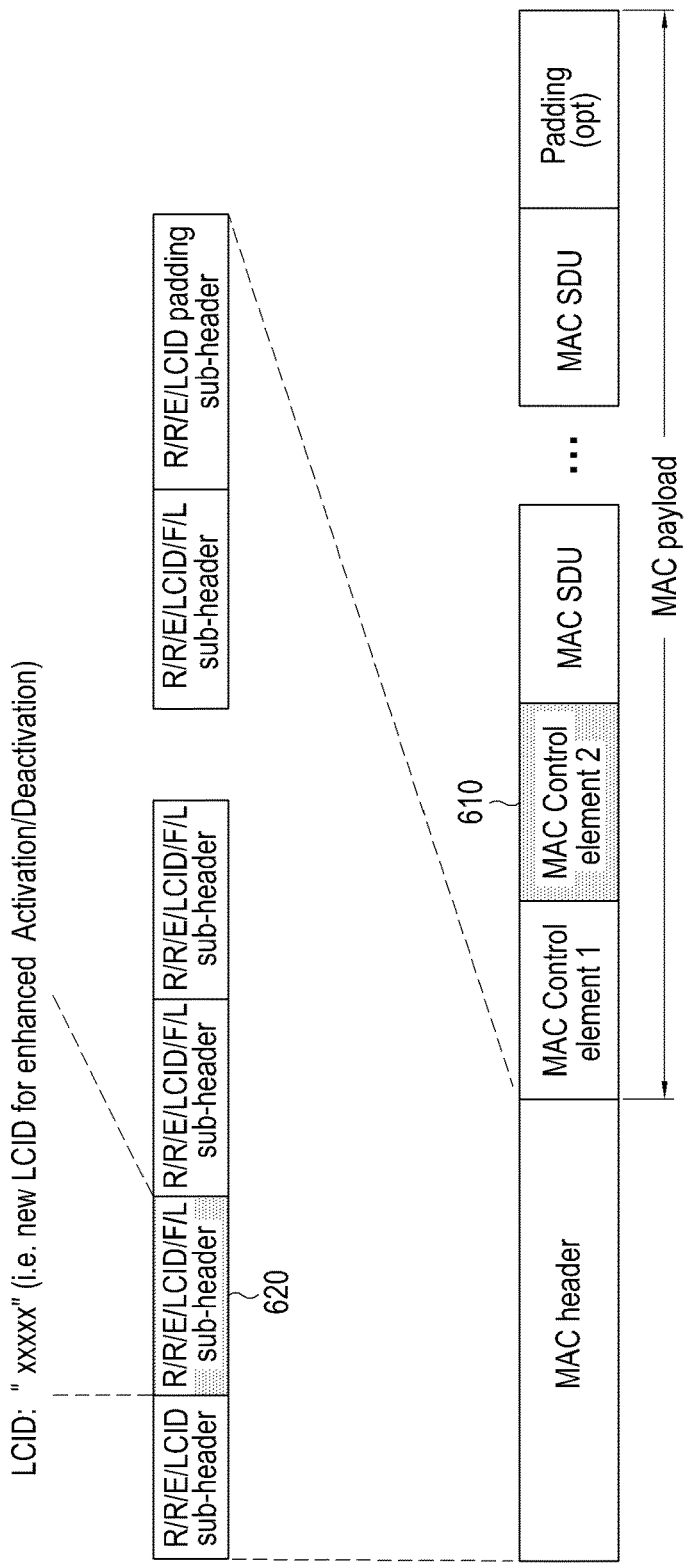
FIGS. 6A and 6B are views illustrating examples of an MAC activation/deactivation control information format.
Figures 6B, 7:
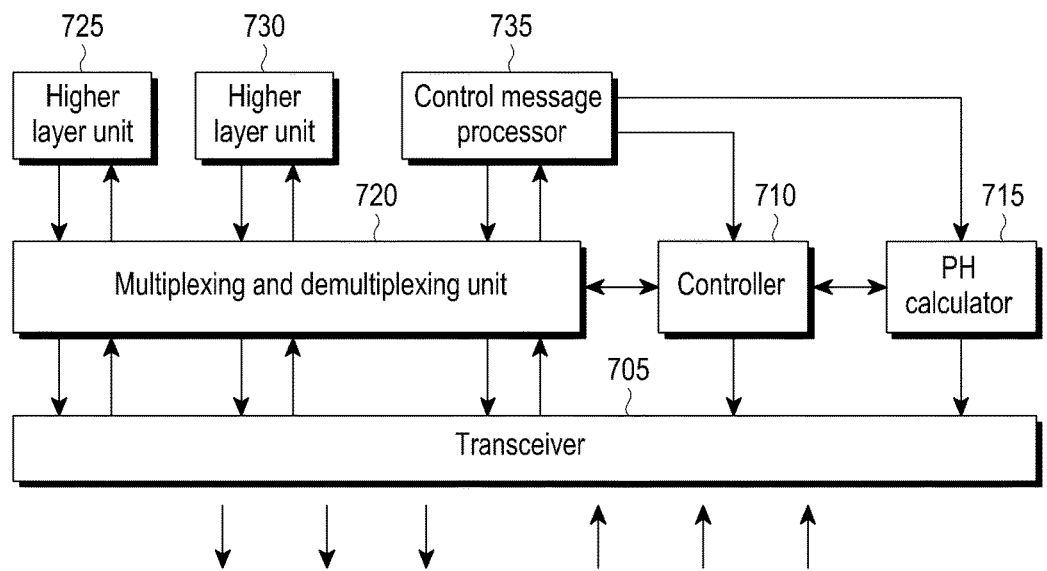
FIG. 7 is a block diagram illustrating a configuration of a terminal according to an embodiment of the present disclosure.

FIGS. 6A and 6B are views illustrating examples of an MAC activation/deactivation control information format.

The MAC activation/deactivation control information format is the same as the first byte including the Ci fields shown in FIG. 3B. The only difference lies in that in FIG. 3B Ci field value is set to 1 if PH information for SCell having corresponding SCellIndex i value is included or 0 if the PH information for SCell is not included, while in FIG. 6B it is set to 1 when the SCell having the corresponding SCellIndex i is activated and to 0 if the SCell is deactivated. That is, the scheme of adjuting the size of Ci fields proposed through FIG. 4, FIGS. 5A and 5B, and FIG. 6A and 6B and the scheme as to which SCell each CI is to be mapped/associated may apply likewise to activation/deactivation MAC control information as well. As an example, if the method described in connection with FIGS. 5A and 5B applies to activation/deactivation MAC control information, it may lead to the following embodiment of enhanced activation/deactivation MAC control information as shown in FIGS. 6A and 6B.

FIG. 7 is a block diagram illustrating a configuration of a terminal according to an embodiment of the present disclosure.

The terminal includes a transceiver 705, a PH calculator 715, a controller 710, a multiplexing and demultiplexing unit 720, a control message processor 735, and various higher layer units 725 and 730. The transceiver 705 receives data and a predetermined control signal through a forward carrier and transmits data and a predetermined control signal through a backward carrier. When multiple carriers are aggregated, the transceiver 705 conducts communication of data and control signals through the multiple carriers. The controller 710 instructs the multiplexing and demultiplexing unit 720 to configure MAC PDU according to scheduling information indicated by a control signal, e.g., a backward grant, provided from the transceiver 705. Further, the controller 710 determines whether to trigger PHR, and if PHR is triggered, instructs the PH to calculate available transmit power. Whether PHR is triggered is determined using a PHR parameter transferred from the control message processor 735. The controller 710 generates the PHR using the available transmit power transferred from the PH calculator 715 and transfers the same to the multiplexing and demultiplexing unit 720. The PH calculator 715 computes the available transmit power under the control of the controller 710 and transfers the computed value to the controller 710. The multiplexing and demultiplexing unit 720 multiplexes data generated in the higher layer units 725 and 730 or the control message processor 735 or demultiplexes data received from the transceiver 705 and transfers the resultant data to a proper higher layer unit 725 and 730, or the control message processor 735. The control message processor 735 processes control messages received from the network and performs necessary operations. For example, the control message processor 735 transfers the PHR parameters contained in the control message to the controller 710 or transfers information on carriers newly activated to the transceiver 705 so that the carriers are configured in the transceiver 705. The higher layer units 725 and 730 may be configured per service, and may process data generated in a user service such as file transfer protocol (FTP) or voice over Internet protocol (VoIP) to transfer the same to the multiplexing device or processes data transferred from the demultiplexing unit to transfer the same to a higher layer's service application.

Figure 8:
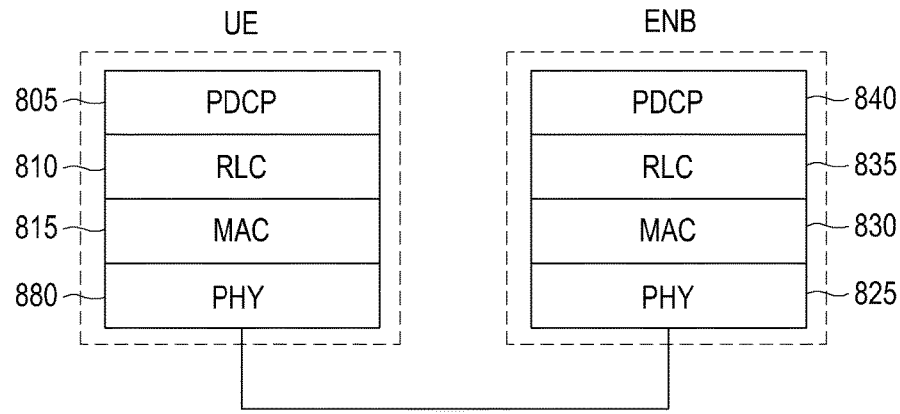
FIG. 8 is a view illustrating the radio protocol structure in an LTE system according to an embodiment of the present disclosure.

FIG. 8 is a view illustrating the radio protocol structure in an LTE system according to an embodiment of the present disclosure. The LTE system wireless protocol includes packet data convergence protocols (PDCPs) 805 and 840, radio link controls (RLCs) 810 and 835, and medium access controls (MACs) 815 and 830 for the UE and ENB, respectively. The PDCPs 805 and 840 are in charge of an operation such as compression/restoration. The RLCs 810 and 835 reconfigure packet data units (PDUs) into a proper size and perform ARQ operations. The MACs 815 and 830 are connected to several RLC layer devices configured in one UE and multiplexes RLC PDUs into an MAC PDU and demultiplexes RCL PDUs from the MAC PDU. The physical layers 820 and 825 channel-code and modulate higher layer data into OFDM symbols, transmit the OFDM symbols through a wireless channel or demodulates OFDM symbols received through a wireless channel, channel-decodes and transfers the same to a higher layer unit.

Figure 9:
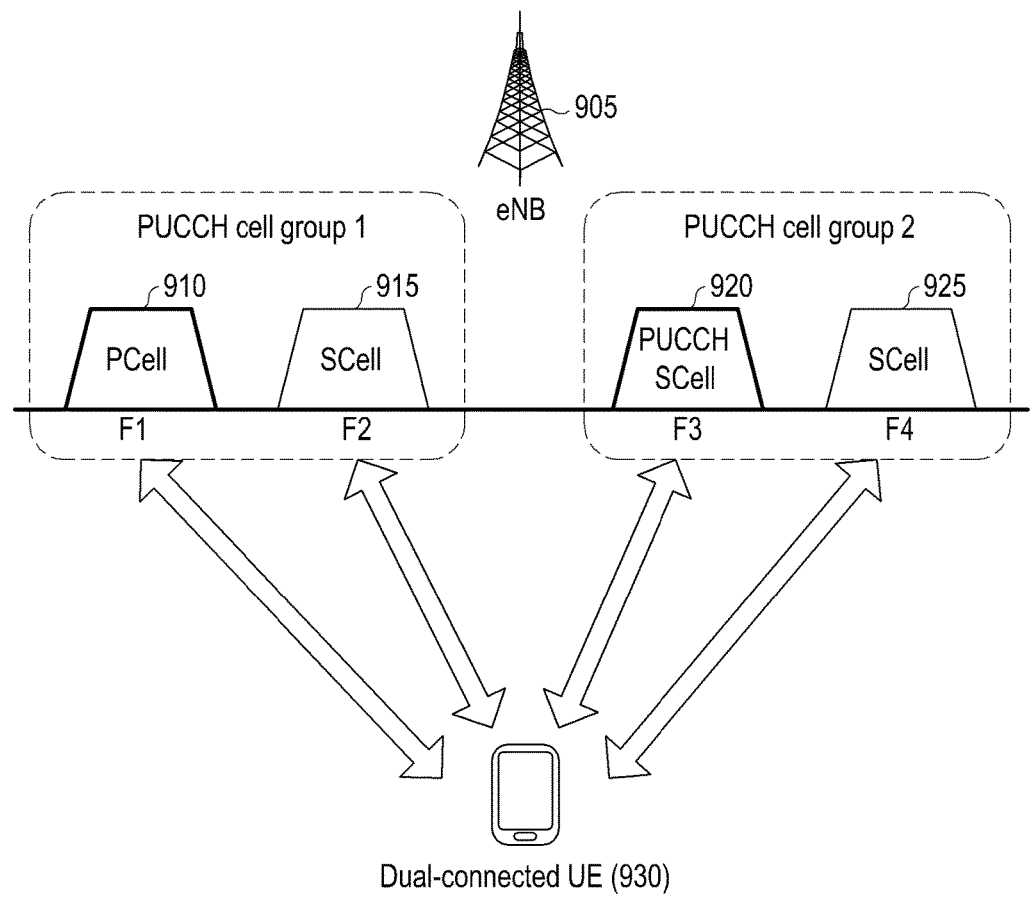
FIG. 9 is a view illustrating enhanced carrier aggregation for a terminal.

FIG. 9 is a view illustrating enhanced carrier aggregation for a terminal.

Referring to FIG. 9, one base station generally transmits and receives multiple carriers over several frequency bandwidths. For example, when the base station 905 transmits uplink carriers for four cells, one terminal conventionally communicates data using one of the plurality of cells. However, a carrier aggregation-enabled UE may communicate data from a number of carriers at the same time. The base station 905 may increase the transmission speed of the UE 930 by allocating more carriers to the carrier aggregation-enabled UE 930 depending on circumstances. When one forward carrier and one backward carrier transmitted and received by one base station constitute one cell, carrier aggregation may be appreciated as a UE communicating data through several cells at the same time. Accordingly, a maximum transmission speed is increased in proportion to the number of carriers aggregated. In LTE Rel-10 carrier aggregation technology, up to five cells may be configured in one terminal. Among the configured cells, one cell should have PUCCH, and this cell is called a primary cell (PCell), and the remaining cells with no PUCCH are called secondary cells (SCells). The PCell, on top of the feature of having PUCCH, should be able to perform all of the normal serving cell functions such as handover and radio link fail (RLF). Hereinafter, in embodiments of the present disclosure, a "UE receives data through a forward carrier or transmits data through a backward carrier" also means that "data is communicated using a control channel and data channel corresponding to a frequency band and center frequency specifying the carriers. Further, although the following embodiments assume LTE systems for the purpose of description, the present disclosure may also be applicable to various wireless communication systems supporting carrier aggregation. In the Rel-10 carrier aggregation technology, only PCell may have PUCCH. However, under the circumstance where more information should be delivered through PUCCH to the base station, heavy load may be posed to processing the information only through a single PUCCH. In particular, the plan of supporting up to 32 carriers in LTE Rel-13 is not being discussed, and allowing SCell, as well as Pcell, to have PUCCH provides benefits, e.g., mitigating PUCCH load. Accordingly, the plan of introducing PUCCH to SCell as well as Pcell is being proposed. For example, as shown in FIG. 9, one SCell 920 may add PUCCH. According to the present disclosure, the SCell having PUCCH is called PUCCH SCell. Conventionally, all, PUCCH-related signaling is delivered through Pcell to the base station. However, since there are now a plurality of PUCCHs, it should be needed to differentiate which PUCCH is used to transfer the PUCCH signaling of each SCell to the base station. Assuming that there are two PUCCHs as shown in FIG. 9, there are distinguished a group 935 of cells using the PUCCH of the Pcell and a group of cells using the PUCCH of a particular SCell. According to the present disclosure, such group is called a PUCCH cell group.

Figure 10:
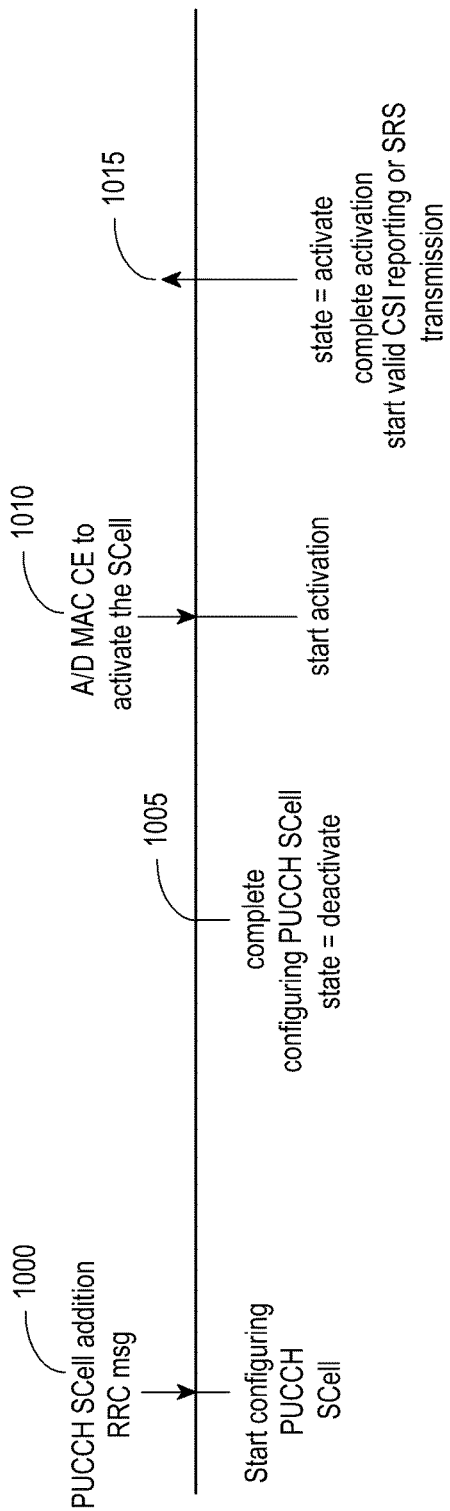
FIG. 10 is a view illustrating a process of activating PUCCH SCell when following a normal SCell activation process.

FIG. 10 is a view illustrating a process of activating PUCCH SCell when following a normal SCell activation process.

The terminal receives an RRC message instructing to add a PUCCH SCell from the base station (1000). Here, the terminal configures the PUCCH SCell. When the terminal completes the configuration of the PUCCH SCell, the PUCCH SCell is in a deactivated state (1005). Thereafter, upon reception of activation/deactivation MAC control element (CE) ("A/D MAC CE") from the base station, the terminal activates the PUCCH SCell (1010). Here, the base station cannot send the A/D MAC CE to the terminal right after completing the configuration. This is why it cannot be aware exactly when the terminal finishes preparing to receive the A/D MAC CE. Considering this, the base station thus sends the A/D MAC CE to the terminal in a predetermined time margin. The terminal, upon completing the activation of the PUCCH SCell, reports the valid CSI for the SCell and transmits the SRS (1015). After completing the activation, the base station is not aware when the terminal starts to report the CSI and transmit the SRS. Accordingly, the base station performs blind decoding until such pieces of information are received. This brings the base station to more complexity. Upon failure of uplink sync, the base station additionally instructs the terminal to perform random access through a PDCCH order. In such case, a more delay occurs to the CSI reporting and SRS transmission.

Figure 11:
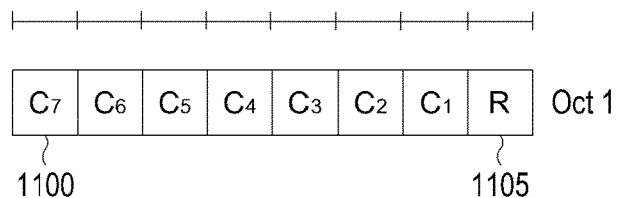
FIG. 11 is a view illustrating an example of a legacy A/D MAC CE format.

FIG. 11 is a view illustrating an example of a legacy A/D MAC CE format.

The A/D MAC CE has a fixed size and includes seven Ci fields 1100 and one reserved (R) field 1105. The base station transmits the A/D MAC CE to activate or deactivate the SCells configured for one terminal. Each Ci field corresponds to one SCell. That is, one Ci field corresponds to an SCell denoted with SCellIndex i. The value being 1 indicates to activate the corresponding SCell, and the value of 0 indicates to deactivate the corresponding SCell.

Figure 12:
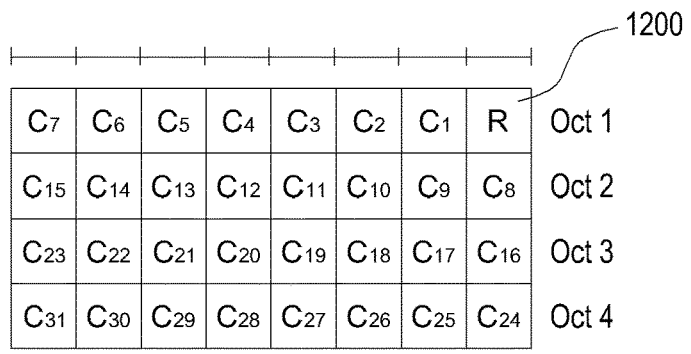
FIG. 12 is a view illustrating an example of an extended A/D MAC CE format for supporting up to 32 serving cells.
Figure 12:
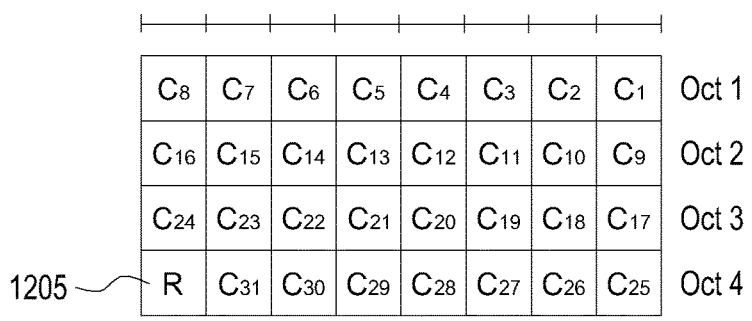

FIG. 12 is a view illustrating an example of an extended A/D MAC CE format for supporting up to 32 serving cells.

Since the legacy A/D MAC CE format has seven Ci fields, it may represent up to seven serving cells. Accordingly, as the number of serving cells rises up to 32, all of the serving cells cannot be represented. Thus, a four-byte A/D MAC CE is newly defined. Since the Pcell is always in the activated state, it is excluded from the A/D MAC CE. Accordingly, information regarding activation or deactivation may be given to a total of 32 serving cells. There may be various extended A/D MAC CE formats depending on the position of the R bit. FIG. 12(a) or 12(b) shows an example. When the first byte is identical to the legacy A/D MAC CE, it would have the form shown in FIG. 12(a). Otherwise, when the R bit is positioned in the last byte stream, it would have the form shown in FIG. 12(b). According to the present disclosure, the description is based on FIG. 12(a). Each Ci field corresponds to one SCell. Also, one Ci field corresponds to an SCell denoted with SCellIndex i.

Since the extended A/D MAC CE has a size four times that of the legacy A/D MAC CE, even when the terminal is capable of supporting up to 32 serving cells, always using the extended A/D MAC CE would not be preferable in a signaling overhead point of view. Accordingly, according to an embodiment of the present disclosure, whether to use the extended A/D MAC CE is determined depending on the number of configured SCells. Further, the SCells may be classified in various types. As an example, there may be not only normal SCells, but also PUCCH SCells enabling PUCCH transmission, licensed-assisted access (LAA) SCells using unlicensed frequency bands (industrial scientific medical (ISM) bands), or Wi-Fi SCells in the LTE Wi-Fi integration technology. According to an embodiment of the present disclosure, it is assumed that activation or deactivation does not apply to Wi-Fi SCells.

Figure 13:
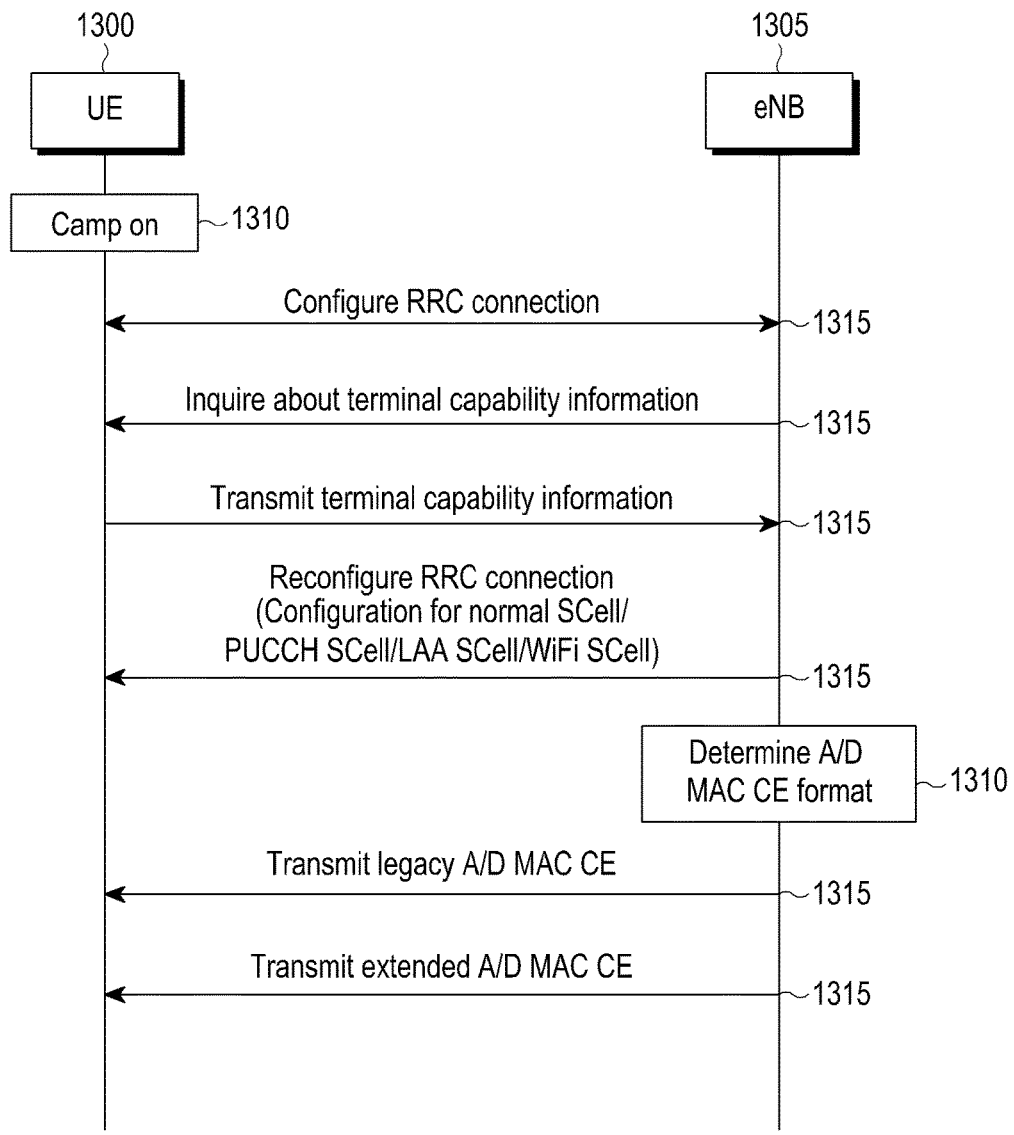
FIG. 13 is a view illustrating a method for selecting a normal or extended A/D MAC CE according to an embodiment of the present disclosure.

FIG. 13 is a view illustrating a method for selecting a normal or extended A/D MAC CE according to an embodiment of the present disclosure.

The terminal 1300 camps on one serving cell (1310). The "camps on" means that the terminal 1300 syncs with the base station 1305 is in a communicable state for basic control information for communication with the base station on a particular frequency band through the process of receiving master information block (MIB) such as physical broadcast channel (PBCH) and system information block (SIB) such as physical downlink shared channel (PDSCH).

The terminal performs an RRC connection configuration process to the base station 1305 for data communication (1315). The base station sends a request for capability information to the terminal (1320). The terminal transmits its capability information to the base station (1325). The capability information may include information as to whether the terminal may support up to 32 serving cells which are more than, conventionally, five serving cells. Further, the capability information may include capability information as to whether it may support LAA and LTE-Wi-Fi integration. When obtaining the terminal capability information, the base station reconfigures the RRC connection for the terminal based on the information (1330). The reconfiguration information may include configuration information on normal SCell, PUCCH SCell, LAA SCell, and Wi-Fi SCell. The terminal receives an RRC connection reconfiguration message including the configuration information and then identifies configuration information regarding various types of SCells. When configured, it configures normal SCell, PUCCH SCell, and LAA SCell and deems the cells as deactivated. In contrast, it completes the association/authentication procedure for the Wi-Fi SCell and deems the Wi-Fi server as activated. The base station determines the A/D MAC CE format to be used to activate or deactivate at least one SCell for the terminal as per predetermined rules (1335). The predetermined rules are as follows.

A first rule: When the number of the remaining SCells other than the Wi-Fi SCell is seven or less, the legacy A/D MAC CE format is used. Otherwise, when the number of the remaining SCells exceeds seven, the extended A/D MAC CE format is used.

A second rule: When the highest SCellIndex value of the remaining SCells other than the Wi-Fi SCell is seven or less, the legacy A/D MAC CE format is used. Otherwise, when the highest SCellIndex value exceeds seven, the extended A/D MAC CE format is used.

The A/D MAC CE format to be used to activate or deactivate at least one SCell for the terminal may be determined by applying at least one of the two rules.

The two A/D MAC CE formats may have the same or different LCIDs. When the two formats use the same LCID, the terminal is previously aware what type of A/D MAC CE format is to be received considering the type and number of SCells configured therein. When the two formats use different LCIDs, the terminal may be aware whether the legacy A/D MAC CE format or the extended A/D MAC CE format directly through the LCIDs. After determining one format using the above rules, the base station transmits the A/D MAC CE to the terminal (1340 and 1345). For example, upon selecting the legacy A/D MAC CE, the base station transmits the legacy A/D MAC CE to the terminal (1340), and upon selecting the extended A/D MAC CE, the base station transmits the extended A/D MAC CE to the terminal (1345).

Figure 14:
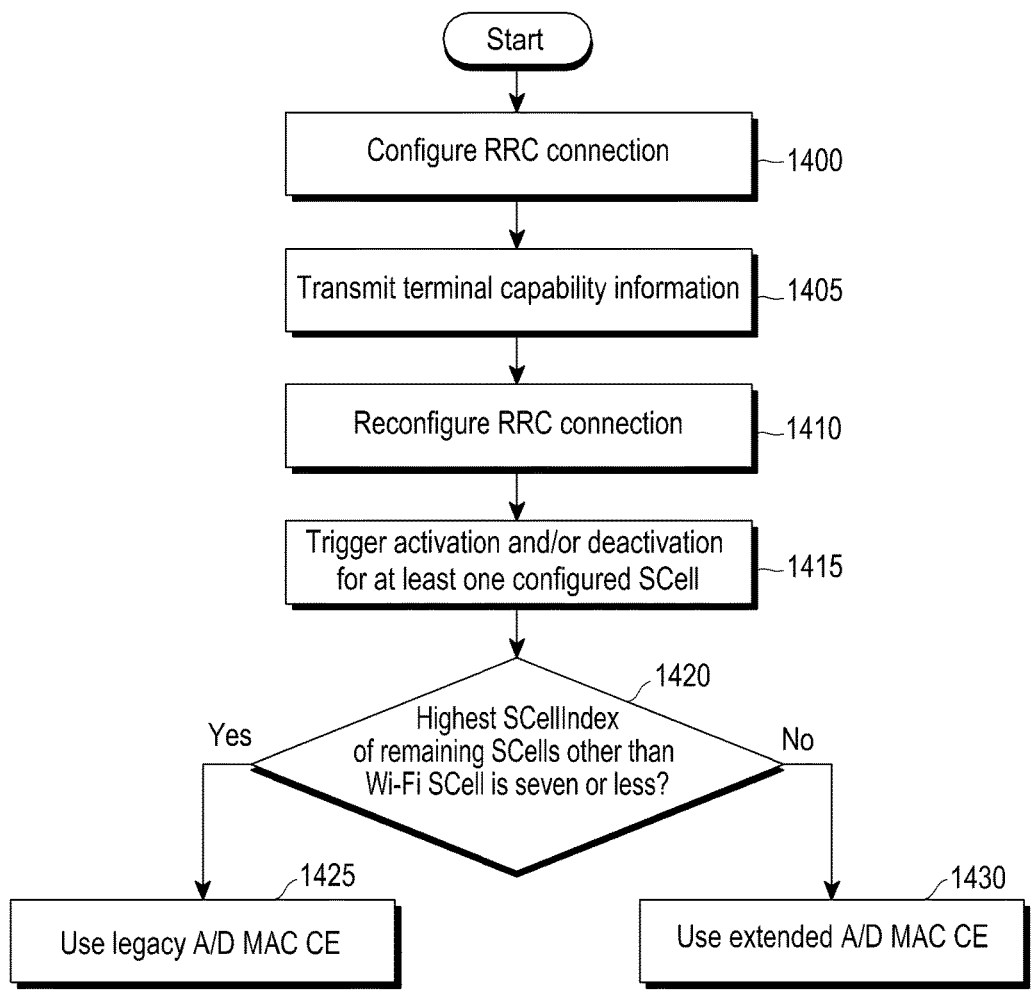
FIG. 14 is a flowchart illustrating an operation of a base station according to an embodiment of the present disclosure.

FIG. 14 is a flowchart illustrating an operation of a base station according to an embodiment of the present disclosure.

The base station performs an RRC connection establishment process with the terminal for data communication (1400). The base station obtains terminal capability information from the terminal (1405). The base station transmits an RRC connection reconfiguration message to the terminal for reconfiguration (1410). The RRC message may include information necessary to configure a plurality of SCells in the terminal. The configuration information may include configuration information on normal SCell, PUCCH SCell, LAA SCell, and Wi-Fi SCell. The base station triggers activation or deactivation for at least one of the SCells configured in the terminal (1415). The base station determines whether to use the legacy A/D MAC CE or extended A/D MAC CE under predetermined rules (1420). For example, when the highest SCellIndex value of the remaining SCells other than the Wi-Fi SCell is seven or less, the legacy A/D MAC CE format is used (1425). Otherwise, when the highest SCellIndex value is more than seven, the extended format is used (1430).

Figure 15:
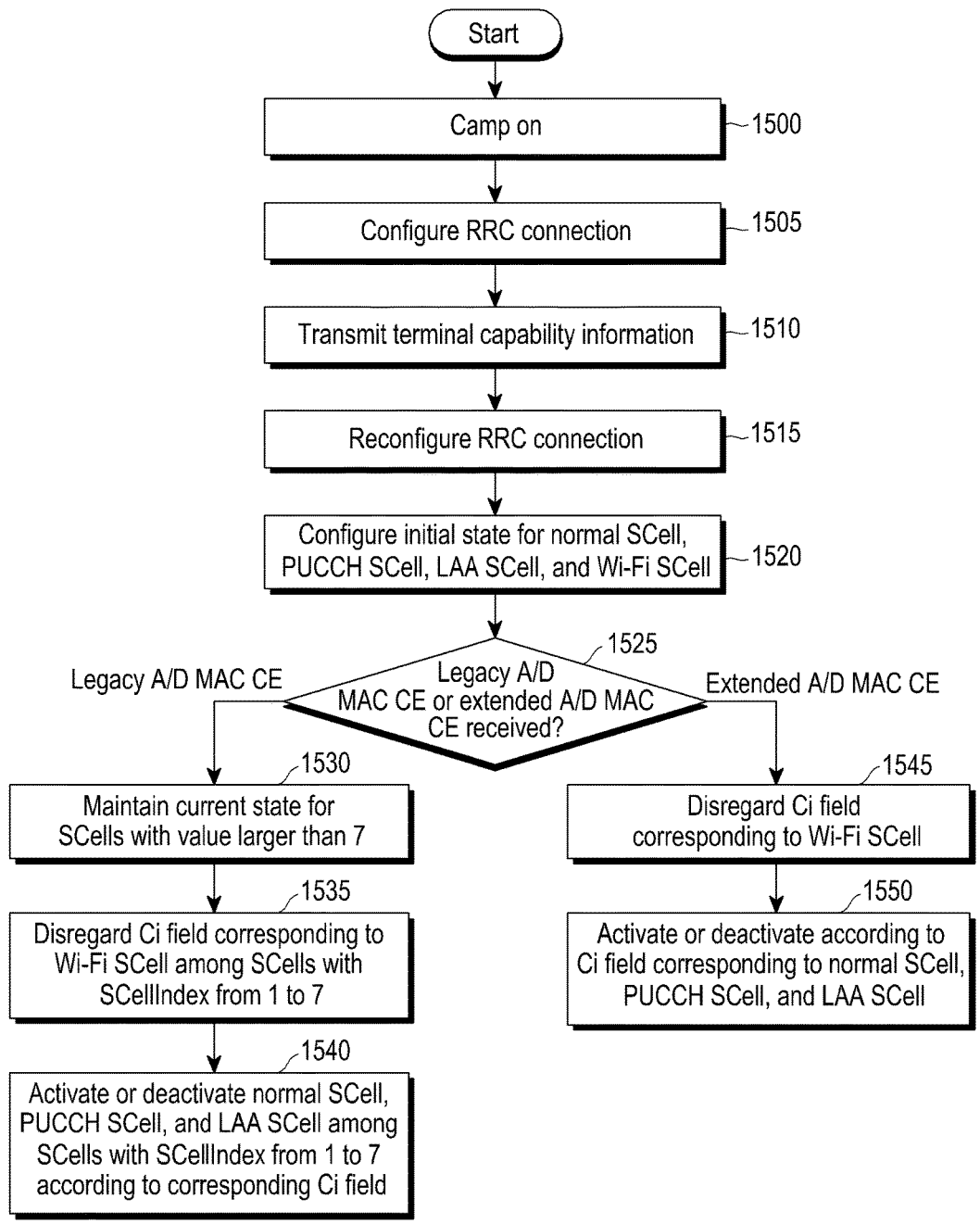
FIG. 15 is a flowchart illustrating an operation of a terminal according to a first embodiment of the present disclosure.

FIG. 15 is a flowchart illustrating an operation of a terminal according to a first embodiment of the present disclosure.

The terminal camps on one serving cell (1500). The terminal performs an RRC connection configuration process with the base station for data communication (1505). The terminal transmits its capability information to the base station (1510). The terminal receives an RRC connection reconfiguration message from the base station (1515). The RRC message may include information necessary to configure a plurality of SCells in the terminal. The configuration information may include configuration information on normal SCell, PUCCH SCell, LAA SCell, and Wi-Fi SCell. The terminal applies the received configuration information and configures normal SCell, PUCCH SCell, and LAA SCell, and then deems the cells as deactivated (1520). In contrast, the terminal completes the association/authentication procedure for the Wi-Fi SCell and deems the Wi-Fi server as activated. The terminal receives the A/D MAC CE indicating whether at least one of the SCells configured in the terminal is activated or deactivated and determines whether the A/D MAC CE is the legacy A/D MAC CE or the extended A/D MAC CE (1525). When the terminal receives the legacy A/D MAC CE, the terminal maintains the current state (activated or deactivated state) for the SCells with an SCellIndex value larger than seven (1530). For the SCells with an SCellIndex value from one to seven, the terminal disregards the Ci field corresponding to the Wi-Fi SCell and maintains the current state of the Wi-Fi SCell (1535). For the SCells with an SCellIndex value from one to seven, the terminal activates or deactivates the normal SCell, PUCCH SCell, and LAA SCell according to the corresponding Ci field (1540).

When the terminal receives the extended A/D MAC CE, the terminal disregards the Ci field corresponding to the Wi-Fi SCell and maintains the current state (1545). The terminal activates or deactivates the normal SCell, PUCCH SCell, and LAA SCell according to the Ci fields corresponding to thereto (1550).

Figure 16:
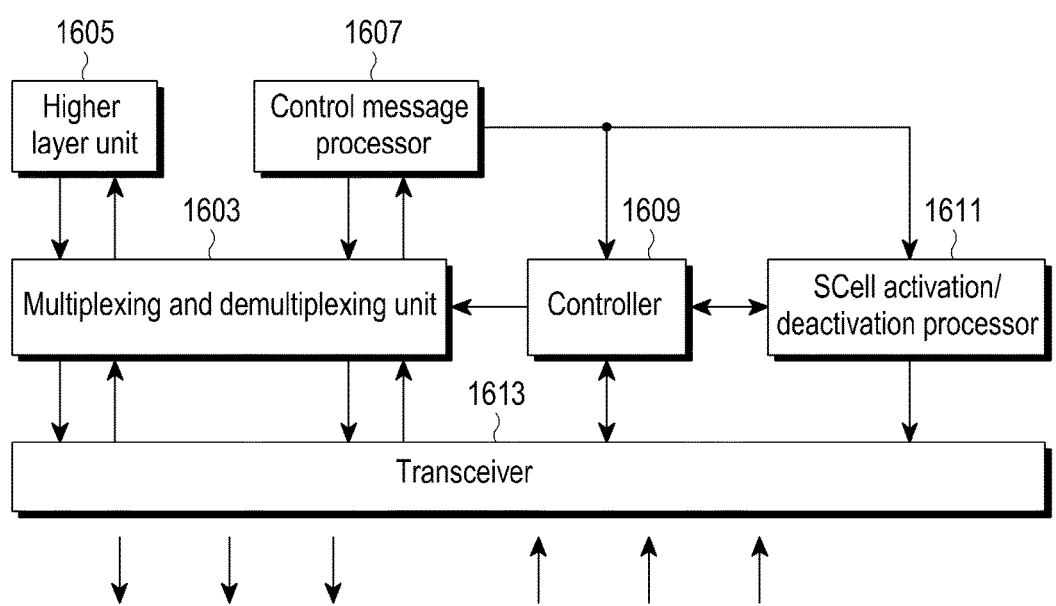
FIG. 16 is a block diagram illustrating a configuration of a terminal according to an embodiment of the present disclosure.

FIG. 16 is a block diagram illustrating a configuration of a terminal according to an embodiment of the present disclosure.

The terminal communicates, e.g., data with a higher layer unit 1605, communicates control messages through a control message processor 1607, and the terminal, upon transmission, multiplexes data through a multiplexer 1603 under the control of the controller 1609 and then transmits the data through a transmitter, and the terminal, upon reception, receives physical signals through a receiver under the control of the controller 1609 and then demultiplexes the received signals through a demultiplexer 1603 and transfers the signals to the higher layer unit 1605 or control message processor 1607 according to each message information.

The transceiver 1613 receives data and a predetermined control signal through a forward carrier and transmits data and a predetermined control signal through a backward carrier.

According to the present disclosure, when the control message controller 1607 receives the A/D MAC CE, it provides the same to the SCell activation/deactivation processor 1611.

The SCell activation/deactivation processor 1611 maintains the current state (activated or deactivated state) for the SCells with an SCellIndex value larger than seven if the received A/D MAC CE is the legacy A/D MAC CE. The SCell activation/deactivation processor 1611 disregards the Ci field corresponding to the Wi-Fi SCell for the SCells with an SCellIndex value from one to seven and maintains the current state of the Wi-Fi SCell. Further, the SCell activation/deactivation processor 1611 activates or deactivates the normal SCell, PUCCH SCell, and LAA SCell according to the corresponding Ci field (1540) among the SCells with an SCellIndex value from one to seven.

When the received A/D MAC CE is the extended A/D MAC CE, the SCell activation/deactivation processor 1611 disregards the Ci field corresponding to the Wi-Fi SCell and maintains the current state. The SCell activation/deactivation processor 1611 activates or deactivates the normal SCell, PUCCH SCell, and LAA SCell according to the Ci field corresponding thereto.

Meanwhile, radio communication technology has sharply advanced, and accordingly, communication system techniques have evolved over and over. Among them, the LTE system standardized by the 3GPP standardization organization gains more attention as 4th-generation mobile communication technology.

The LTE system has adopted techniques to support various types of terminals, and the technology for supporting machine type communication (MTC) terminals is among them. MTC terminal refers to, e.g., a machine that may perform communication on its own (e.g., at a predetermined time every month) rather than directly manipulated by a human, such as an electricity or water meter for billing, and such terminal commonly means devices to which access may be attempted with lower priority as in the above examples.

Among MTC terminals, terminals used for such purposes as those of the meter oftentimes do not require high-capability data transmission and may have lower transmit power. Further, although having the same reception capability, such terminals may be placed in an area with poor communication environment, such as basement or storage room. This led to the need of putting separate types of terminals having a coverage extension or extended coverage (hereinafter, CE) to address the lower transmit power and lower transmission speed issue. In case an MTC terminal needs broader coverage, aa separate additional transmission method (e.g., repetitive transmission) should be applied to all data communicated with the terminal using CE mode. For example, the network broadcasts system information necessary for the terminal to access. Such system information should be inevitably received by the MTC terminal requiring broader coverage. Thus, there is a need of broadcasting the system information through a method different from those of existing technology.

Further, MTC terminals may adopt a narrow frequency band of 1.4 MHz for lower-price supply. Existing LTE frequency bands may be set in various ranges, from 1.4 MHz up to 20 MHz. Generally, a 10 MHz frequency band is primarily used to increase system capability and data rate. Accordingly, a need exists for a method for serving MTC terminals supporting only 1.4 MHz frequency band even in the 10 MHz frequency band.

According to an embodiment of the present disclosure, there are provided a method and apparatus for performing machine-type communication. The MTC terminal is characterized to support coverage extension and use the 1.4 MHz frequency band. According to the present disclosure, a method of supporting access of MTC terminal is proposed considering the above features.

The MTC terminal should be supplied at a lower price, and thus, it is highly likely to be equipped with a lower-capability receiver. Further, the MTC terminal may be installed in an area where it is difficult for common users to access according to purposes of use. This means that it may be placed out of existing LTE coverage that is configured considering the distribution of common users or track along which they move. Accordingly, coverage needs to be extended for MTC terminal. Despite the above-enumerated causes, a method for extending coverage is to increasing the rate of successful reception by repeatedly transmitting the same data. All signals, such as control channel or data channel, as well as system information broadcast by the base station would be repetitively transmitted.

Here, repeating existing system information and channels would be very inefficient and would not be compatible with normal terminals. Accordingly, there is a need for a separate method for MTC terminals only while considering compatibility with normal terminals.

Figure 17:
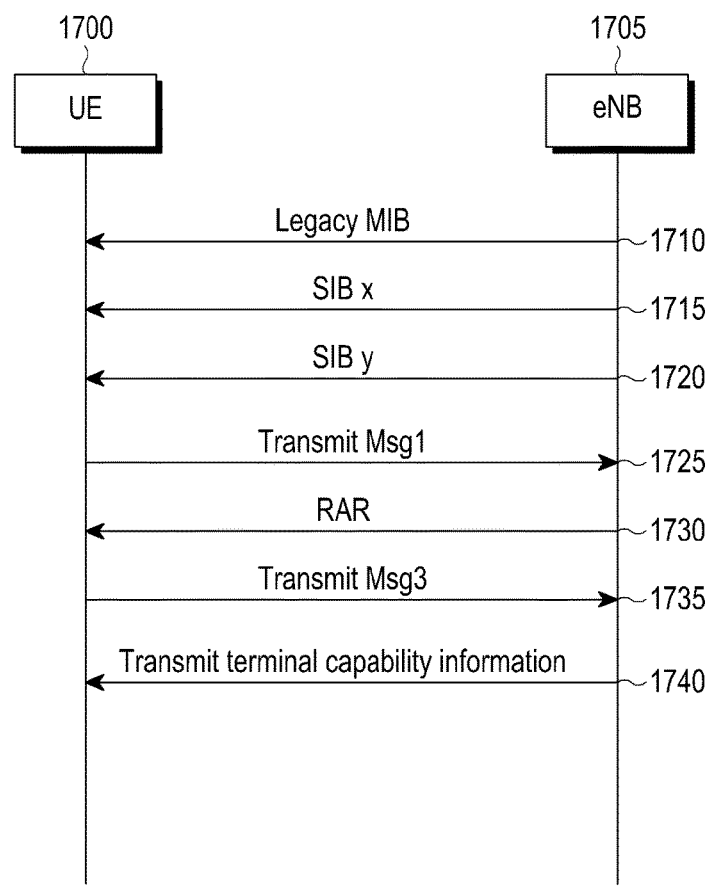
FIG. 17 is a view illustrating a process of obtaining system information from a base station and performing access by a machine-type communication device.

FIG. 17 is a view illustrating a process of obtaining system information from a base station and performing access by a machine-type communication device.

The MTC terminal 1700 receives MIB 1710 broadcast from the base station 1705. The existing MIB transmits the same information every 10 ms in a 40 ms period. That is, after the MIB is received four times in total within the 40 ms period, decoding is attempted. However, the MTC terminal, although repetitively receiving the MIB four times, would be highly likely to fail to decode it. Accordingly, more repeated transmission of the MIB is needed within 40 ms. Normal terminals receive existing MIB only as they do, and MTC terminals should receive additional repeatedly transmitted MIB as well as existing MIB. The additional MIBs repeatedly transmitted contain the same information as the existing MIB.

Further, the bits not used in the existing may be used to support the MIB terminal. The existing MIB contains downlink (DL) system frequency bandwidth, system frame number (SFN), and PHICH configuration information. The MIB includes ten bits not used, and they may be used for the MTC terminal. The following information may be included using the 10 bits.

System Capability Information an indicator indicating whether the base station may support the MTC terminal may be included. The indicator may be constituted of one or two bits.

In case the indicator is configured of one bit, if the indicator is set to TRUE, it indicates that the base station may support 1.4 MHz of the CE of the MTC terminal.

In case the indicator is configured of two bits, one of the bits indicates whether the base station may support the CE of the MTC terminal, and the other one bit indicates whether the base station may support 1.4 MHz of the MTC terminal.

CIF Information

CFI information is information transferred to terminal through original PCFICH channel. The CFI information indicates how many symbols are used for PDCCH. The CFI information allows the terminal to be aware of the time point from which the PDSCH region starts in one serving frequency. Accordingly, the CFI information should be necessarily obtained by the MTC terminal. However, since the existing PCFICH channel is transmitted in the overall band, the MTC terminal that may receive only the 1.4 MHz band cannot receive the channel. Thus, the CFI information is sent to the MTC terminal using the bit of the MIB not used, other than the existing PCFICH channel.

Value Tag

Value tag has an integer value within a range from 0 to X. If the system information provided from the base station varies, the value tag value is incremented by one. More specifically, the time when the value tag value is increased by one comes from the modification period right before the modification period when the varied system information starts to be broadcast with respect to the long-period modification period that applies only to the MTC terminal. This is to previously notify the MTC terminal that the system information will be varied in the next modification period so that it may prepare for it.

Subband and Frequency Hopping Information

Several 1.4 MHz bands for MTC terminal may be present in the system frequency band. Here, the MTC terminal may use the plurality of 1.4 MHz bands while hopping over time. Accordingly, the number of subbands being used in the cell and hopping pattern information of each subband are provided. Additionally, there may also be included subband information where SIB y is broadcast to provide system information necessary for the MTC terminal. Or, it may also be defined that SIB y is transmitted in the subband including a central carrier frequency in a predetermined subband, e.g., downlink frequency band, implicitly or in case no signaling is made.

Configuration Information and Scheduling Information of MTC SIB include configuration information or scheduling information of SIB required for the MTC terminal.

The configuration information means SI-window, SIB periodicity, sib-MappingInfo, and Modification period as included in existing SIB 1. The configuration information is not configuration information for existing SIB but configuration information for the SIB for MTC terminal. Further, scheduling information of SIB for the MTC terminal may also be included. According to embodiments described below, it may be included in the MIB or not.

Scheduling information on MTC enhanced physical downlink control channel (EPDCCH)

includes scheduling information of MTC EPDCCH including the scheduling information of SIB necessary for MTC terminal. MTC EPDCCH means EPDCCH for MTC terminal. The MTC terminal may receive only 1.4 MHz band, and thus, cannot receive existing PDCCH in the cell using a downlink system frequency band larger than that. Accordingly, EPDCCH instead of PDCCH should come in use.

MTC EPDCCH Repetitive Transmission Information

To support CE, the number of times of repetitive transmission of MTC EPDCCH is included.

Physical Random Access Channel (PRACH) Repetitive Transmission and Configuration Information includes repetitive transmission information upon PRACH operation. For example, the terminal determines the number of times of repetitive transmission of preamble based on the information. It has three types of PRACH repetition levels, and the number of times of repetitive transmission is mapped to each level. The MTC terminal belongs to one of the levels as per a predetermined rule and performs repetitive transmission as many as the number of times defined according to the level it belongs. PRACH radio resource information is also included for the MTC terminal per subband.

MTC SIB Repetitive Transmission Information includes the number of times of repetitive transmission of SIB for MTC. To support CE, MTC SIB also need be included. The MTC terminal attempts decoding by receiving as many as the number of times indicated in the information.

Pathloss Offset Information

The MTC terminal determines the number of times of repetitive transmission according to a predetermined rule. Here, it may use a pathloss difference between downlink and uplink as per a rule. The base station provides the difference value through MIB.

According to an embodiment of the present disclosure, at least one of the above-enumerated information items is included. For example, among the mentioned information, the system capability information, CFI, and value tag information only may be included in the existing MIB, while the remaining information may be included in the SIB for MTC. The system information that is not included in the MIB but is necessary for MTC terminal may be included in a new SIB x 1715 for MTC. SIB x includes scheduling information of SIB including common system information for MTC and information not included in the MIB among the above enumerated information items. SIB x is transmitted through a predetermined radio resource without the need of first reading the EPDCCH. Or, the EPDCCH having the scheduling information of SIB x may have been previously determined. The reason why transmission is made through the predetermined radio resource is to minimize waste of radio resources to transmit scheduling information of SIB x or EPDCCH. However, SIB x is not scheduled, and thus, it is not preferable to design to include too much information. Accordingly, it is required to include only information that is not included in the MIB but is determined to be necessary.

For example, SIB x includes the scheduling information of EPDCCH indicating SIB y including the system information for normal MTC, and the MTC terminal sequentially receives SIB y 1720 using the information. SIB y is a new MTC-dedicated SIB including only information necessary for MTC among the information included in existing SIB1 to SIB17. Generally, SIB1 to SIB5, SIB14 information are required for MTC terminal as well, and the information not needed among them or permitted size of list may be restricted to reduce the size of SIB y. As the amount of system information increases, the repetitive transmission count increases. Accordingly, the size of one SIB needs to be restricted to reduce excessive repetitive transmission. For example, it may be limited to 300 to 400 bits or to the maximum 1000 bits. Accordingly, in case information necessary for MTC is not small, there may be a plurality of SIB y's. A process of obtaining system information for MTC is described in further detail in the following embodiments.

Through the above process, the MTC terminal having obtained system information attempts random access (1725). The MTC terminal uses a PRACH radio resource for MTC terminal only that is separated from the PRACH radio resource used by normal terminal. This is why the MTC terminal may use limited 1.4 MHz band alone. That is, it may be using the frequency band not including the existing PRACH radio resource. On the other hand, since a number of MTC terminals may be present in one cell, the PRACH radio resource is needed to maintain the rate of successful access by common users. The base station may grasp whether the terminal having transmitted the preamble is the MTC terminal based on the PRACH radio resource where the preamble has been transmitted. To support CE, the MTC terminal will repetitively transmit the preamble, and the random access response (RAR) 1730 transmitted from the base station is also repetitively transmitted. Msg3 may send capability information of the MTC terminal (1735). If a separate PRACH radio resource is operated for the MTC terminal, there is no need for Msg3 to send the capability information. The MTC terminal may provide the capability information regarding the terminal through an RRC process providing the capability information to the base station (1740).

According to the fifth, sixth, and seventh embodiments, methods for effectively providing system information to MTC terminal are described.

Figure 18:
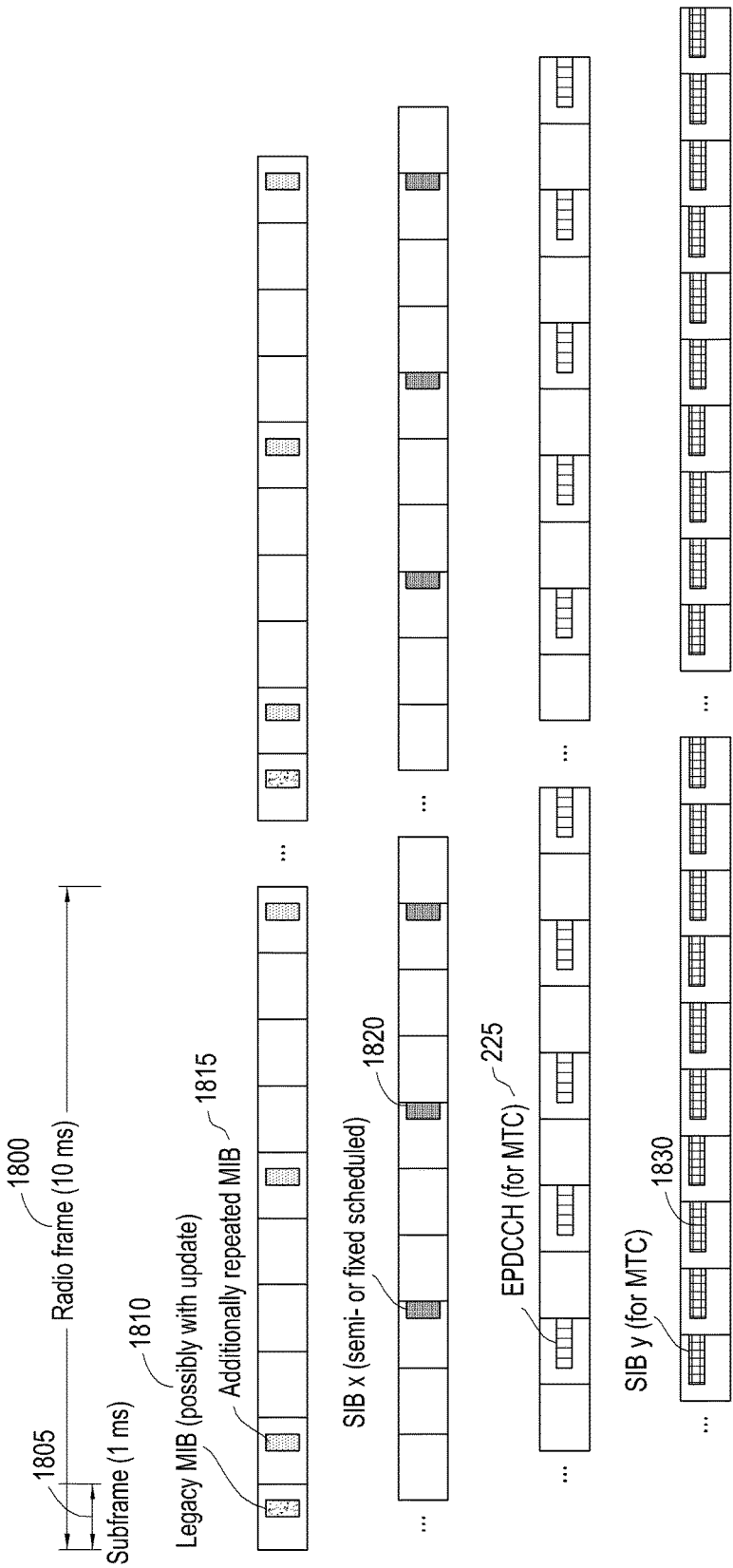
FIG. 18 is a view illustrating a method of obtaining system information from a base station by a machine-type communication device according to a fifth embodiment of the present disclosure.

FIG. 18 is a view illustrating a method of obtaining system information from a base station by a machine-type communication device according to a fifth embodiment of the present disclosure.

The fifth embodiment includes necessary system information and features the existence of new SIB x for MTC terminal transmitted through a predetermined radio resource. SIB x is transmitted through the predetermined radio resource, and it is unnecessary to previously read EPDCCH. Legacy MIB 1810 is transmitted through the first subframe 1805 of each frame 1800 according to the prior art. The legacy MIB having the same information is transmitted four times in total for 40 ms. Further, to support MTC terminal, additional information may add to the legacy MIB. For example, the additional information includes system capacity information or CFI. The MTC terminal may fail to successfully decode with the legacy MIB transmitted four times for 40 ms. Accordingly, another MIB 1815 including the same information as the MIB is additionally and repetitively transmitted while avoiding radio resources transmitting the legacy MIB within 40 ms. The additionally repeatedly transmitted MIB 1815 is transmitted through a predetermined radio resource like the legacy MIB, and it is transmitted in the middle 1.4 MHz frequency of the frequency band, but temporally uses other radio resource and thus does not overlap the legacy MIB. Further, the MIB 1815 is not transmitted through uplink subframe or MBSFN subframe in TDD. The MTC terminal having obtained the system information transmitted from the MIB within 40 ms may use the CIF information included in the MIB to grasp the position that PDSCH starts in the subframe. The MTC terminal receives SIB x 1820 transmitted through a predetermined radio resource in the PDSCH region. SIB x also includes system information necessary for the MTC terminal. That is, SIB y may include at least one of the following pieces of information.

scheduling information of MTC EPDCCH 1825
    MTC EPDCCH repetitive transmission information
    Cell barring information on MTC terminal
    includes legacy access class barring (ACB), service specific access control (SSAC), and extended access barring (EAB) information. Or may have simplified version information regarding the ACB, SSAC, EAB information. Additionally includes information on MTC emergency call. The one bit indicator for the MTC emergency call is used to indicate whether the cell permits the MTC terminal emergency call.
    Value tag
    same as above description
    Subband and frequency hopping information
    same as above description
    PRACH repetitive transmission and configuration information
    same as above description
    Pathloss offset information
    same as above description
    The MTC EPDCCH contains scheduling information of other SIB. SIB x is also repeatedly transmitted over several subframes to support CE. The MTC terminal having succeeded in decoding information of SIB x receives MTC EPDCCH using the scheduling information of EPDCCH included in SIB x. MTC EPDCCH is also repeatedly transmitted to support CE. The MTC EPDCCH contains scheduling information of SIB y including general system information necessary for MTC terminal. The MTC terminal receives SIB y repeatedly transmitted using the scheduling information of SIB y from the EPDCCH. SIB y, as described above, includes general system information necessary to support MTC terminal.

Figure 19:
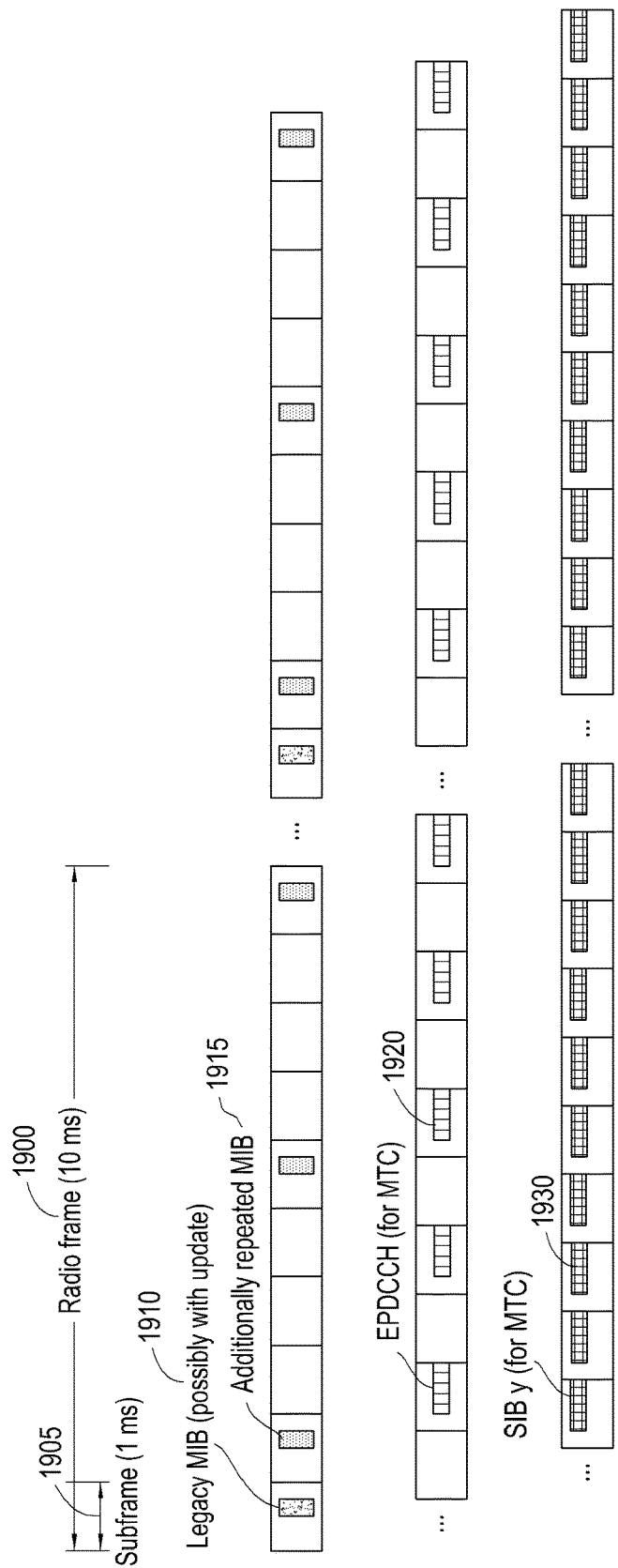
FIG. 19 is a view illustrating a method of obtaining system information from a base station by a machine-type communication device according to a sixth embodiment of the present disclosure.

FIG. 19 is a view illustrating a method of obtaining system information from a base station by a machine-type communication device according to a sixth embodiment of the present disclosure.

The sixth embodiment of the present disclosure features that EPDCCH indicating scheduling information of new SIB y for MTC terminal including necessary or general system information is transmitted at a predefined radio resource position. Legacy MIB 1910 is transmitted through the first subframe 1905 of each frame 1900 according to the prior art. The legacy MIB having the same information is transmitted four times in total for 40 ms. Further, to support the MTC terminal, system capacity information, CFI, orMapping information on repeated transmission of MTC EPDCCH is additionally included in the MIB. The MTC terminal may fail to successfully decode with the legacy MIB transmitted four times for 40 ms. Accordingly, another MIB 1915 including the same information as the MIB is additionally and repetitively transmitted while avoiding radio resources transmitting the legacy MIB within 40 ms. The additionally repeatedly transmitted MIB 1915 is transmitted through a predetermined radio resource like the legacy MIB, and it is transmitted in the middle 1.4 MHz frequency of the frequency band, but temporally uses other radio resource and thus does not overlap the legacy MIB. Further, the MIB 1915 is not transmitted through uplink subframe or MBSFN subframe in TDD. The MTC terminal having obtained the system information transmitted from the MIB within 40 ms may use the CIF information included in the MIB to grasp the position that PDSCH starts in the subframe. The MTC terminal receives MTC EPDCCH 1920 transmitted through a predetermined radio resource in the PDSCH region.

Figure 20:
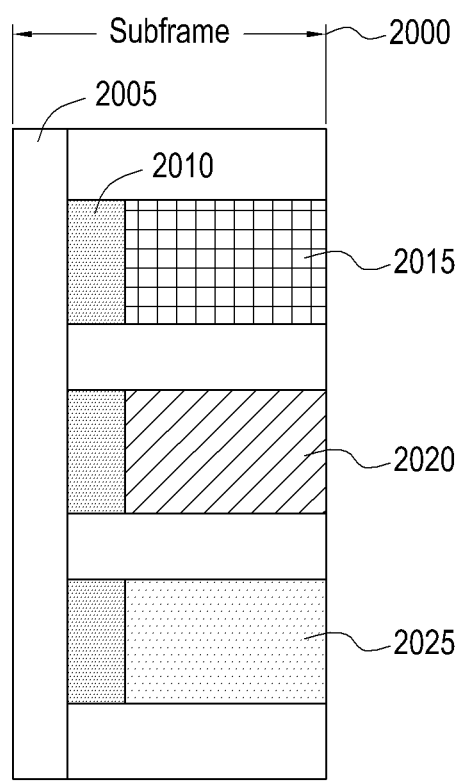
FIG. 20 is a view illustrating an MTC EPDCCH transmitted through a predetermined radio resource according to an embodiment of the present disclosure.

FIG. 20 is a view illustrating an MTC EPDCCH transmitted through a predetermined radio resource according to an embodiment of the present disclosure.

FIG. 20 illustrates one subframe 2000 including a plurality of subbands 2015, 2020, and 2025 for MTC terminal. A few first slots in the subframe are an existing PDCCH region 2005. The PDCCH information of PDCCH region cannot read MTC terminals. This is why PDCCH should be transmitted over the overall downlink frequency band to obtain the PDCCH information. To replace this, an MTC EPDCCH is required which may function as existing PDCCH in the 1.4 MHz band. The position of the MTC EPDCCH radio resource may be previously determined or set through MIB or SIB. If it is predetermined, scheduling of MTC EPDCCH radio resource is not needed, and thus, signaling overhead may be reduced. For example, a few slots subsequent to the existing PDCCH region are previously defined as radio resource region of MTC EPDCCH 2010. The frequency bandwidth where MTC EPDCCH is transmitted is the same as the subband width, 1.4 MHz. The information provided by the MTC EPDCCH becomes the scheduling information of MTC terminal using the subband where the MTC EPDCCH is transmitted. Or, through additional scheduling, it may be used to provide scheduling information of MTC terminal using other subband. SIB y may be transmitted only through a predetermined particular subband, or information on the subband where SIB y is broadcast may be obtained from MIB. The MTC terminal attempts to receive MTC EPDCCH transmitted through the predetermined radio resource in the subband where SIB y is broadcast. MTC EPDCCH is also repeatedly transmitted over several subframes to support CE. The MTC EPDCCH contains scheduling information of SIB y 1925 for MTC terminal. The MTC terminal having succeeded in decoding MTC EPDCCH information uses the scheduling information of SIB y included in the MTC EPDCCH to receive SIB y. SIB y is also repeatedly transmitted to support CE. SIB y contains general or necessary system information for the MTC terminal. SIB y has at least one of the following pieces of information.

Figure 21:
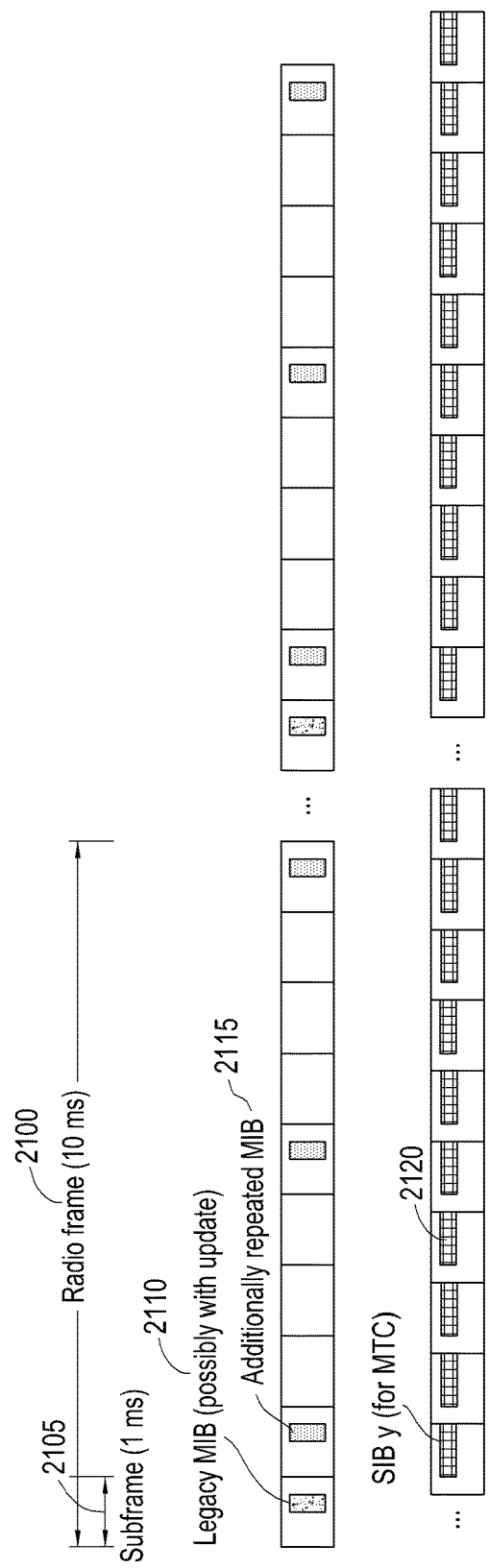
FIG. 21 is a view illustrating a method of obtaining system information from a base station by a machine-type communication device according to a seventh embodiment of the present disclosure.

Cell barring information on MTC terminal
    same as above description
    Value tag
    same as above description
    Subband and frequency hopping information
    same as above description
    PRACH repetitive transmission and configuration information
    same as above description
    Pathloss offset information
    same as above description
    System information or part included in SIB1 to SIB5, SIB14
    same as above description FIG. 21 is a view illustrating a method of obtaining system information from a base station by a machine-type communication device according to a seventh embodiment of the present disclosure.

The seventh embodiment of the present disclosure features that new SIB y for MTC terminal including necessary or general system information is transmitted at a predefined fixed radio resource position. Legacy MIB 2110 is transmitted through the first subframe 2105 of each frame 2100 according to the prior art. The legacy MIB having the same information is transmitted four times in total for 40 ms. Further, to support the MTC terminal, system capacity information, CFI, or information on repeated transmission of SIB y is additionally included in the MIB. The MTC terminal may fail to successfully decode with the legacy MIB transmitted four times for 40 ms. Accordingly, another MIB 2115 including the same information as the MIB is additionally and repetitively transmitted while avoiding radio resources transmitting the legacy MIB within 40 ms. The additionally repeatedly transmitted MIB 2115 is transmitted through a predetermined radio resource like the legacy MIB, and it is transmitted in the middle 1.4 MHz frequency of the frequency band, but temporally uses other radio resource and thus does not overlap the legacy MIB. Further, the MIB 2115 is not transmitted through uplink subframe or MBSFN subframe in TDD. The MTC terminal having obtained the system information transmitted from the MIB within 40 ms may use the CIF information included in the MIB to grasp the position that PDSCH starts in the subframe. The MTC terminal receives SIB y 2120 transmitted through a predetermined radio resource in the PDSCH region.

SIB y is also repeatedly transmitted over several subframes to support CE. SIB y contains general or necessary system information for the MTC terminal. SIB y has at least one of the following pieces of information.

Cell barring information on MTC terminal
    same as above description
    Value tag
    same as above description
    Subband and frequency hopping information
    same as above description
    PRACH repetitive transmission and configuration information
    same as above description
    Pathloss offset information
    same as above description
    System information or part included in SIB1 to SIB5, SIB14
    same as above description System information for MTC terminal may be updated as well. Accordingly, the base station should inform the MTC terminal that system information has been updated so that the MTC terminal may obtain new system information. The existing process of updating system information is not proper for MTC terminal. The existing process of updating system information is performed with respect to modification period. That is, the base station broadcasts updated system information at the time that modification period is about to start. The base station informs the terminal that the updated system information is to be transmitted in the next modification period in the previous modification period through a paging message. The MTC terminal requiring CE mode should repeatedly receive the information to receive the information transmitted from the base station. This means that it takes a significant time to successfully decode particular information. The existing modification period cannot exceed up to 10.24 seconds. The MTC terminal in the CE mode should repeatedly receive this to receive the paging message. Accordingly, the MTC terminal would be highly likely to fail to successfully decode the paging message informing the update of the system information within one cycle of the modification period.

According to eighth and ninth embodiments of the present disclosure, a method of updating system information for MTC terminal is now described.

Figure 22:
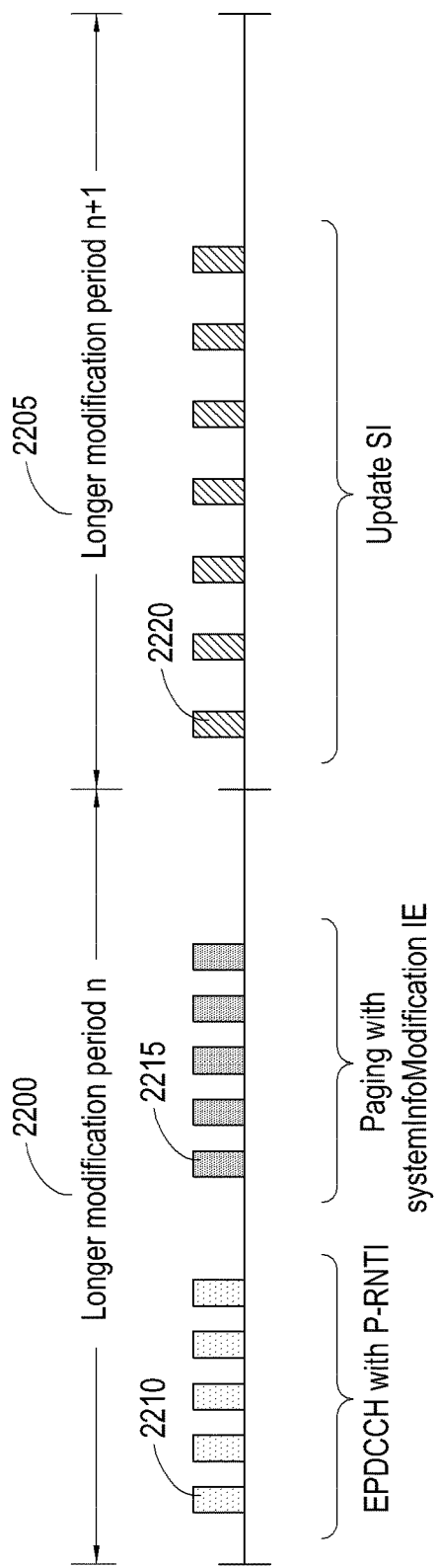
FIG. 22 is a view illustrating a method of updating system information according to an eighth embodiment of the present disclosure.

FIG. 22 is a view illustrating a method of updating system information according to an eighth embodiment of the present disclosure.

In the eighth embodiment of the present disclosure, separately defined is a modification period 2200 having a very long period for MTC terminal unlike the existing modification period. The existing modification period cannot be set to be longer than the existing SFN period. Accordingly, the SFN period should be definitely determined to set a modification period that is longer than, at least, the SFN period, for the MTC terminal. The determined SFN period applies only to MTC terminal, and normal terminals need not obtain that. Additional bits along with the SFN information provided in the existing MIB are defined to provide an SFN having an extended period applying only to MTC terminal. The added SFN bit information is included in MIB or SIBx or SIB y. The modification period value is provided to the MTC terminal using MIB, SIBx or SIB y for MTC mentioned above. If updated system information is broadcast in modification period n+1 2205, the base station transmits a paging message 2215 to the MTC terminal to indicate that system information is to be updated in the next modification period in the previous modification period n 2200. The MTC terminal receives EPDCCH repeatedly transmitted in modification period n 2200. The EPDCCH includes, a repetition count of paging message, radio resource information where the paging message is transmitted, as well as the paging RNTI (P-RNTI). If the EPDCCH contains the P-RNTI, the paging message 2215 is received in the radio resource of the paging message indicated by the EPDCCH. If the paging message contains an indicator indicating that system information is to be updated in the next modification period, the MTC terminal receives the updated system information 2220 in the next modification period. The MTC terminal performs an operation of receiving paging message at least once every modification period.

Figure 23:
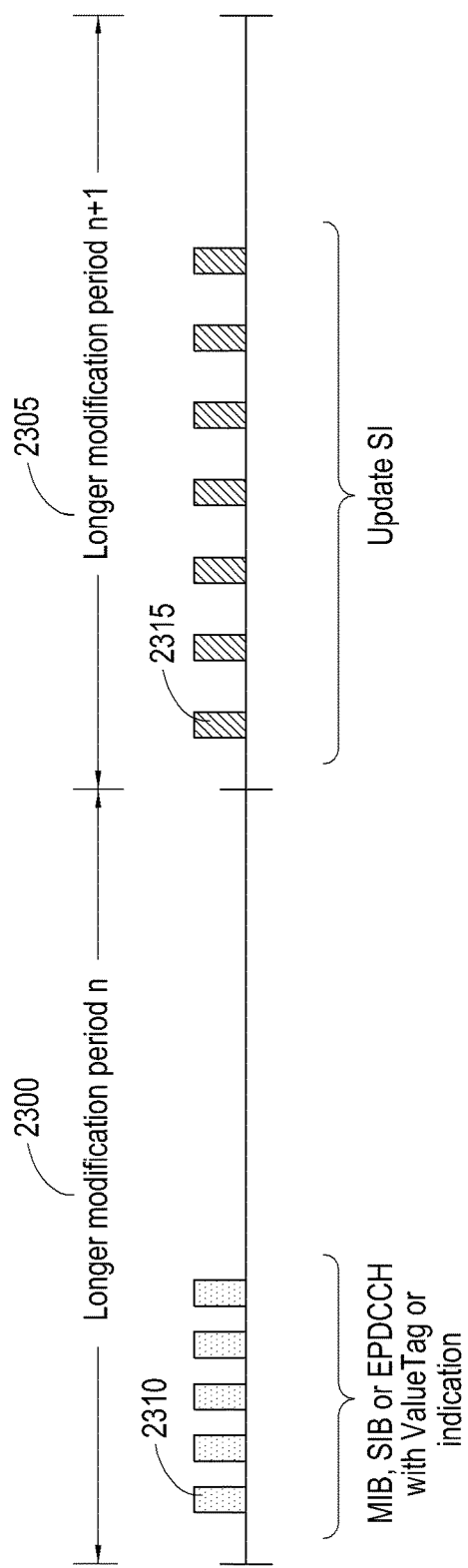
FIG. 23 is a view illustrating a method of updating system information according to a ninth embodiment of the present disclosure.

FIG. 23 is a view illustrating a method of updating system information according to a ninth embodiment of the present disclosure.

Like the eighth embodiment, the ninth embodiment applies a modification period having a very long period for MTC terminal. The ninth embodiment of the present disclosure features using one IE, i.e., value tag, in MIB, SIB x, SIB y, or EPDCCH to indicate that system information is to be updated in the next modification period. The value tag has an integer value in a range from 0 to X. Whenever system information is updated, it is incremented by one. The time when the value tag value is incremented by one is the modification period 2305 when updated system information starts to be broadcast or its previous modification period 2300. The MTC terminal decodes MIB, SIB or EPDCCH at least once each modification period and then compares the value tag value with a value tag value it stores. If the two values differ, the time when the updated system information is obtained is varied depending on the modification period when the value tag value is updated. That is, if the time when the value tag value is increased by one is the modification period 2305 when updated system information starts to be broadcast, the MTC terminal performs an operation of receiving the newly updated system information immediately when recognizing that the newly obtained value tag value is different from the one it stores. Otherwise, if the time when the value tag value is increased by one is the modification period 2300 right prior to the modification period 2305 when updated system information starts to be broadcast, the MTC terminal performs an operation of receiving the newly updated system information when the next modification period arrives after it recognizes that the newly obtained value tag differs from the one it stores. If the MTC terminal is back off the service shade area, it decodes MIB, SIB x, and SIB y or EPDCCH to obtain value tag information. Then, it compares it with the value tag value stored last, and if different, immediately performs an operation of receiving the updated system information. Then, it compares it with the value tag value stored last, and if the same, uses the existing system information as obtained.

In a variation to the ninth embodiment of the present disclosure, the MTC terminal identifies value tag of MIB, SIB x, SIB y, or EPDCCH before attempting to access. It compares it with the value tag value stored last, and if different, immediately performs an operation of receiving the updated system information. The MTC terminal abstains from identifying value tag of MIB, SIB x, SIB y, or EPDCCH if it does not attempt to access. The modified method is proper for MTC terminal that transmits delay tolerant data and infrequently attempts to access. That is, for MTC terminal attempting access once or twice per month, checking as to whether system information has been updated every modification period is unnecessary. This is why it would not cause any trouble to obtain the latest most precise system information before access is attempted. Further, an operation of first obtaining MIB or SIB before access means that delay occurs until access is successfully set. However, when requesting a delay tolerant service, such delay would not be a major issue.

According to the present disclosure, there is proposed a process of performing RACH for MTC terminal in CE mode. Prior to describing the present disclosure, the prior art is briefly described.

Figure 24:
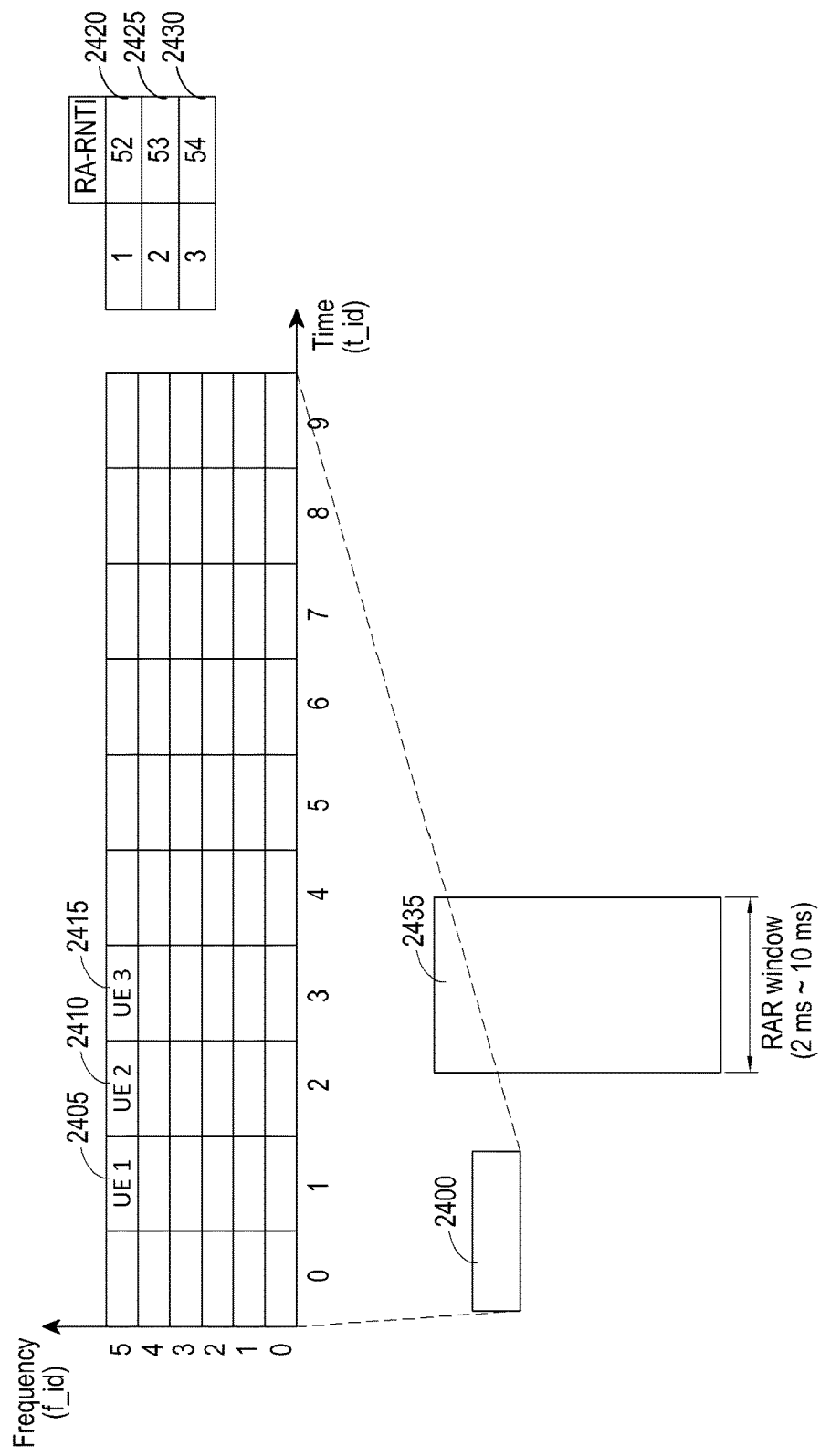
FIG. 24 is a view illustrating a legacy RACH process and a method of computing RA-RNTI.

FIG. 24 is a view illustrating an existing RACH process and a method of computing RA-RNTI.

The terminal requiring access transmits a preamble in the PRACH radio resource 2400. Although the size of radio resource available may vary depending on whether FDD/TDD or mask, but the overall PRACH radio resource is divided into time slot and frequency slot. An RA-RNTI value is determined depending on the position that the preamble transmission is started. The following is an equation used to calculate RA-RNTI.

$$RA\text{-}RNTI = 1 + t\_id + 10 * f\_id \qquad [\text{Equation 1}]$$

For example, if terminal 1 transmits a preamble in a particular radio resource location 2405, one random access RNTI (RA-RNTI) 2420 is calculated considering the corresponding radio resource location and corresponding time slot (t_id) and frequency slot (f_id). Three subframes after transmitting the preamble, RAR window 2435 starts. RAR window is set to 2 ms to, up to, 10 ms. The terminal monitors PDCCH within the RAR window and identifies whether the PDCCH has an RA-RNTI calculated from the position of transmission of the preamble. If there is the RA-RNTI, an RAR message is received from corresponding scheduling information. The MTC terminal that is in the CE mode needs to repetitively transmit preambles and should repetitively receive RAR messages. Accordingly, the existing random access process is not proper for MTC terminal.

Figure 25:
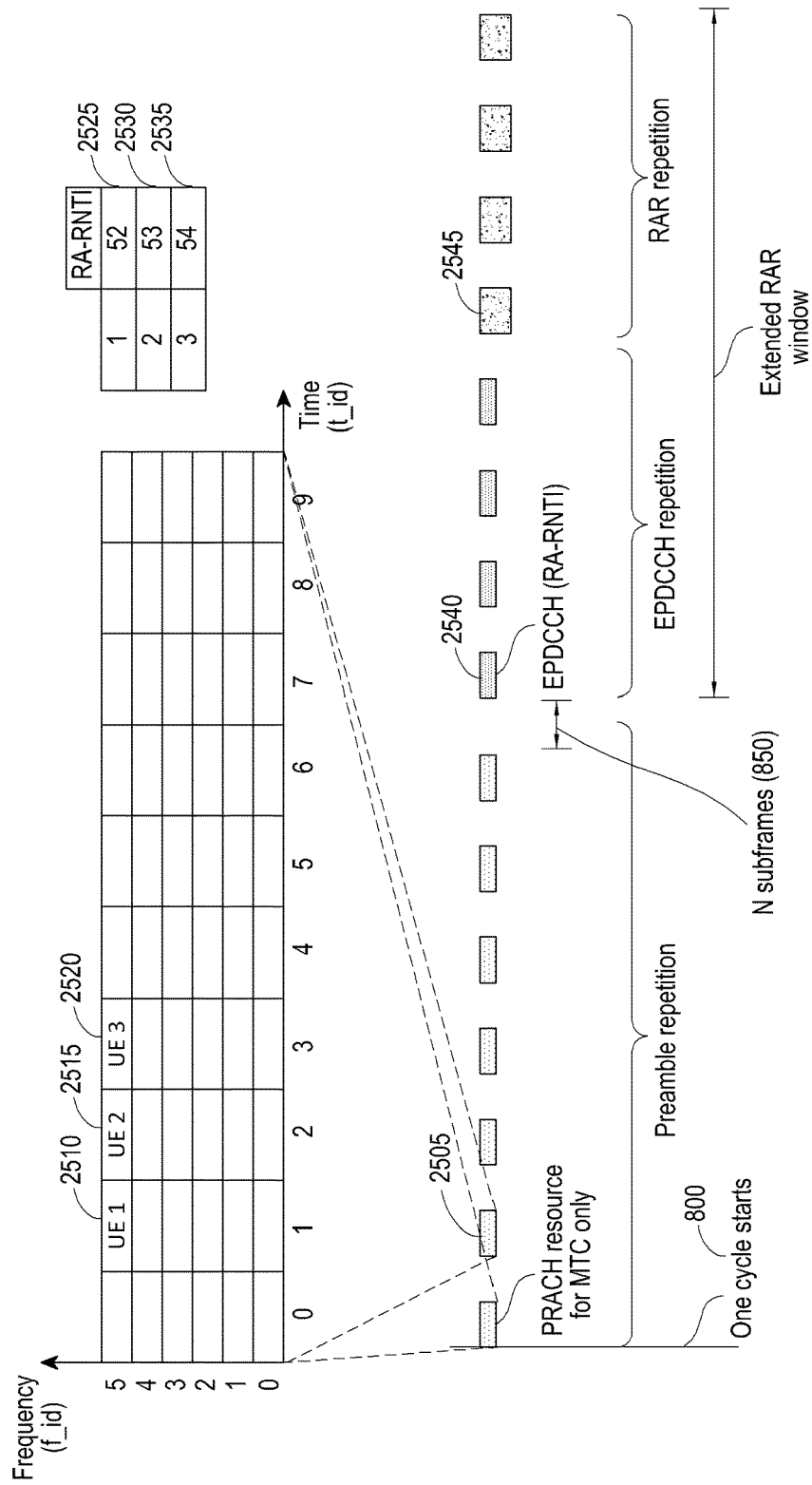
FIG. 25 is a view illustrating an RACH process according to an embodiment of the present disclosure.

FIG. 25 is a view illustrating an RACH process according to an embodiment of the present disclosure.

According to an embodiment of the present disclosure, a process of performing RACH is proposed considering repetitive transmission of preambles and RAR messages. The MTC terminal repetitively transmits preambles in the same time slot (t_id) and frequency slot (f_id) for each and every PRACH radio resource 2505 repeatedly allocated. Further, it uses the same preamble sequence (the same preamble ID) for each repetitive transmission. The reason for using the same time slot (t_id) and frequency slot (f_id) is to make one RA-RNTI correspond to each MTC terminal attempting access. Further, the reason for using the same preamble sequence is to allow the base station to do soft combining on the preambles repeatedly received. For example, if terminal 1 transmits a preamble in a particular radio resource 2510, it transmits the same preamble in the same radio resource location upon next repetitive transmission. In such case, the RA-RATI of terminal 1 is supposed to have one value 2525 without confusion. The PRACH radio resource for MTC terminal is separated from the PRACH radio resource used by the normal terminal. The PRACH radio resource information and repetitive transmission count of preamble used by the MTC terminal are provided from the MIB, SIB x or SIB y. If the predetermined repetitive transmission period of preamble is terminated, the MTC terminal determines whether there is the random access-radio network temporary identity (RA-RNTI)calculated by reflecting the location of the radio resource where the preamble has been transmitted from the EPDCCH 2540. If the transmission of the last preamble is ended, there is a need for time to combine and process the preambles repeatedly received by the base station and configure EPDCCH (and RAR message). Accordingly, n predetermined subframes 2550 after the last preamble has been transmitted, an operation of receiving the MTC EPDCCH is performed. If the period of repeated reception of EPDCCH as set is terminated, and the EPDCCH successfully decoded includes the RA-RNTI calculated by itself, the MTC terminal receives the RAR message 2545 using the scheduling information indicated by the RA-RNTI. To support the MTC terminal that is in the CE mode, the RAR message is also repeatedly received. The RAR window is also extended due to the RAR message and EPDCCH repeatedly received. The extended RAR window value may be included in the MIB, SIB x or SIB y that may be then provided to the MTC terminal. Or, the MTC terminal may calculate the RAR window based on the information regarding the repetitive transmission count of RAR message and the EPDCCH included in the MIB, SIB x or SIB y. If the EPDCCH received by the MTC terminal does not contain the RA-RNTI calculated by itself or the RAR message received does not include the preamble ID sent by itself, it is deemed failure to access. As in the prior art, if backoff information has been received from the base station, access may be reattempted after waiting for the backoff time.

Figure 26:
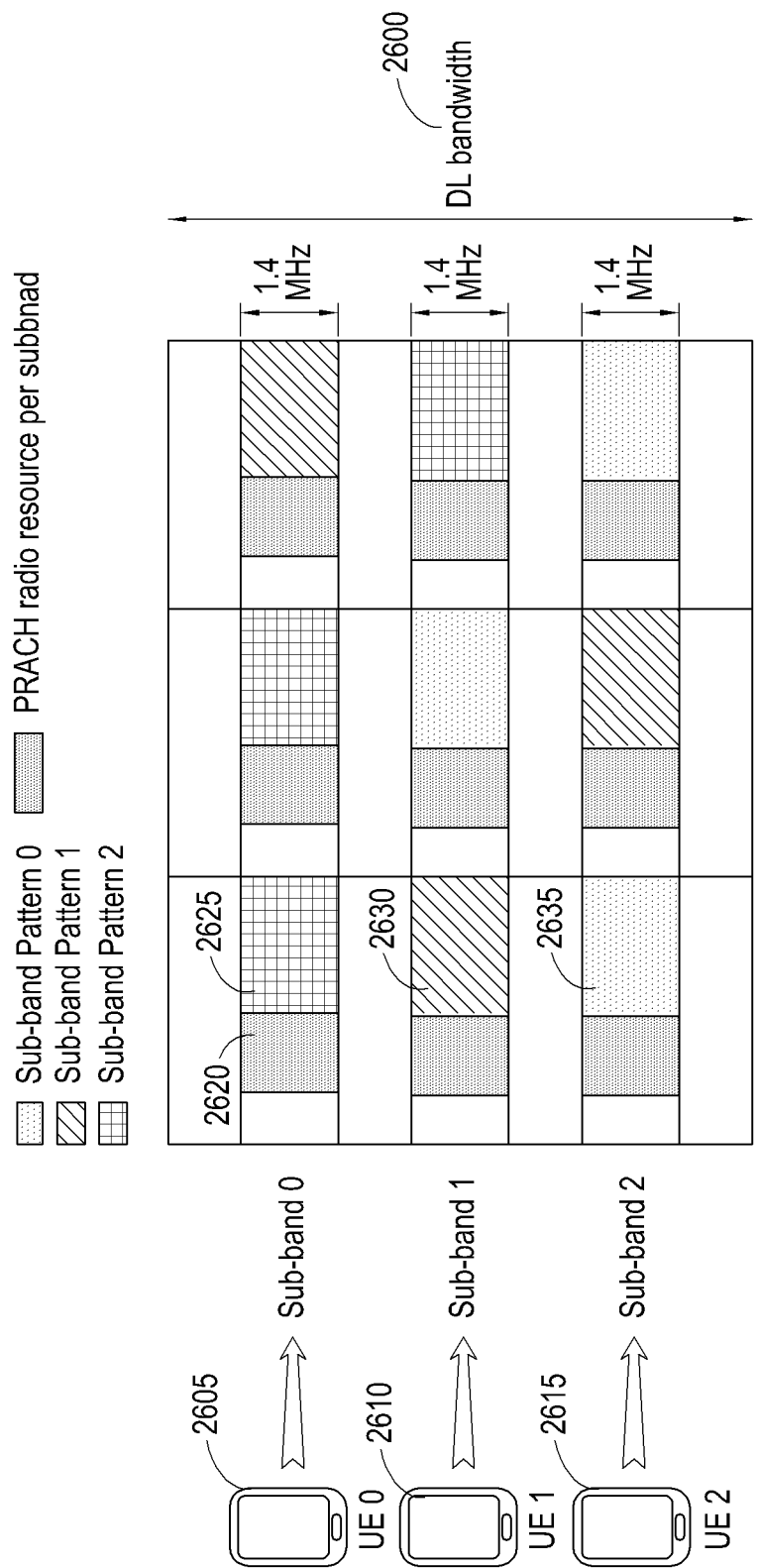
FIG. 26 is a view illustrating a method of selecting a subband to be used for access by each machine-type communication device according to an embodiment of the present disclosure.

FIG. 26 is a view illustrating a method of selecting a subband to be used for access by each machine-type communication device according to an embodiment of the present disclosure.

The MTC terminal uses a limited frequency band of 1.4 MHz. Further, the 1.4 MHz band used may be subject to frequency hopping. Accordingly, existing PRACH radio resources that are provided for use of normal terminals might not be used. That is, in case the 1.4 MHz band does not include the existing PRACH radio resource, the MTC terminal cannot use the existing PRACH radio resource. Further, the base station need grasp the type of terminal attempting access from the accessing stage. For example, for MTC terminal supportive of CE mode, preambles transmitted from the terminal should be subject to soft combining. However, there is no way for the MTC terminal to be able to report its capacity to the base station before access. Accordingly, there is needed a method capable of informing the type of terminal transmitting the preamble at the stage of transmitting preambles. For the reasons mentioned above, the present disclosure features allocating a separate PRACH radio resource for MTC terminal. Further, a plurality of 1.4 MHz frequencies in the downlink frequency band 2600 can use. Here, each MTC terminal 2605, 2610, and 2615 should determine which subband of PRACH radio resource is to be used. To distribute the load of each subband, each MTC terminal may randomly select one subband. Or, one subband may also be selected using UE_ID (=IMSI mod 4092) or Access Class (AC). That is, UE_ID mod N or AC mod N. Proposed is a method of selecting a subband according to information on necessary PRACH repetitive transmission count (PRACH repetition level) according to the present disclosure. The MTC terminal determines the PRACH repetition level it belongs by a predetermined rule. There are three PRACH repetition levels in total, and the number of times of repetitive transmission of preamble or RAR message is determined for each level. The PRACH repetitive transmission count corresponding to the repetition level is predetermined or set through the MIB, SIB x or SIB y. The predetermined rule is as follows.

Option 1: Determine PRACH repetition level considering the number of times of PBCH reception or CRS signal quality until PBCH is successfully decoded. For example, PBCH reception count<threshold 1→PRACH repetition level 1 threshold 1≤PBCH reception count<threshold 2→PRACH repetition level 2 threshold 2≤PBCH reception count→PRACH repetition level 3

Here, it is assumed that as PRACH repetition level decreases, the corresponding repetitive transmission count decreases.

Or common reference signal (CRS) signal quality (e.g., reference signal received power (RSRP))<threshold A→PRACH repetition level 3 threshold A≤CRS signal quality<threshold B→PRACH repetition level 2 threshold B≤CRS signal quality→PRACH repetition level 1

The thresholds are predetermined or set through MIB, SIB x or SIB y.

Option 2: Reflect signal quality of downlink channels only. Option 2 determines PRACH repetition level considering PRACH required power as well as the count of PBCH reception. For example, when determining preamble transmission power, it is calculated reflecting the pathloss difference between downlink and uplink. PRACH repetition level is determined based on the calculated transmission power.

PRACH transmit power <threshold X→PRACH repetition level 1 threshold X≤PRACH transmit power<threshold Y→PRACH repetition level 2 threshold Y≤PRACH transmit power→PRACH repetition level 3

The pathloss difference between downlink and uplink and thresholds are predetermined or set through MIB, SIB x or SIB y.

Option 3: The PRACH repetition level is determined in a trial and error manner. The MTC terminal first performs RACH process at the lowest PRACH repetition level. Upon failure, it increases the PRACH repetition level.

According to an embodiment of the present disclosure, one of the above-described methods is used and the MTC terminal having determined the PRACH repetition level performs RACH process using one of the subbands corresponding to the level. According to the present disclosure, the subbands are mapped to one of the levels. The mapping information is set through the MIB, SIB x or SIB y. The reason for mapping is to differentiate the repetitive transmission count necessary for each terminal with subbands on the base station position. The base station cannot be aware which PRACH repetition level each MTC terminal has chosen. Further, the level applied to one terminal may be varied over time. In particular, for moving MTC terminals, the level would be frequently varied. However, the base station should be aware of the level to perform PRACH operation. That is, it may be aware of the count of preambles repetitively received according to the level and may derive the count of repetitive transmission of EPDCCH or RAR message. To that end, mapping each subband with the level would allow the base station to easily grasp the level of the terminal depending on the subband through which the MTC terminal transmits preamble.

The lower frequency, the better radio channel characteristic is presented. Thus, a higher PRACH repetition level (level requiring more count of repetitive transmission) may be allocated to a subband using a lower frequency band.

Upon reselection among the cells of other frequency with the same priority or with the same frequency in legacy LTE technology, R-criterion is used as follows. Rs applies to serving cell, and Rn applies to neighbor cell. The terminal compares the calculated values and performs reselection through the cell with the highest (rank) value.

TABLE 13

$R_s = Q_{meas,s} + Q_{Hyst} - \text{Qoffset}_{temp}$
$R_n = Q_{meas,n} - \text{Qoffset} - \text{Qoffset}_{temp}$ Here, the parameters used in the above equations are defined as follows.

TABLE 14

| | |
|---|---|
| $Q_{meas}$ | RSRP measurement quantity used in cell reselections. |
| Qoffset | For intra-frequency, Equals to $\text{Qoffset}_{s,n}$, if $\text{Qoffset}_{s,n}$ is valid, otherwise this equals to zero. |
| | For inter-frequency, Equals to $\text{Qoffset}_{s,n}$ plus $\text{Qoffset}_{frequency}$, if $\text{Qoffset}_{s,n}$ is valid, otherwise this equals to $\text{Qoffset}_{frequency}$. |
| $\text{Qoffset}_{temp}$ | Offset temporarily |

According to the prior art, cell to be reselected is determined merely based on the above-described rank value. However, whether to support the feature should also be taken into account for the wireless network where base stations that support MTC CE or RBW and base stations that do not co-exist. For example, assuming that there are a cell having the largest rank value but unable to support CE mode and a cell having a rank value smaller than the cell but able to support CE mode, the latter cell would be better for MTC terminal that is under poor cell environments but supportive of CE mode. On the other hand, the cell unable to support RBW, despite having the largest rank value, is never useful for the MTC terminal supportive only of the 1.4 MHz band.

Unlike the prior art where only rank values are compared, whether cells support CE or RBW is also considered to reselect cell according to the present disclosure. According to the present disclosure, the rank values of cells considered like in the prior art are derived. The MTC terminal supportive only of 1.4 MHz frequency band excludes cells unable to support that regardless of rank value. Further, it may exclude regardless of rank values depending on the measured signal quality and whether a particular cell supports CE.

Figure 27:
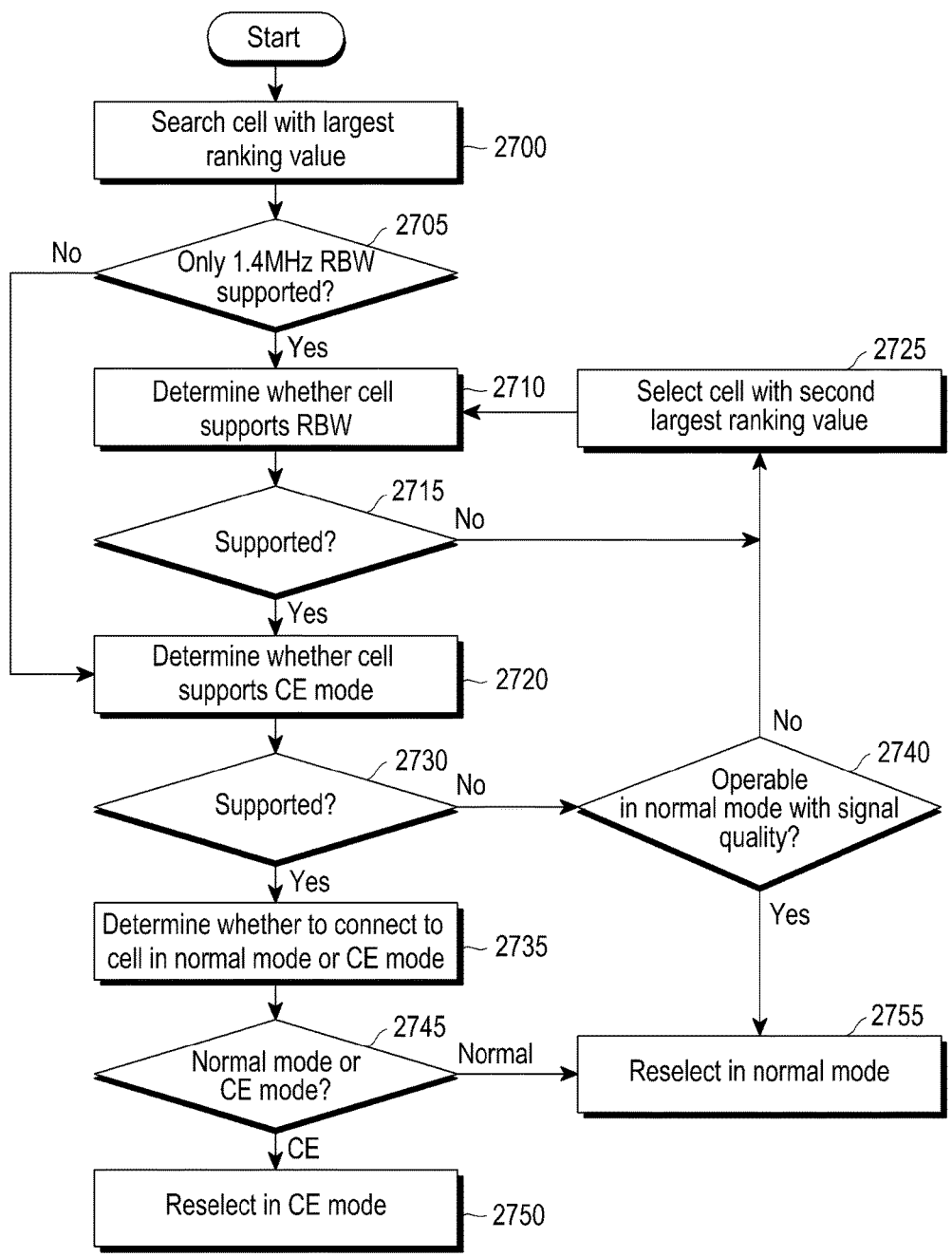
FIG. 27 is a view illustrating an operation of a terminal reselecting a proper cell when reselecting a cell among cells belonging to a frequency with the same priority or the same frequency according to the present disclosure.

FIG. 27 is a view illustrating an operation of a terminal reselecting a proper cell when reselecting a cell among cells belonging to a frequency with the same priority or the same frequency according to the present disclosure.

The terminal discovers a cell having the largest rank value using existing R-Criterion equation (2700). The terminal determines whether it supports only 1.4 MHz reuse bandwidth ("RBW") (2705). If supporting, the terminal identifies whether the cell having the largest rank value supports RBW (2710). The terminal determines whether to support (2715). If not supporting, the terminal excludes the considered cell from reselection candidates and selects a cell having the next largest rank value and then repeats the operations (2725). If supporting, the terminal identifies whether the considered cell is supportive of CE mode (2720). The terminal determines whether to support (2730). If not supportive, the terminal determines whether the measured channel quality is good enough to allow it to operate in the normal mode not in the CE mode (2740). If the channel quality requires CE mode, the terminal excludes the considered cell from the reselection candidates and selects (2725) a cell having he second largest rank value and goes back to operation 2710. If supportive, the terminal determines whether to connect to the cell in the normal mode or in the CE mode considering the current channel quality (2735). The terminal determines whether it is connected in a normal mode or CE mode (2745). If connected in the CE mode, the terminal performs cell reselection in the CE mode (2750). The MTC terminal, if requiring access, will attempt to access in the CE mode. Otherwise, if connected in the normal mode, the terminal performs cell reselection in the normal mode (2755). The MTC terminal, if requiring access, will attempt to access in the normal mode. The MTC terminal continues to perform cell measurement and repeats the above-described operations to perform reselection in the optimal cell.

There are two types of procedures for random access, and the first procedure is contention based, and the other procedure is non-contention based.

In the contention based procedure, the preamble is randomly selected by the terminal. However, in the case of the non-contention based procedure, the preamble to be used by the terminal is indicated by the network using dedicated signaling means. The preamble is reserved by the base station (a network entity) for the corresponding terminal. A contention based random access procedure is described in detail with reference to FIG. 28.

Figure 28:
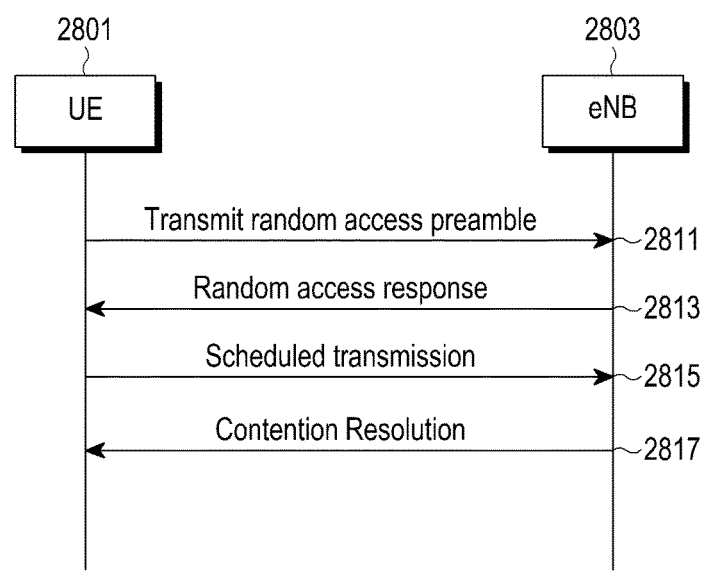
FIG. 28 is a flowchart illustrating a contention-based random access procedure used in an LTE system.

FIG. 28 is a flowchart illustrating a contention-based random access procedure used in an LTE system.

The terminal 2801 performs random access by conducting the following procedure upon initial access to the base station, re-access, handover, or in other various situations requiring random access.

First, the terminal 2801 transmits a random access preamble through a physical channel for random access for accessing the base station 2803 (2811). The preamble may be one randomly selected by the terminal or a particular preamble designated by the base station.

Here, the random access preamble is included in Msg1, and the Msg1 message is transmitted from the terminal to the base station. The random access preamble may be any one of the 64 available preamble sequences associated with each cell.

When the base station receives the random access preamble, the base station transmits an RAR message (Msg2) therefor to the terminal (2813). The RAR message contains the identifier information on the preamble used in operation 2801, uplink transmission timing correction information, uplink resource allocation information to be used in operation 2815, and temporary terminal identifier information.

When receiving the RAR message, the terminal transmits different messages depending on the above-described purposes in the resource allocated to the RAR message (2815). For example, in case of initial access, a message of radio resource control (RRC) layer, i.e., RRCConnectionRequest, is transmitted, and in case of re-access, a RRCConnectionReestablishmentRequest message is transmitted, and in case of handover, a RRCConnectionReconfigurationComplete message is transmitted.

Thereafter, in case of initial access or reaccess, the base station re-transmits the message received in operation 2815 to the terminal as UE Contention Resolution Identity MAC CE message (2817) to inform the terminal that random access procedure has succeeded.

Figure 29:
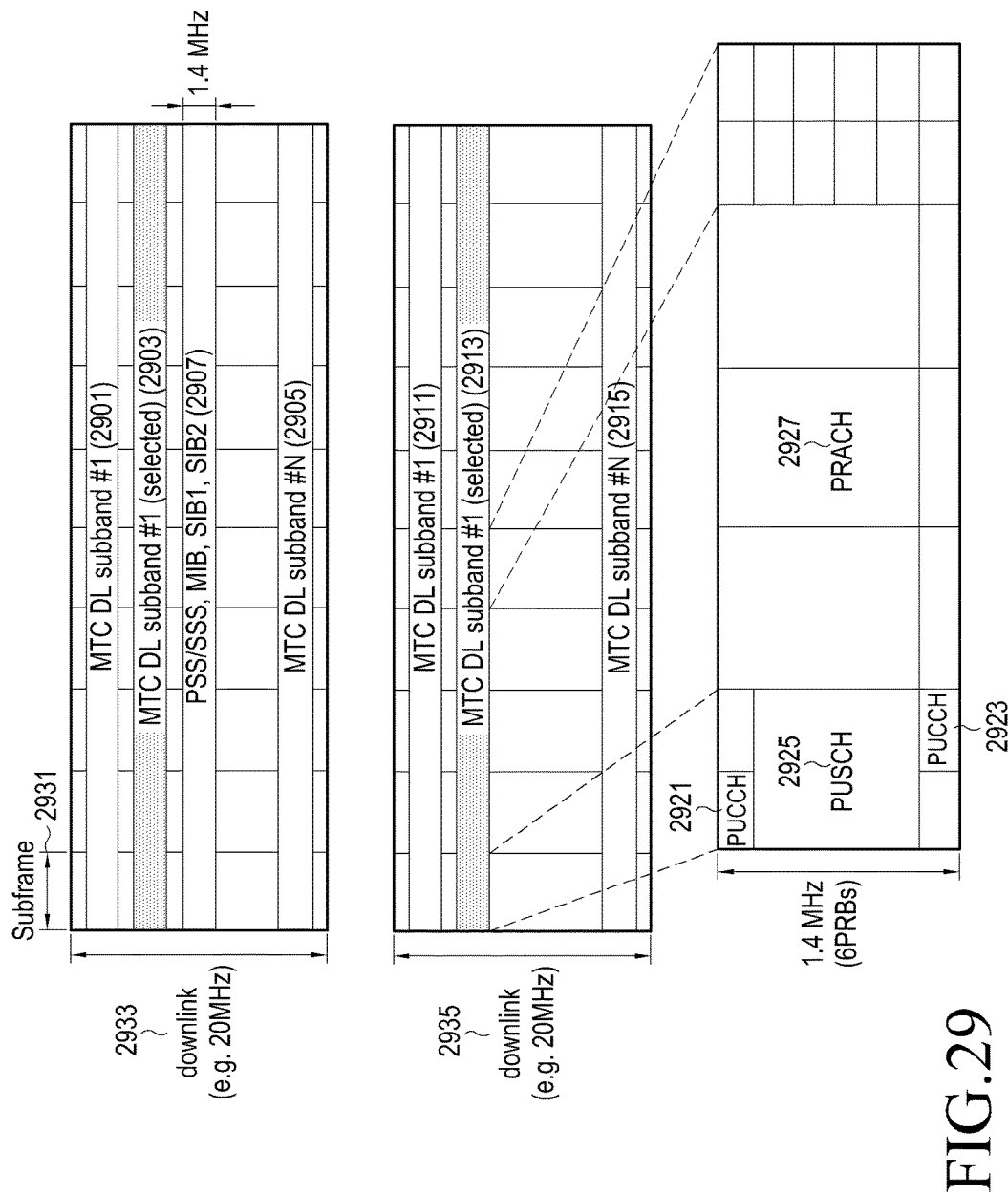
FIG. 29 is a view illustrating a frame structure according to an embodiment of the present disclosure.

FIG. 29 is a view illustrating a frame structure according to an embodiment of the present disclosure.

Referring to FIG. 29, the vertical axis denotes the frequency, and the horizontal axis denotes the time. The downlink 2999 frame is used to transmit a signal from the base station to the terminal, and the uplink 2935 frame is used to transmit from the terminal to the base station. FIG. 29 illustrates an example in which there are N independent bands available by a narrowband MTC terminal on downlink and uplink. First, there is a separate subband for transmitting basic information by which narrowband MTC terminal may have initial access (2907). Through the subband, information necessary for terminals in the cell to perform basic operations, such as MIB and SIB, is transmitted to transmit information regarding whether the corresponding cell supports the narrowband MTC terminal and information regarding the subbands 2901, 2903, 2905, 2911, 2913, and 2915 where the narrowband MTC terminal operates.

Meanwhile, the subbands may be provided in pairs. For example, there may be downlink 2901 and uplink 2911 corresponding to subband 1, downlink 2903 and uplink 2913 corresponding to subband 2, and downlink 2905 and uplink 2915 corresponding to subband N.

It is assumed in FIG. 29 that there is PRACH 2927 for random access per uplink of each subband. That is, if the narrowband MTC terminal selects one of the subbands provided by the base station, it may presumptively perform all the operations within the corresponding subband.

Figure 30:
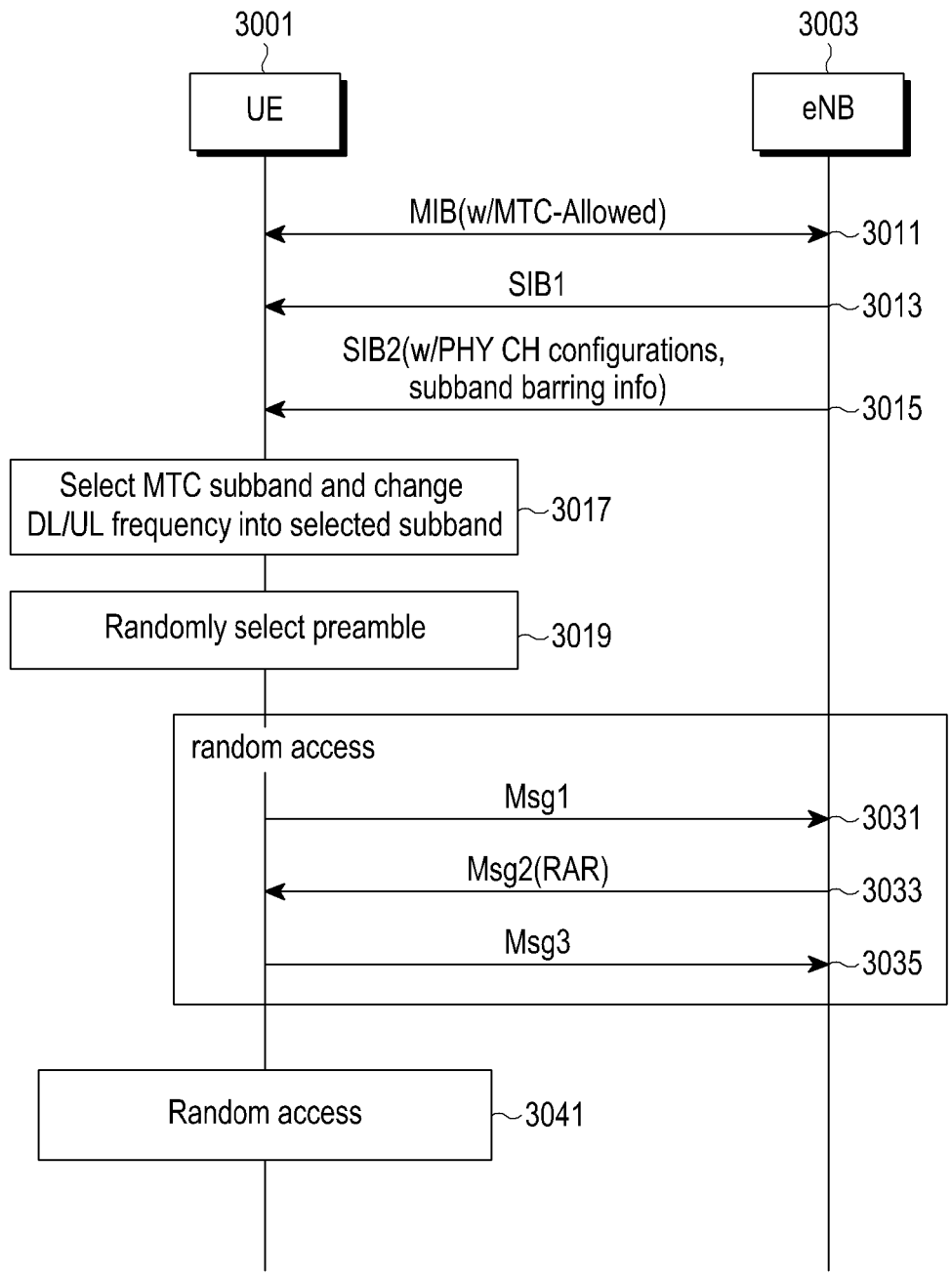
FIG. 30 is a flowchart illustrating a message flow of a random access procedure of an MTC terminal as proposed on the frame structure described in connection with FIG. 29 according to a tenth embodiment of the present disclosure.

FIG. 30 is a flowchart illustrating a message flow of a random access procedure of an MTC terminal as proposed on the frame structure described in connection with FIG. 29 according to a tenth embodiment of the present disclosure.

The terminal 3001 supporting only narrowband frequency first checks if the base station supports the terminal in order to access the base station 3003 (3011). Although the terminal supporting only narrowband frequency as described above is denoted MTC terminal for ease, the present disclosure is not limited to MTC, and it may refer to all types of terminals supporting only narrowband frequency. In order to inform that the base station supports MTC terminal, according to the present disclosure, it is proposed to add a predetermined indicator to MIB, and in case the predetermined indicator is included, the terminal may identify that the base station transmitting the MIB supports the MTC terminal and may continue to perform access procedure. In case the base station does not support the MTC terminal, the terminal determines that it cannot access the base station and thus the base station is blocked and attempts to access other base station with the same frequency or cell/base station with other frequency.

Thereafter, the terminal receives system information such as SIB1 3013 or SIB2 3015 to receive PRACH information and MTC subbands (2901, 2903, 2905, 2911, 2913, and 2915 of FIG. 29) information of the current base station. Further, it may additionally transmit an indicator indicating whether access to the MTC subband has been blocked in SIB1 or SIB2 (3015). This is for preventing congestion in a particular MTC subband.

When receiving this, the terminal determines the MTC subband at which the terminal is to operate and varies the downlink and uplink frequencies with the selected MTC subband (3017). In this example, it is assumed that the terminal has selected subband 2 (2903 and 2913 of FIG. 29). As described above in connection with FIG. 29, the scenario according to this embodiment assumes that a separate PRACH is present for each subband.

It should be noted that upon randomly selecting a subband in operation 3017, e.g., RSRP strength may be considered.

Having varied the frequency with the selected subband in operation 3017, the terminal selects preamble for transmission (3019) and transmits the selected preamble (3031). The transmitted preamble may be the same as existing one defined in LTE system, or may be a preamble additionally defined for MTC terminal. In case one same preamble is transmitted, if the PRACH is shared with other terminals than the MTC terminal, it may additionally receive a preamble identifier group used by the MTC terminal from SIB2 and select one preamble of the group and transmit it.

Having received the preamble, the base station transmits a response message thereto, RAR message (3033), and when receiving the RAR message, the terminal transmits Msg3 according to the information included in the RAR message, as described above in connection with FIG. 28 (3035). In case the terminal shares the PRACH with the normal terminal in operation 3031 and transmits one same preamble, when transmitting Msg3, it may include a separate uplink logical channel identifier in the header and transmit it. The uplink logical channel identifier used is proposed to use one in a range from Ob01011 to Ob11000.

Having succeeded in random access according to the above procedure, the terminal, before until shifting to idle mode (RRC_IDLE state) in the future, performs random access on the MTC subband it currently operates to communicate with the base station when it requires random access operation (3041).

Figure 31:
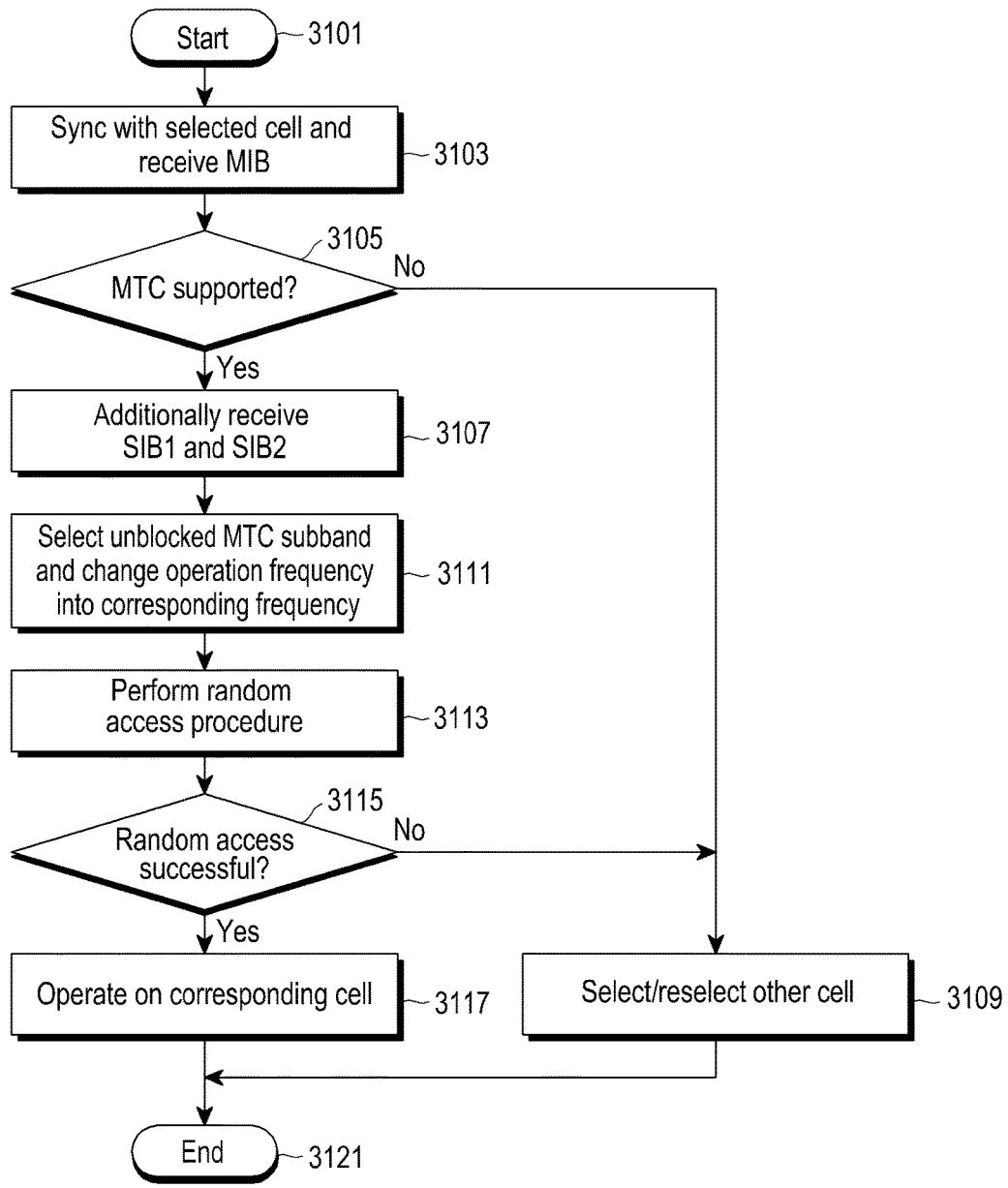
FIG. 31 is a flowchart illustrating an operation of a terminal to which the tenth embodiment of the random access procedure of the MTC terminal applies according to an embodiment of the present disclosure.

FIG. 31 is a flowchart illustrating an operation of a terminal to which the tenth embodiment of the random access procedure of the MTC terminal applies according to an embodiment of the present disclosure.

Referring to FIG. 31, the MTC terminal in RRC_IDLE mode selects a cell through cell selection or cell reselection process (3101) and syncs with the selected cell and receives MIB information (3103). According to the present disclosure, in order to inform whether the base station supports MTC terminal, it is proposed to add a predetermined indicator to the MIB, and in case the predetermined indicator is added (3105), the terminal may continue to perform access procedure by identifying that the base station transmitting the MIB supports the MTC terminal. However, in case the base station does not support MTC terminal, the terminal determines that the corresponding has been blocked and performs a procedure of selecting other cell (3109).

In case it identifies that the base station supports MTC terminal, the terminal additionally receives SIB1 and SIB2 from the base station (3107). SIB1 and SIB2 contains PRACH information on the current base station and MTC subband ((2901)(2903)(2905)(2911)(2913)(2915) in FIG. 29) information, and according to the present disclosure, additionally, an indicator indicating whether access to the MTC subband is blocked may be transmitted through SIB1 or SIB2. This is for preventing congestion in a particular MTC subband.

According to the information received from SIB1 and SIB2, the terminal selects an unblocked MTC subband (MTC subband 2 2903 or 2913 in FIG. 29) randomly or by a predetermined method utilizing the terminal identifier and varies the operation frequency into the corresponding frequency (3111). Thereafter, as described above in connection with FIG. 28, random access is performed (3113). Having succeeded in random access (3115), the terminal continues to operate on the corresponding MTC subband, and before until shifting to idle mode (RRC_IDLE state) in the future, performs random access on the MTC subband it currently operates to communicate with the base station when it requires random access operation (3117). Upon failure to the random access procedure (3115), the terminal selects or reselects another cell (3131).

Figure 32:
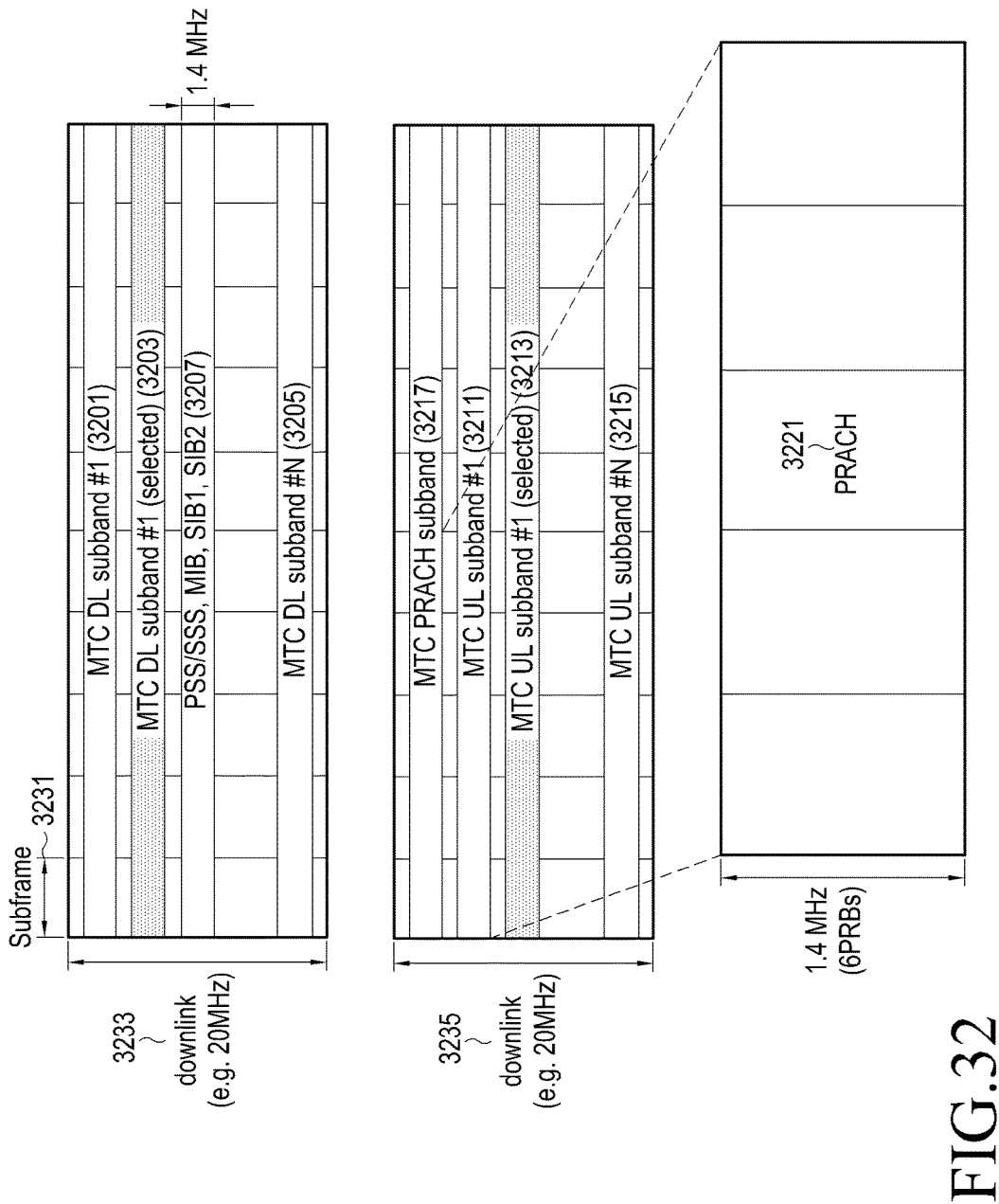
FIG. 32 is a view illustrating a frame structure according to an embodiment of the present disclosure.

FIG. 32 is a view illustrating a frame structure according to an embodiment of the present disclosure.

Referring to FIG. 32, the vertical axis denotes the frequency, and the horizontal axis denotes the time. There are downlink 3233 used for transmitting signal from base station to terminal and uplink 3235 used for transmitting signal from terminal to base station, and in FIG. 32, N independent bands are shown that may be used by narrowband MTC terminal on downlink and uplink. First, there is a separate subband for transmitting basic information by which narrowband MTC terminal may have initial access (3207). Through the subband, information necessary for terminals in the cell to perform basic operations, such as MIB and SIB, is transmitted to transmit information regarding whether the corresponding cell supports the narrowband MTC terminal and information regarding the subbands 3201, 3203, 3205, 3211, 3213, 3215, and 3217 where the narrowband MTC terminal operates.

Meanwhile, the subbands may be provided in pairs. For example, there may be downlink 3201 and uplink 3211 corresponding to subband 1, downlink 3203 and uplink 3213 corresponding to subband 2, and downlink 3205 and uplink 3215 corresponding to subband N.

Unlike in FIG. 29, in FIG. 32, PRACH is not present per uplink of each subband, and it is assumed that a separate subband is provided for random access commonly used by narrowband MTC terminals (3217). That is, it is assumed that narrowband MTC terminal, whenever needing random access, shifts its operation frequency to the subband 3217 for random access to transmit random access preamble.

Figure 33:
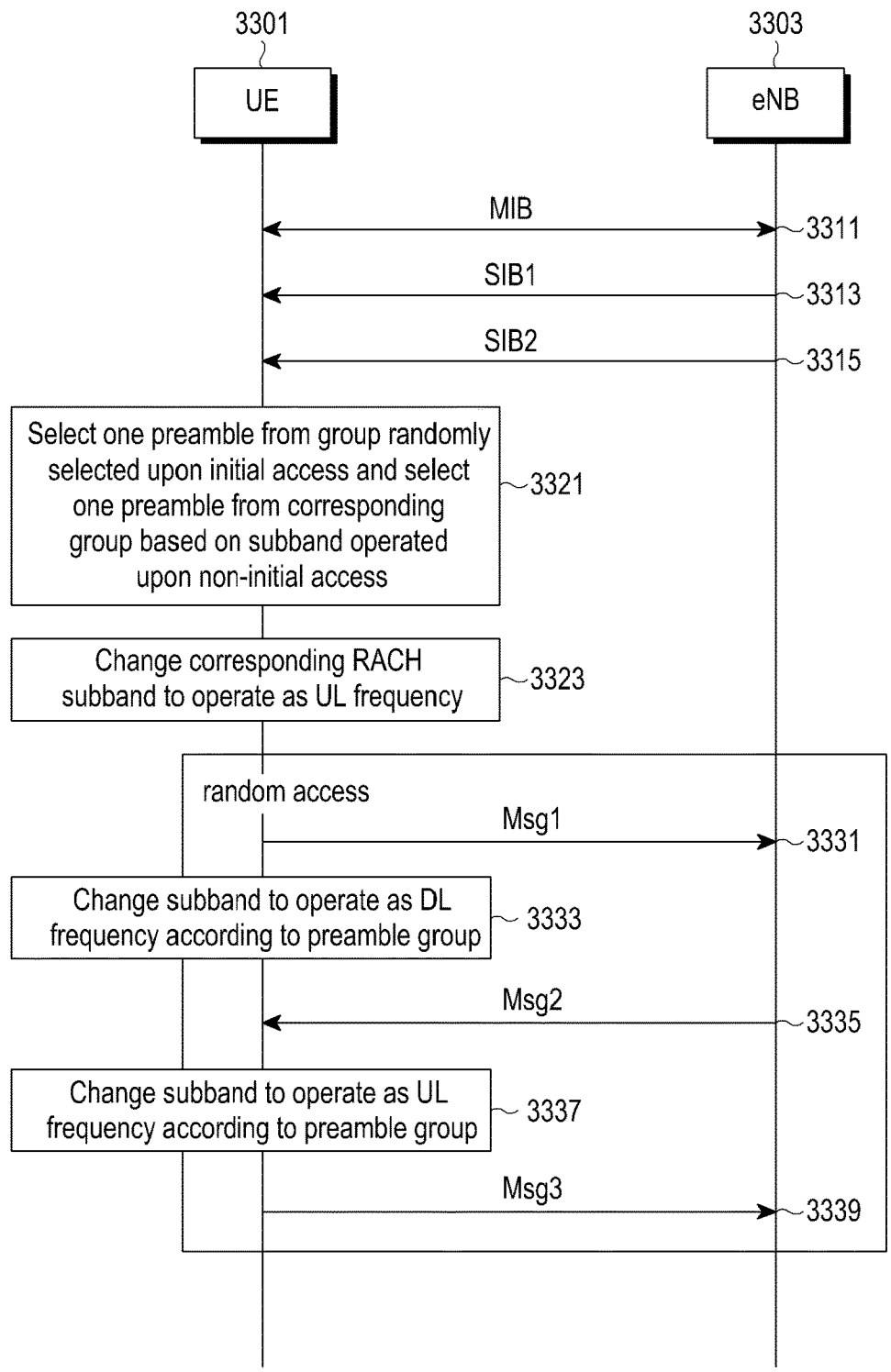
FIG. 33 is a flowchart illustrating a message flow of a random access procedure of an MTC terminal as proposed on the frame structure described in connection with FIG. 32 according to an eleventh embodiment of the present disclosure.

FIG. 33 is a flowchart illustrating a message flow of a random access procedure of an MTC terminal as proposed on the frame structure described in connection with FIG. 32 according to an eleventh embodiment of the present disclosure.

The terminal 3301 supporting only narrowband frequency first checks if the base station supports the terminal in order to access the base station 3303. Although the terminal supporting only narrowband frequency as described above is denoted MTC terminal for ease, the present disclosure is not limited to MTC, and it may refer to all types of terminals supporting only narrowband frequency. In order to inform that the base station supports MTC terminal, according to the present disclosure, it is proposed to add a predetermined indicator to MIB, and in case the predetermined indicator is included, the terminal may identify that the base station transmitting the MIB supports the MTC terminal and may continue to perform access procedure. In case the base station does not support the MTC terminal, the terminal determines that it cannot access the base station and thus the base station is blocked and attempts to access other base station with the same frequency or cell/base station with other frequency.

Thereafter, the terminal receives system information such as SIB1 3313 or SIB2 3315 to receive PRACH information and MTC subbands (3201, 3203, 3205, 3211, 3213, 3215, and 3217 of FIG. 32) information of the current base station. Further, it may additionally transmit an indicator indicating whether access to the MTC subband has been blocked in SIB1 or SIB2 (3215). This is for preventing congestion in a particular MTC subband.

This embodiment assumes that preamble groups are separated per subband. For example, in case there are 50 available preambles, preambles 1 to 10 may be used for MTC subband 1, and preambles 11 to 20 may be used for MTC subband 2, and the numbers are merely an example, and the base station transmits corresponding information to the terminal using SIB1 or SIB2.

Accordingly, the terminal performing initial access selects a particular MTC subband through a predetermined method using the terminal's identifier or randomly among the currently unblocked MTC subbands of the base station and selects one preamble corresponding to the corresponding group (3321). In the exemplary figure, it is assumed that MTC subband 2 is selected, and accordingly, one preamble belonging to MTC subband 2 is selected. Meanwhile, if not initial access, one of preambles of the group corresponding to the corresponding subband is selected according to the MTC subband currently operated.

Thereafter, the terminal changes (3323) the uplink transmission frequency into subband (3217 in FIG. 32) for random access for transmission of preamble and transmits the selected preamble (3331). Thereafter, in order to receive a response to the transmitted preamble, i.e., RAR message, the terminal changes (3333) the downlink frequency into the downlink subband (3103 in FIG. 31) where the transmitted preamble belongs and receives the RAR message (3335). The base station allocates resource corresponding to the uplink (3113 of FIG. 31) of the corresponding group through the RAR message according to the group where the preamble received in operation 3331 is received.

Having received the RAR message, the terminal changes the uplink operation frequency into the corresponding MTC subband (3213 in FIG. 32) according to the preamble group transmitted in operation 831 and transmits Msg3 as described above in connection with FIG. 28 (3339).

Having succeeded in random access according to the above procedure, the terminal, before until shifting to idle mode (RRC_IDLE state) in the future, selects the preamble corresponding to the MTC subband currently operated (3321) and performs random access according to the above-described procedure to communicate with the base station when it requires random access operation.

Figure 34:
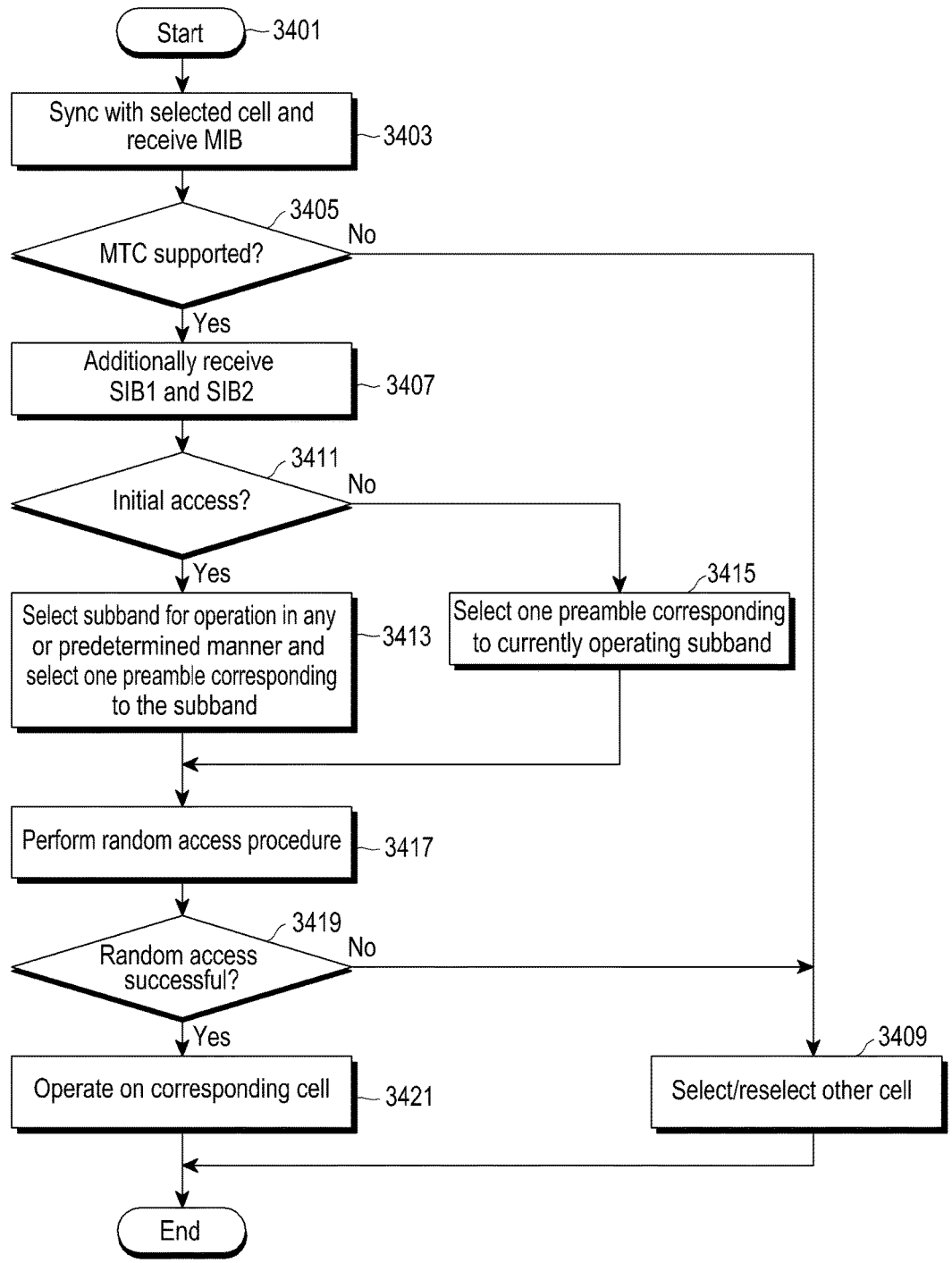
FIG. 34 is a flowchart illustrating an operation of a terminal to which the eleventh embodiment of the random access procedure of the MTC terminal applies according to an embodiment of the present disclosure.

FIG. 34 is a flowchart illustrating an operation of a terminal to which the eleventh embodiment of the random access procedure of the MTC terminal applies according to an embodiment of the present disclosure.

Referring to FIG. 34, the MTC terminal in RRC_IDLE mode selects a cell through cell selection or cell reselection process (3401) and syncs with the selected cell and receives MIB information (3403). According to the present disclosure, in order to inform whether the base station supports MTC terminal, it is proposed to add a predetermined indicator to the MIB, and in case the predetermined indicator is added (3405), the terminal may continue to perform access procedure by identifying that the base station transmitting the MIB supports the MTC terminal. However, in case the base station does not support MTC terminal, the terminal determines that the corresponding has been blocked and performs a procedure of selecting other cell (3409).

In case it identifies that the base station supports MTC terminal, the terminal additionally receives SIB1 and SIB2 from the base station (3407). SIB1 and SIB2 contains PRACH information on the current base station and MTC subband ((3201)(3203)(3205)(3211)(3213)(3215)(3217) in FIG. 32) information, and according to the present disclosure, additionally, an indicator indicating whether access to the MTC subband is blocked may be transmitted through SIB1 or SIB2. This is for preventing congestion in a particular MTC subband.

In case the current random access is initial access or reaccess (3411), the terminal selects a particular MTC subband through a predetermined method using the terminal's identifier or randomly among the currently unblocked MTC subbands of the base station according to the information received from SIB1 and SIB2 and selects one preamble corresponding to the corresponding group (3413). In the exemplary figure, it is assumed that MTC subband 2 is selected, and accordingly, one preamble belonging to MTC subband 2 is selected. Meanwhile, if not initial access, one of preambles of the group corresponding to the corresponding subband is selected according to the MTC subband currently operated (3415).

Thereafter, as described above in connection with FIG. 33, random access is performed (3417). Having succeeded in random access procedure, the terminal continues to operate on the corresponding MTC subband, and before until shifting to idle mode (RRC_IDLE state) in the future, selects the preamble corresponding to the MTC subband currently operated (3415) and performs random access (3417) according to the above-described procedure to communicate with the base station when it requires random access operation.

Figure 35:
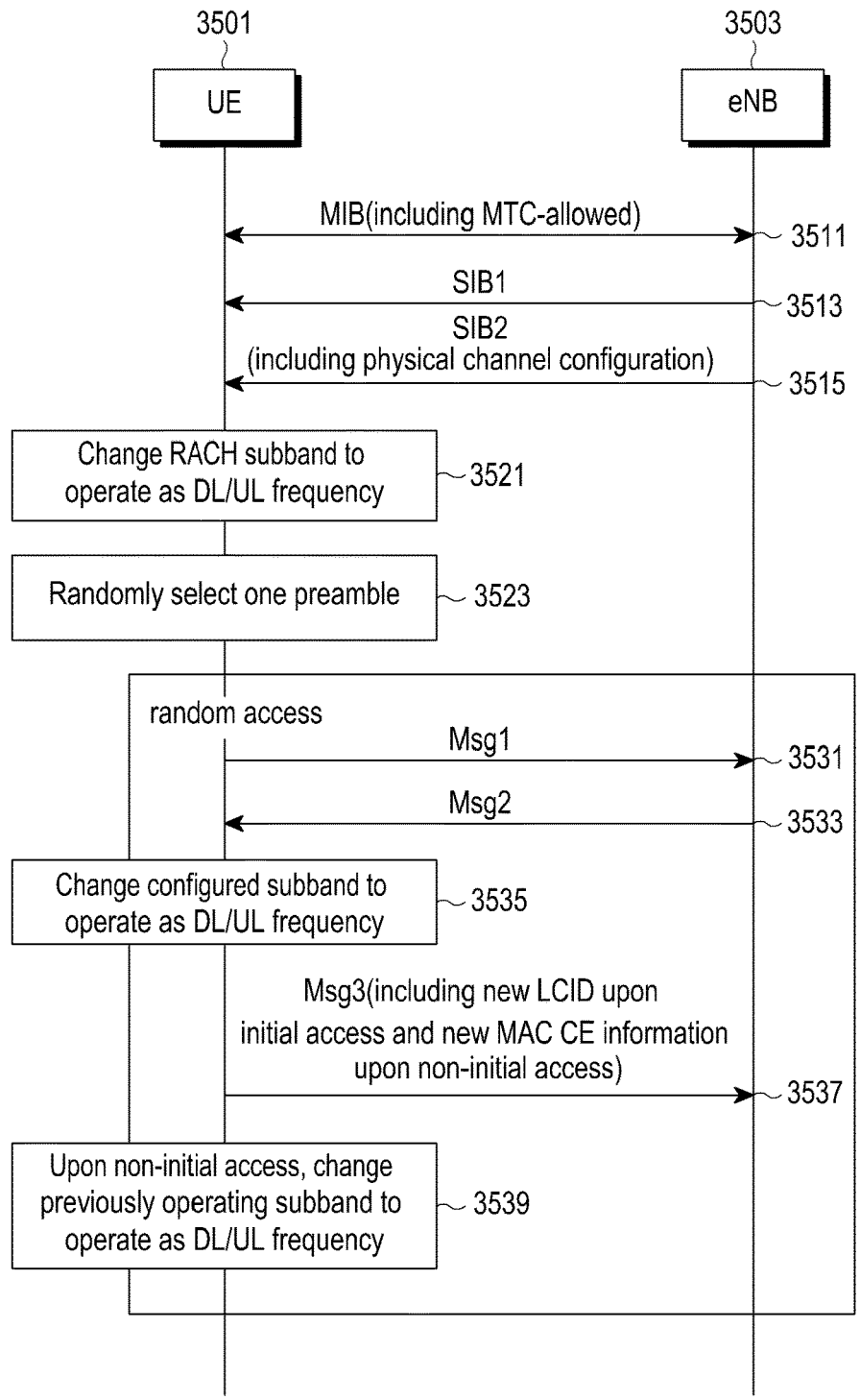
FIG. 35 is a flowchart illustrating a message flow of a random access procedure of an MTC terminal as proposed on the frame structure described in connection with FIG. 32 according to a twelfth embodiment of the present disclosure.

FIG. 35 is a flowchart illustrating a message flow of a random access procedure of an MTC terminal as proposed on the frame structure described in connection with FIG. 32 according to a twelfth embodiment of the present disclosure.

The terminal 3501 supporting only narrowband frequency first checks if the base station supports the terminal in order to access the base station 3503. Although the terminal supporting only narrowband frequency (e.g., 1.4 MHz) as described above is denoted MTC terminal for ease, the present disclosure is not limited to MTC, and it may refer to all types of terminals supporting only narrowband frequency. In order to inform that the base station supports MTC terminal, according to the present disclosure, it is proposed to add a predetermined indicator to MIB, and in case the predetermined indicator is included, the terminal may identify that the base station transmitting the MIB supports the MTC terminal and may continue to perform access procedure. In case the base station does not support the MTC terminal, the terminal determines that it cannot access the base station and thus the base station is blocked and attempts to access other base station with the same frequency or cell/base station with other frequency.

Thereafter, the terminal receives system information such as SIB1 3513 or SIB2 3515 to receive PRACH information and MTC subbands (3201, 3203, 3205, 3211, 3213, 3215, and 3217 of FIG. 32) information of the current base station. Meanwhile, unlike in the embodiment described above in connection with FIG. 33, in this embodiment, it is assumed that there is also downlink random access subband mapped to uplink (e.g., 3207 in FIG. 32). That is, if random access preamble is transmitted through subband 3217 of FIG. 32, a response message thereto, RAR message, is transmitted through a predetermined downlink subband (e.g., 3207 of FIG. 32), and the information is also received through SIB1 or SIB2.

Having received the PRACH information and MTC subband information, the terminal changes (3521) uplink and downlink operation frequencies into random access subbands (3217 of FIG. 32 and downlink mapped thereto (e.g., 3207 of FIG. 7)), selects any preamble (3523), and transmits the selected preamble through a preamble subband (3217 of FIG. 32) (3531).

Thereafter, it receives the RAR message from predetermined preamble downlink subband (3207 of FIG. 32) (3533). The base station configures information on subband where the terminal is to operate in the future in the RAR message and transmits the same. According to the configuration information, the terminal changes the uplink and downlink operation frequencies into the subbands as configured above (3535) and transmits Msg3 as described in connection with FIG. 28 (3537) and operates on the corresponding MTC subband.

Meanwhile, the terminal having successfully performed random access according to the above procedure, when requiring random access in the future, changes operation frequency into the random access subband (3521) and performs random access procedure. As such, in case the terminal is being used liked with the base station rather than performing initial access or reaccess, the terminal, when transmitting Msg3 (3537), includes the information on the subband where it used to operate in the Msg3 and informs the base station. To inform, an MAC layer message called a new MAC CE, may be used to notify the information on the existing MTC subband used. Thereafter, the terminal changes the operation frequency into the existing MTC subband used and operates (3539).

Figure 36:
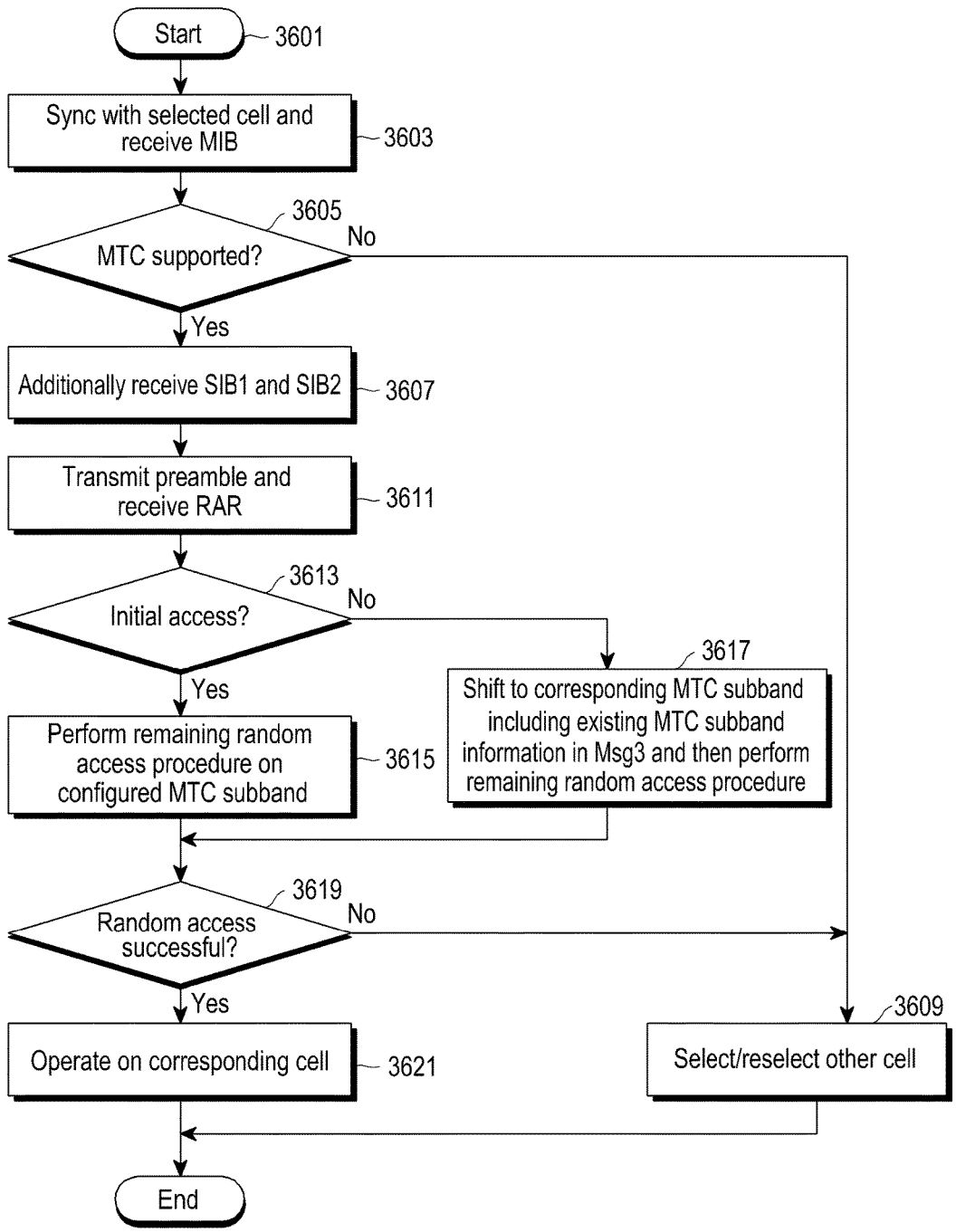
FIG. 36 is a flowchart illustrating an operation of a terminal to which the twelfth embodiment of the random access procedure of the MTC terminal applies according to an embodiment of the present disclosure.

FIG. 36 is a flowchart illustrating an operation of a terminal to which the twelfth embodiment of the random access procedure of the MTC terminal applies according to an embodiment of the present disclosure.

Referring to FIG. 36, the MTC terminal in RRC_IDLE mode selects a cell through cell selection or cell reselection process (3601) and syncs with the selected cell and receives MIB information (3603). According to the present disclosure, in order to inform whether the base station supports MTC terminal, it is proposed to add a predetermined indicator to the MIB, and in case the predetermined indicator is added (3605), the terminal may continue to perform access procedure by identifying that the base station transmitting the MIB supports the MTC terminal. However, in case the base station does not support MTC terminal, it determines that the corresponding has been blocked and performs a procedure of selecting other cell (3609). In case it identifies that the base station supports MTC terminal, the terminal additionally receives SIB1 and SIB2 from the base station (3607). SIB1 and SIB2 includes PRACH information and MTC subbands (3201, 3203, 3205, 3211, 3213, 3215, and 3217 of FIG. 32) information of the current base station. The terminal shifts to the random access subband according to the received information and transmits preamble and receives a response message responsive thereto (3611). In case of initial access or reaccess (3613), it finishes the remaining random access procedure according to the configuration information included in the response message (3615). The terminal that has been operating with the base station, as described in connection with FIG. 10, includes the information on the MTC subband where it used to operate in Msg3 and shifts to the corresponding MTC subband and finishes the remaining random access procedure (3617).

Having successfully done the remaining random access procedure (3619), the terminal then continues to operate on the corresponding MTC subband (3621), and in case it requires random access in future connected state, includes the information on the MTC subband where it used to operate in the Msg3 (3617) and operates to continue operation on the MTC subband where it originally used to.

Figure 37:
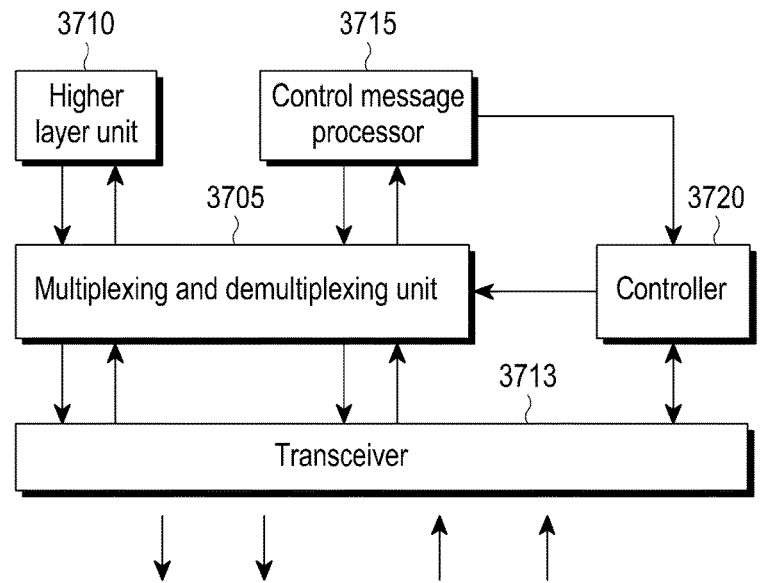
FIG. 37 is a block diagram illustrating an internal structure of a terminal according to an embodiment of the present disclosure.

FIG. 37 is a block diagram illustrating an inner structure of a UE according to an embodiment of the present disclosure.

The terminal communicates data with a higher layer unit 3710 and communicates control messages through a control message processor 3715. The terminal multiplexes control signals or data through a multiplexer 3705 under the control of controller 3720 when sending the control signals or data to the base station and transmits the data to through a transmitter 3700. By contrast, upon reception, the terminal receives physical signals through the receiver 3700 under the control of the controller 3720, demultiplexes the received signals through a demultiplexer 3705, and transfers to the higher layer unit 3710 or control message processor 3715 depending on each message information. For example, SIB is such a control message.

Although described is an example in which the terminal consists of a plurality of blocks and each block performs a different function, this is merely an example, and is not limited thereto. For example, the function performed by the demultiplexer 1205 may be performed by the controller 1220.

Figure 38:
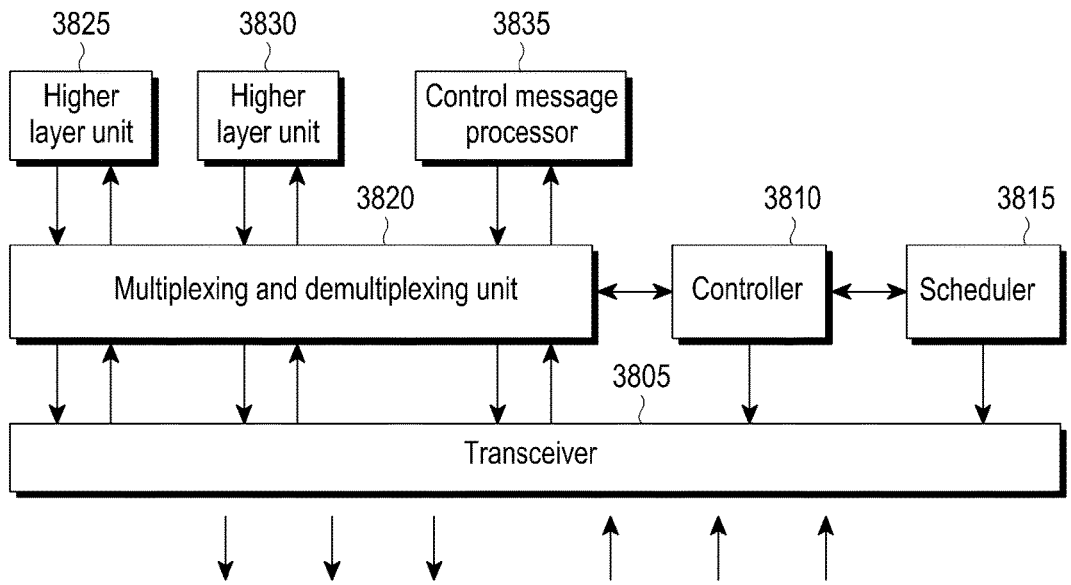
FIG. 38 is a block diagram illustrating an internal structure of a base station according to an embodiment of the present disclosure.

FIG. 38 is a block diagram illustrating an internal structure of a base station according to an embodiment of the present disclosure.

Referring to FIG. 38, according to the present disclosure, the base station may include a transceiver 3805, a controller 3810, a multiplexing and demultiplexing unit 3820, a control message processor 3835, various higher layer units 3825 and 3830, and a scheduler 3815. The transceiver 3805 transmits data and a predetermined control signal through a forward carrier and receives data and a predetermined control signal through a backward carrier. When multiple carriers are configured, the transceiver 3805 conducts communication of data and control signals through the multiple carriers. The multiplexing and demultiplexing unit 3820 multiplexes data generated in the higher layer units 3825 and 1330 or the control message processor 3835 or demultiplexes data received from the transceiver 3805 and transfers the resultant data to a proper higher layer unit 3825 and 3830, the control message processor 3835, or the controller 3810. The control message processor 3835 may process control message transmitted from the UE and perform necessary operations, or generate control messages to be transferred to the UE and transfer the control messages to a lower layer. The higher layer units 3825 and 1330 may be configured per UE or service, and may process data generated in a user service such as file transfer protocol (FTP) or voice over Internet protocol (VoIP) to transfer the same to the multiplexing and demultiplexing unit 3820 or processes data transferred from the multiplexing and demultiplexing unit 3820 to transfer the same to a higher layer unit's service application. The scheduler 3815 allocates a transmission resource to the UE at a proper time considering, e.g., the buffer state, channel state, and active time of the UE and processes the transceiver to process the signal transmitted from the UE or to transmit a signal to the UE.

The use of the method proposed enables seamless communication and support of random access so that the MTC terminal supportive of narrow-band frequency may access the base station operating at a wideband frequency.

Meanwhile, as a web application programming interface (API) called web real-time communication (WebRTC) has been standardized, users happened to be able to make calls (real-time communication) through a browser without the need of installing a plugin for the browser or a separate application. A user (sender) may download a web application through the browser and may make a call using the identity (ID) of the recipient already known to the sender. Here, the recipient needs to have downloaded the same web application as that used by the sender or a web application at least interoperable with the sender's web application through his browser in order to receive the call.

The above-described basic WebRTC based calling is limited. For example, particular web applications should have been downloaded through the browser for calling and receiving. Simply speaking, calling and receiving are required to access a particular website and login (some web sites do not require login depending on their features). From a normal perspective where the sender and the recipient do not previously agree on downloading a particular web application through their browsers before calling, such limitation is quite bothering.

To address such limitation, the 3GPP, since Release 12, has conducted the work that enables the use of the IMS of the legacy mobile communication network through WebRTC. The core idea of this work lies in allowing the user desiring to call through WebRTC to register in the IMS. For convenience, the user who registers in the IMS and calls through WebRTC is referred to as a WebRTC IMS client ("WIC").

On the sender's position regarding the effects of the above-described work, the targeted recipient is expanded from the browser user who has downloaded a compatible web application to common mobile phone users or landline users. This is true on the position of the recipient. Although basic WebRTC-based calling requires the sender to be the browser user who has downloaded a compatible web application, the 3GPP work enables common mobile phone users or landline users to make a call to the recipient registered in the IMS.

Generally, to register somewhere, the ID of the registering entity is required. Likewise, to register in the IMS, an IMS ID is required. The IMS ID refers to an IMS public user ID (IMPU) and/or an IMS private user ID (IMPI). Existing 3GPP release 12 tasks have primarily focused on standardizing the cases where the WIC may obtain the IMPU, IMPI, and/or their relevant IMS authentication information from the terminal/user itself such as the terminal's subscriber identification module (SIM) card and/or user input. However, when the WIC may obtain the IMPU, IMPI, and/or IMS authentication information from the terminal/user itself, calling need not rely on the browser. In this sense, the standardization loses its utility or applicability.

According to an embodiment of the present disclosure, there are proposed a method and apparatus enabling the WIC to call through the IMS and WebRTC without the need of directly obtaining the IMS ID and/or its relevant IMS authentication information from the terminal/user.

Figure 39:
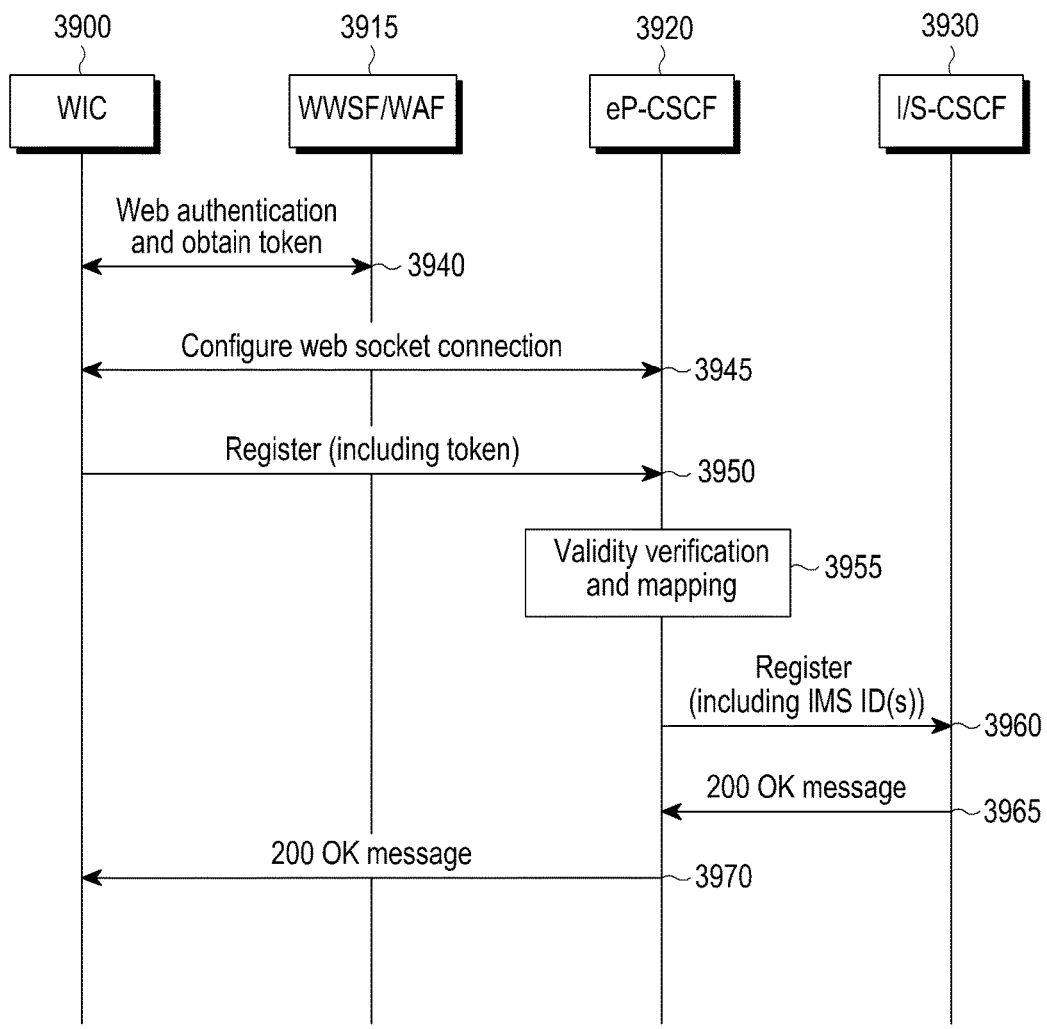
FIG. 39 is a flowchart illustrating a process of registering to an IMS by a WIC according to an embodiment of the present disclosure.

FIG. 39 is a flowchart illustrating a process of registering to an IMS by a WIC according to an embodiment of the present disclosure.

The embodiment of the present disclosure described in connection with FIG. 39 may apply to, e.g., the scenario that the WIC having done authentication with the web server registers in the IMS through an individual IMPU, and/or the scenario that the WIC assigned an individual IMPU from the IMPU pool possessed by the web server registers in the IMS.

Hereinafter, embodiments of the present disclosure are described in detail.

FIG. 39 illustrates a scenario according to an embodiment of the present disclosure.

The user may access the resources of the WebRTC web server function (WWSF) 3910 through the browser. For security purposes, the user may establish a connection with the WWSF 3910 through the hypertext transfer protocol over secure socket layer (HTTPS) protocol. The browser may download a web application from the WWSF 3910. Accordingly, the WIC 3900 may be activated.

In operation 3940, the WWSF 3910 may authenticate the user in its own manner or interworking with the WebRTC authentication function (WAF) 3915 through at least one of various web authentication schemes. An exemplary web authentication scheme is to use the user ID and password. The WWSF 3910 and/or the WAF 3915 might not authenticate the user. The WWSF 3910 may determine the IMPU and/or IMPI to be assigned to the user. The assigned IMPU and/or IMPI may have a semi-permanent or temporary connection with the user. For example, the IMPU and/or IMPI assigned to the user who does not perform web authentication would be highly likely to be designed to have a temporary connection. In contrast, the IMPU and/or IMPI assigned to the user who performs web authentication may establish a semi-permanent connection with the user (or user ID). The WAF 3915 may issue a token corresponding to the IMPU and/IMPI assigned by the WWSF 390.

The WWSF 3910 may transfer the token issued by the WAF 395 to the WIC 3900. The WWSF 3910 may transfer an additional IMPU and/or IMPI assigned to the WIC 3900.

In operation 3945, the WIC 3900 may initiate a safe WebSocket connection with the enhanced P-CSCF (eP-CSCF) 3920 for WebRTC. Accordingly, the WIC 3900 may be taken as having done the preparation for registering in the eP-CSCF 3920 which is an IMS entity.

In operation 3950, the WIC 3900 may send an IMS registration request message to the eP-CSCF 3920. The registration request message commonly includes the IMPU and/or IMPI. When the WIC 3900 receives the IMPU and/or IMPI from the WWSF 3910 in operation 3940 or obtains the IMPU and/or IMPI from the token received from the WWSF 3910 in operation 3940, it may put the IMPU and/or IMPI in the registration request message. Otherwise, what information should be sent instead of the IMPU and/or IMPI and how need to be defined. The header field (e.g., username header field) for inserting the IMPI is not necessarily send, filled. However, the header field (e.g., To, From) containing the IMPU in the registration request message may oftentimes need to be filled. The eP-CSCF 3920 may perform authentication using the token in operation 3955 described below. To that end, the WIC 3900, if there is the IMPU, may insert the token in the header field that will be filled with the IMPU. Taking an SIP message as an example, the WIC 3900 may generate a value to fill the To and/or From header field using the token.

In operation 3955, the eP-CSCF 3920 receiving the registration request message from the WIC 3900 may obtain the token. The eP-CSCF 3920 may determine whether the token is valid. To verify the validity of the token, the eP-CSCF 3920 may interwork with the WAF 3915. When the token is valid, the eP-CSCF 3020 may extract the IMPU, IMPI, WAF 3910 ID, WWSF 3910 ID, and token's lifetime from the token.

In operation 3960, the eP-CSCF 3920 may fill the To and From header fields of the REGISTER message to be transferred to the I-CSCF 3930 with the IMPU extracted from the token. The eP-CSCF 3920 may fill the user name header field of the REGISTER message to be transferred to the I-CSCF 3930 with the IMPI extracted from the token. Although the WIC 3900 has sent the header field while it is filled, the eP-CSCF 3920 may rewrite the header field with the information extracted from the token. As can be seen from the fact that the token's lifetime can be extracted from the token, the token has the lifetime assigned by the WAF 3915 having issued the token. When the token's lifetime expires, the IMPU and/or IMPI extractable from the token may be reassigned. This may be done by adjusting the IMS registration maintain time of the WIC 3900. The eP-CSCF 3920 may set the token's lifetime extracted from the token to the value of the expires header field of the REGISTER message (if the WIC 3900 transfers the registration expire time in operation 3950, the smaller of the registration expire time and the token's lifetime extracted from the token may be set). The I-CSCF 3930 may transfer the REGISTER message to the S-CSCF 3930.

In operation 3965, the I/S-CSCF 3930 may send a 200 OK message. This message may include the IMPU and/or IMPI.

In operation 3970, the eP-CSCF 3920 may transfer the 200 OK message to the WIC 3900. In case 200 OK message includes IMPU and/or IMPI, WIC 3900 stores the same and may use IMPU and/IMPI for re-registration/cancellation/session management message related to the registration in the future. If none, the WIC may use token in configuring re-registration/cancellation/session management message related to the registration. The 200 OK message may include the registration expire time value set in operation 3960 by the eP-CSCF 3920. When the registration expire time expires, the WIC 3900 releases the registration in the IMS and may inform the WWSF 3910 that the registration expires. As described above, the WWSF 3910 may newly assign the IMPU and/or IMPI.

It will be appreciated by one of ordinary skill in the art that the present disclosure may be implemented in other various specific forms without changing the essence or technical spirit of the present disclosure. Thus, it should be noted that the above-described embodiments are provided as examples and should not be interpreted as limiting.

In the above-described embodiments, all of the steps or messages may be optionally performed or omitted. In each embodiment, the steps and operations in the steps may not inevitably be performed in sequence, and may be performed in reversed order. Transfer of messages may not inevitably be performed in sequence, and may be performed in reversed order. Each step and message may be independently performed.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

What is claimed is:

1. A method of a user equipment (UE) in a wireless communication system, the method comprising:
    receiving, from a base station (BS), a master information block (MIB) including information related to a number of repetition transmission of a first system information block (SIB);
    receiving, from the BS, the first SIB based on the information related to the number of repetition transmission, the first SIB including scheduling information of a second SIB; and
    receiving, from the BS, the second SIB based on the scheduling information.

2. The method of claim 1,
    wherein the first SIB is repeatedly received based on the number of repetition transmission and is used for a machine type communication UE, and
    wherein the scheduling information includes at least one of information on a frequency resource or information on frequency hopping used for transmission of the second SIB for the machine type communication UE.

3. The method of claim 1, further comprising:
    receiving, from the BS, information indicating system information update on a downlink control channel.

4. The method of claim 1,
    wherein the first SIB further includes information indicating an extended system frame number (SFN) for a machine type communication UE, and
    wherein the first SIB or the second SIB further includes at least one of:
        information indicating a number of repetition transmission of a preamble associated with a random access for the machine type communication UE,
        information on a physical random access channel (PRACH) resource associated with the random access for the machine type communication UE, or
        information on at least one threshold associated with the PRACH resource for the machine type communication UE.

5. The method of claim 4, further comprising:
    measuring a reference signal received power (RSRP);
    determining a repetition level for the repetition transmission of the preamble based on a comparison result of the RSRP with the at least one threshold; and
    transmitting, to the BS, the preamble based on the number of the repetition transmission associated with the determined repetition level.

6. A user equipment (UE) in a wireless communication system, the UE comprising:
    a transceiver; and
    at least one processor coupled with the transceiver and configured to:
        receive, from a base station (BS), a master information block (MIB) including information related to a number of repetition transmission of a first system information block (SIB), receive, from the BS, the first SIB based on the information related to the number of repetition transmission, the first SIB including scheduling information of a second SIB, and receive, from the BS, the second SIB based on the scheduling information.

7. The UE of claim 6, wherein the first SIB is repeatedly received based on the number of repetition transmission and is used for a machine type communication UE, and wherein the scheduling information includes at least one of information on a frequency resource or information on frequency hopping used for transmission of the second SIB for the machine type communication UE.

8. The UE of claim 7, wherein the at least one processor is further configured to receive, from the BS, information indicating system information update on a downlink control channel.

9. The UE of claim 7, wherein the first SIB further includes information indicating an extended system frame number (SFN) for a machine type communication UE, and wherein the first SIB or the second SIB further includes at least one of:

information indicating a number of repetition transmission of a preamble associated with a random access for the machine type communication UE, information on a physical random access channel (PRACH) resource associated with the random access for the machine type communication UE, or information on at least one threshold associated with the PRACH resource for the machine type communication UE.

10. The UE of claim 9, wherein the at least one processor is further configured to:

measure a reference signal received power (RSRP), determine a repetition level for the repetition transmission of the preamble based on a comparison result of the RSRP with the at least one threshold, and transmit, to the BS, the preamble based on the number of the repetition transmission associated with the determined repetition level.

11. A method of a base station (BS) in a wireless communication system, the method comprising:

transmitting a master information block (MIB) including information related to a number of repetition transmission of a first system information block (SIB);

transmitting the first SIB based on the information related to the number of repetition transmission, the first SIB including scheduling information of a second SIB; and transmitting the second SIB based on the scheduling information.

12. The method of claim 11, wherein the first SIB is repeatedly transmitted based on the number of repetition transmission and is used for a machine type communication UE, and wherein the scheduling information includes at least one of information on a frequency resource or information on frequency hopping used for transmission of the second SIB for the machine type communication UE.

13. The method of claim 11, further comprising:

transmitting information indicating system information update on a downlink control channel.

14. The method of claim 11, wherein the first SIB further includes information indicating an extended system frame number (SFN) for a machine type communication UE, and wherein the first SIB or the second SIB further includes at least one of:

information indicating a number of repetition transmission of a preamble associated with a random access for the machine type communication UE, information on a physical random access channel (PRACH) resource associated with the random access for the machine type communication UE, or information on at least one threshold associated with the PRACH resource for the machine type communication UE.

15. The method of claim 14, further comprising:

receiving, from the machine type communication UE, the preamble based on the number of the repetition transmission associated with a repetition level, wherein the repetition level is determined by the machine type communication UE for the repetition transmission of the preamble based on a comparison result of the RSRP with the at least one threshold.

16. A base station (BS) in a wireless communication system, the BS comprising:

a transceiver; and at least one processor coupled with the transceiver and configured to:

transmit a master information block (MIB) including information related to a number of repetition transmission of a first system information block (SIB), transmit the first SIB based on the information related to the number of repetition transmission, the first SIB including scheduling information of a second SIB, and transmit the second SIB based on the scheduling information.

17. The BS of claim 16, wherein the first SIB is repeatedly transmitted based on the number of repetition transmission and is used for a machine type communication UE, and wherein the scheduling information includes at least one of information on a frequency resource or information on frequency hopping used for transmission of the second SIB for the machine type communication UE.

18. The BS of claim 16, wherein the at least one processor is further configured to transmit information indicating system information update on a downlink control channel.

19. The BS of claim 16, wherein the first SIB further includes information indicating an extended system frame number (SFN) for a machine type communication UE, and wherein the first SIB or the second SIB further includes at least one of:

information indicating a number of repetition transmission of a preamble associated with a random access for the machine type communication UE, information on a physical random access channel (PRACH) resource associated with the random access for the machine type communication UE, or information on at least one threshold associated with the PRACH resource for the machine type communication UE.

20. The BS of claim 19, wherein the at least one processor is further configured to receive, from the machine type communication UE, the preamble based on the number of the repetition transmission associated with a repetition level, and wherein the repetition level is determined by the machine type communication UE for the repetition transmission of the preamble based on a comparison result of the RSRP with the at least one threshold.

* * * * *